(12) United States Patent
Kuo

(10) Patent No.: US 11,137,577 B2
(45) Date of Patent: Oct. 5, 2021

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 299 days.

(21) Appl. No.: 16/388,974

(22) Filed: Apr. 19, 2019

(65) Prior Publication Data
US 2019/0391367 A1 Dec. 26, 2019

(30) Foreign Application Priority Data

Jun. 20, 2018 (TW) .................................. 107121162

(51) Int. Cl.
| | |
|---|---|
| *G02B 13/18* | (2006.01) |
| *G02B 3/02* | (2006.01) |
| *G02B 13/00* | (2006.01) |
| *G02B 9/62* | (2006.01) |
| *G03B 17/17* | (2021.01) |

(52) U.S. Cl.
CPC ........... *G02B 13/0045* (2013.01); *G02B 9/62* (2013.01); *G03B 17/17* (2013.01)

(58) Field of Classification Search
CPC ....... G02B 9/60; G02B 13/0045; G02B 13/02
See application file for complete search history.

(56) References Cited

U.S. PATENT DOCUMENTS

| | | |
|---|---|---|
| 3,604,786 A | 9/1971 | Baker |
| 4,458,991 A | 7/1984 | Yamada |
| 9,904,037 B1 | 2/2018 | Wang |
| 10,031,320 B2 | 7/2018 | Wang |
| 10,281,680 B1 | 5/2019 | Teraoka et al. |
| 10,302,911 B2 | 5/2019 | Lee et al. |
| 10,466,444 B2 | 11/2019 | Chen et al. |
| 10,564,402 B2 | 2/2020 | Hsueh et al. |
| 2014/0063323 A1* | 3/2014 | Yamazaki ............... G02B 13/18 348/335 |

(Continued)

FOREIGN PATENT DOCUMENTS

| | | |
|---|---|---|
| CN | 106772929 A | 5/2017 |
| CN | 206946086 U | 1/2018 |

(Continued)

*Primary Examiner* — Alicia M Harrington
(74) *Attorney, Agent, or Firm* — McClure, Qualey & Rodack, LLP

(57) ABSTRACT

A photographing optical lens assembly includes six lens elements, which are, in order from an object side to an image side, a first lens element, a second lens element, a third lens element, a fourth lens element, a fifth lens element and a sixth lens element. Each of the six lens elements has an object-side surface towards the object side and an image-side surface towards the image side. The first lens element has positive refractive power. The image-side surface of the fourth lens element is concave in a paraxial region thereof. The fifth lens element has positive refractive power, the object-side surface of the fifth lens element is convex in a paraxial region thereof, and the image-side surface of the fifth lens element is convex in a paraxial region thereof.

26 Claims, 28 Drawing Sheets

(56) References Cited

U.S. PATENT DOCUMENTS

| | | |
|---|---|---|
| 2014/0078603 A1 | 3/2014 | You |
| 2015/0277085 A1 | 10/2015 | Noda |
| 2017/0031133 A1 | 2/2017 | Liu et al. |
| 2017/0031134 A1 | 2/2017 | Liu et al. |
| 2017/0052346 A1 | 2/2017 | Tang et al. |
| 2017/0052347 A1 | 2/2017 | Tang et al. |
| 2017/0146775 A1 | 5/2017 | Jung |
| 2017/0212333 A1 | 7/2017 | Huang |
| 2017/0299847 A1 | 10/2017 | Huang |
| 2018/0284393 A1 | 10/2018 | Huang |
| 2019/0086640 A1 | 3/2019 | Fukaya |
| 2019/0154961 A1 | 5/2019 | Zhang |
| 2019/0154965 A1 | 5/2019 | Teraoka et al. |
| 2019/0187423 A1 | 6/2019 | Teraoka et al. |

FOREIGN PATENT DOCUMENTS

| | | |
|---|---|---|
| CN | 107783260 A | 3/2018 |
| CN | 108375823 A | 8/2018 |
| CN | 207764462 U | 8/2018 |
| CN | 208172352 U | 11/2018 |
| JP | 57-135911 A | 8/1982 |
| JP | 62-264018 A | 11/1987 |
| TW | I601995 B | 8/2018 |
| TW | 201837524 A | 10/2018 |
| TW | I617834 B | 4/2019 |

\* cited by examiner

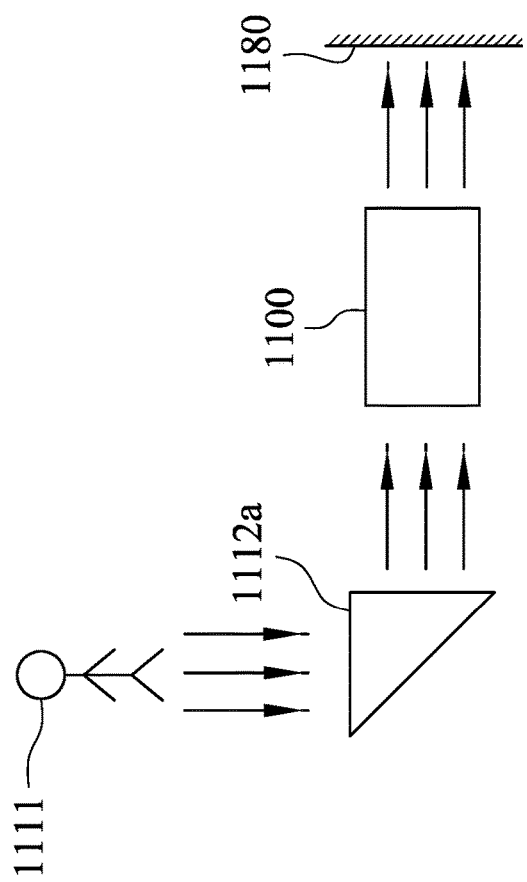
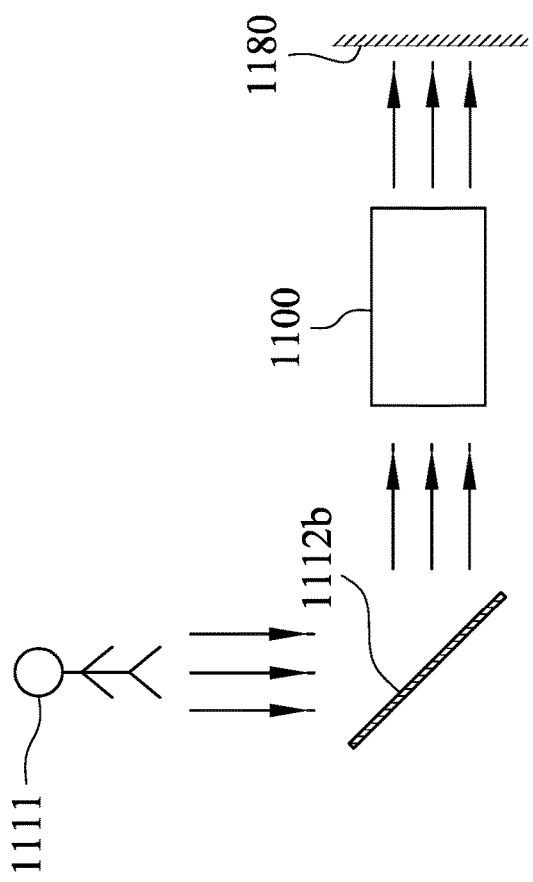
Fig. 22A
Fig. 22B

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107121162, filed Jun. 20, 2018, which is herein incorporated by reference.

BACKGROUND

Technical Field

The present disclosure relates to a photographing optical lens assembly and an imaging apparatus. More particularly, the present disclosure relates to a photographing optical lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical lens assembly that meets the aforementioned needs.

SUMMARY

According to one aspect of the present disclosure, a photographing optical lens assembly includes six lens elements, the six lens elements being, in order from an object side to an image side, a first lens element, a second lens element, a third lens element, a fourth lens element, a fifth lens element and a sixth lens element. Each of the six lens elements has an object-side surface towards the object side and an image-side surface towards the image side. The first lens element has positive refractive power. The image-side surface of the fourth lens element is concave in a paraxial region thereof. The fifth lens element has positive refractive power, the object-side surface of the fifth lens element is convex in a paraxial region thereof, and the image-side surface of the fifth lens element is convex in a paraxial region thereof. At least one of the object-side surfaces and the image-side surfaces of the six lens element includes at least one inflection point. When an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, and an entrance pupil diameter of the photographing optical lens assembly is EPD, the following conditions are satisfied: $10.0 < V5 < 45.0$; $0 < BL/TL < 0.55$; $0.5 < TL/f < 1.0$; $0 < (T45+T56)/T34 < 5.80$; $0.60 < f/f1 < 5.0$; and $1.60 < f/EPD < 2.60$.

According to another aspect of the present disclosure, a photographing optical lens assembly includes six lens elements, the six lens elements being, in order from an object side to an image side, a first lens element, a second lens element, a third lens element, a fourth lens element, a fifth lens element and a sixth lens element. Each of the six lens elements has an object-side surface towards the object side and an image-side surface towards the image side. The first lens element has positive refractive power. The fourth lens element has negative refractive power. The fifth lens element has positive refractive power, the object-side surface of the fifth lens element is convex in a paraxial region thereof, the image-side surface of the fifth lens element is convex in a paraxial region thereof. At least one of the object-side surfaces and the image-side surfaces of the six lens element includes at least one inflection point. When an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, and a curvature radius of the image-side surface of the fifth lens element is R10, the following conditions are satisfied: $10.0 < V5 < 45.0$; $0 < BL/TL < 0.55$; $0.5 < TL/f < 1.0$; $0 < (T45+T56)/T34 < 4.50$; $1.0 < f/f1 < 3.0$; and $-70.0 < R10/f < 0$.

According to another aspect of the present disclosure, an imaging apparatus includes the photographing optical lens assembly of the aforementioned aspect and an image sensor, wherein the image sensor is disposed on the image surface of the photographing optical lens assembly.

According to another aspect of the present disclosure, an electronic device includes the imaging apparatus of the aforementioned aspect.

According to another aspect of the present disclosure, a photographing optical lens assembly includes six lens elements, the six lens elements being, in order from an object side to an image side, a first lens element, a second lens element, a third lens element, a fourth lens element, a fifth lens element and a sixth lens element. Each of the six lens elements has an object-side surface towards the object side and an image-side surface towards the image side. The first lens element has positive refractive power. The fourth lens element has negative refractive power. The fifth lens element has positive refractive power, the object-side surface of the fifth lens element is convex in a paraxial region thereof, the image-side surface of the fifth lens element is convex in a paraxial region thereof. At least one of the object-side surfaces and the image-side surfaces of the six lens element includes at least one inflection point. When an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, a curvature radius of the object-side surface of the fifth lens element is R9, and a curvature radius of the image-side surface of the fifth lens element is R10, the following condition is satisfied: $10.0 < V5 < 45.0$; $0 < BL/TL < 0.55$; $0.5 < TL/f < 1.0$; $0 < (T45+T56)/T34 < 4.50$; $1.0 < f/f1 < 3.0$; and $-105.00 < R10/R9 < 0$.

BRIEF DESCRIPTION OF THE DRAWINGS

The present disclosure can be more fully understood by reading the following detailed description of the embodiment, with reference made to the accompanying drawings as follows:

FIG. 22A is a schematic view of an imaging apparatus according to the 11th embodiment of the present disclosure.

FIG. 22B is a schematic view of the imaging apparatus according to the 11th embodiment with another reflective member of the present disclosure.

DETAILED DESCRIPTION

Figure 1:
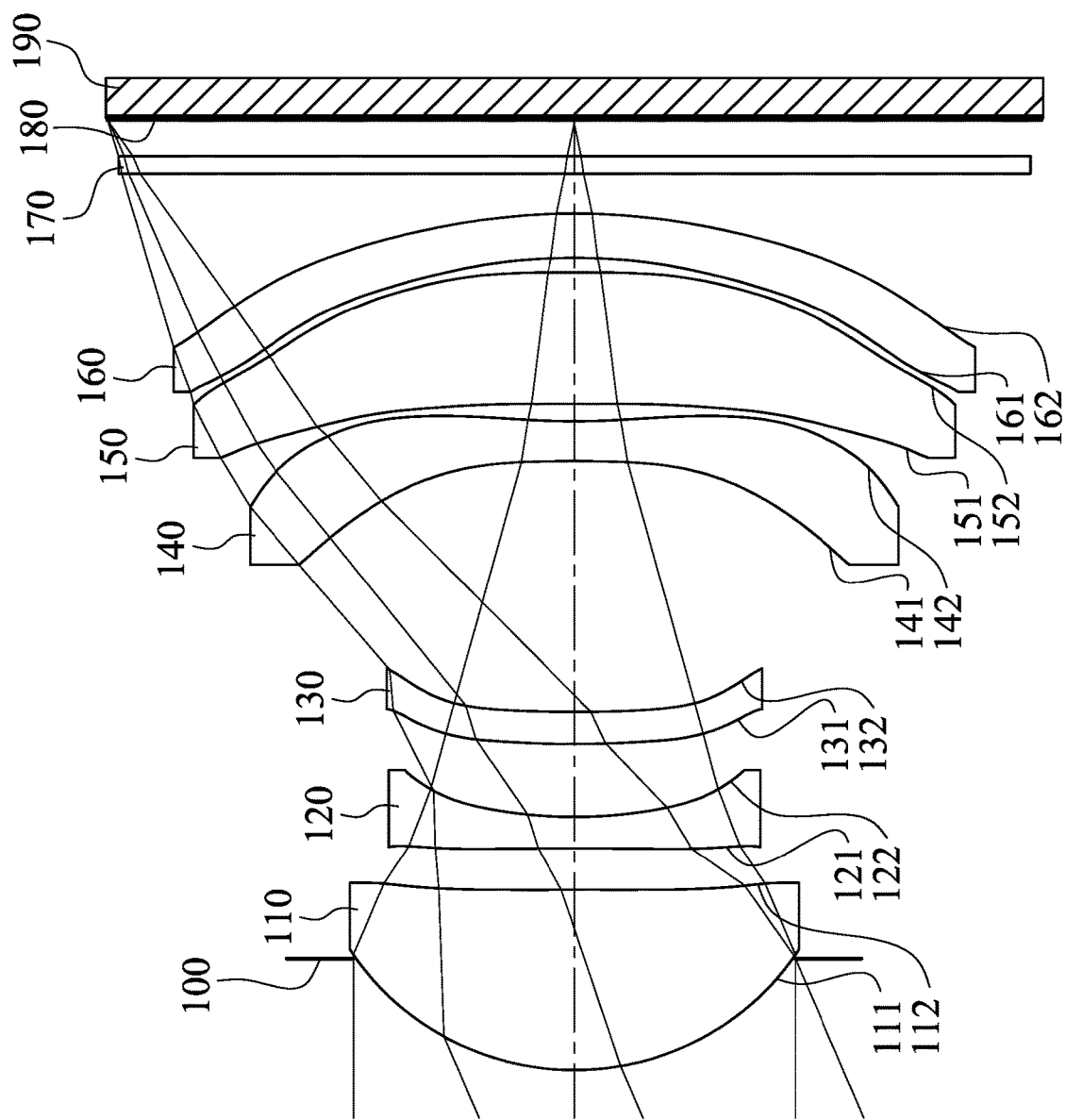
FIG. 1 is a schematic view of an imaging apparatus according to the 1st embodiment of the present disclosure.

A photographing optical lens assembly includes six lens elements, which are, in order from an object side to an image side, a first lens element, a second lens element, a third lens element, a fourth lens element, a fifth lens element and a sixth lens element. Each of the six lens elements has an object-side surface towards the object side and an image-side surface towards the image side.

The first lens element has positive refractive power, so that it is favorable for focusing the light and obtaining the balance between the field of view and the total track length. The object-side surface of the first lens element can be convex in a paraxial region thereof, so that it is favorable for applying the photographing optical lens assembly to the design with large aperture and short total track length.

The second lens element can have negative refractive power, so that it is favorable for balancing aberrations, such as spherical aberration, chromatic aberration, etc., which is generated from the first lens element. The image-side surface of the second lens element can be concave in a paraxial region thereof, so that it is favorable for reducing the incident angle of the light on each surface of each lens element by adjusting the traveling direction of the light, so as to reduce the surface reflection.

The fourth lens element can have negative refractive power, which can correct aberrations with the fifth lens element. The image-side surface of the fourth lens element can be concave in a paraxial region thereof, so that it is favorable for correcting the field curvature in an off-axis region thereof. The image-side surface of the fourth lens element can include a shape changing from concave to convex, so that it is favorable for correcting aberrations in the off-axis and reducing the outer diameter of the lens element.

The fifth lens element has positive refractive power, so that it is favorable for reducing the incident angle of the light on an image surface by adjusting the traveling direction of the light, so as to enhance the response efficiency of an image sensor. The object-side surface of the fifth lens element is convex in a paraxial region thereof, so that it is favorable for adjusting the focal length and the total track length of the photographing optical lens assembly. The image-side surface of the fifth lens element is convex in a paraxial region thereof, so that it is favorable for obtaining proper back focal length and reducing the incident angle of the light on the image surface and the total track length by adjusting traveling direction of the light.

At least one of the object-side surfaces and the image-side surfaces of the six lens element includes at least one inflection point. Therefore, it is favorable for increasing the variation of the aspheric surface so as to reduce the generation of aberration and the size. Moreover, each of at least two of the object-side surfaces and the image-side surfaces of the six lens element includes at least one inflection point. Furthermore, each of at least three of the object-side surfaces and the image-side surfaces of the six lens element includes at least one inflection point.

According to the photographing optical lens assembly of the present disclosure, an inflection point is a point where a curvature is shifted from positive to negative or from negative to positive.

When an Abbe number of the fifth lens element is V5, the following condition is satisfied: $10.0<V5<45.0$. Therefore, it is favorable for correcting chromatic aberration and enhancing the telephoto function of the photographing optical lens assembly. Moreover, the following condition can be satisfied: $13.0<V5<38.0$. Furthermore, the following condition can be satisfied: $16.0<V5<30.0$.

When an axial distance between the image-side surface of the sixth lens element and the image surface is BL, and an axial distance between the object-side surface of the first lens element and the image surface is TL, the following condition is satisfied: $0<BL/TL<0.55$. Therefore, it is favorable for adjusting the ratio between the back focal length and the total track length so as to reducing the size of the photographing optical lens assembly for increasing the application range. Moreover, the following condition can be satisfied: $0<BL/TL<0.50$.

When the axial distance between the object-side surface of the first lens element and the image surface is TL, and a focal length of the photographing optical lens assembly is f, the following condition is satisfied: $0.5<TL/f<1.0$. Therefore, it is favorable for obtaining the telephoto function and reducing the total track length by adjusting the ratio between the total track length and the focal length.

When an axial distance between the third lens element and the fourth lens element is T34, an axial distance between the fourth lens element and the fifth lens element is T45, and an axial distance between the fifth lens element and the sixth lens element is T56, the following condition is satisfied: $0<(T45+T56)/T34<5.80$. Therefore, it is favorable for obtaining the balance between the aberration correction and the size compression by adjusting the distances between the lens elements on the image side of the photographing optical lens assembly. Moreover, the following condition can be satisfied: $0<(T45+T56)/T34<4.50$. Further, the following condition can be satisfied: $0<(T45+T56)/T34<2.45$. Furthermore, the following condition can be satisfied: $0<(T45+T56)/T34<1.25$.

When the focal length of the photographing optical lens assembly is f, and a focal length of the first lens element is ft the following condition is satisfied: $0.60<f/f1<5.0$. Therefore, it is favorable for enhancing the light converging ability and avoiding excessive aberrations by maintaining the proper positive refractive power of the first lens element. Moreover, the following condition can be satisfied: $1.0<f/f1<3.0$. Further, the following condition can be satisfied: $1.7<f/f1<2.5$.

When the focal length of the photographing optical lens assembly is f, and an entrance pupil diameter of the photographing optical lens assembly is EPD, the following condition is satisfied: $1.00<f/EPD<2.80$. Therefore, it is favorable for obtaining proper aperture size and field of view of the photographing optical lens assembly by adjusting the aperture size and focal length thereof. Moreover, the following condition can be satisfied: $1.30<f/EPD\leq2.70$. Further, the following condition can be satisfied: $1.60<f/EPD<2.60$. Furthermore, the following condition can be satisfied: $1.90<f/EPD\leq2.55$.

When the focal length of the photographing optical lens assembly is f, and a curvature radius of the image-side surface of the fifth lens element is R10, the following condition is satisfied: $-70.0<R10/f<0$. Therefore, it is favorable for obtaining proper back focal length of the photographing optical lens assembly by further adjusting the focal length thereof and the surface shape of the fifth lens element. Moreover, the following condition can be satisfied: $-60.0<R10/f<0$. Further, the following condition can be satisfied: $-50.0<R10/f<0$.

When a curvature radius of the object-side surface of the fifth lens element is R9, and the curvature radius of the image-side surface of the fifth lens element is R10, the following condition is satisfied: $-105.00<R10/R9<0$. Therefore, it is favorable for correcting off-axis aberrations and obtaining proper refractive power of the fifth lens element by properly adjusting the surface shape of the fifth lens element. Moreover, the following condition can be satisfied: $-100.00<R10/R9<-0.10$. Further, the following condition can be satisfied: $-80.00<R10/R9<-0.15$. Furthermore, the following condition can be satisfied: $-50.00<R10/R9<-0.30$.

When a minimum among Abbe numbers of the six lens elements of the photographing optical lens assembly is Vmin, the following condition is satisfied: $10.0<Vmin<20.0$. Therefore, it is favorable for correcting chromatic aberration and other kind of aberrations by arranging the material with lower Abbe number which usually has stronger ability of refracting the light.

When an Abbe number of the third lens element is V3, and an Abbe number of the fourth lens element is V4, the following condition is satisfied: $20.0<V3+V4<100$. Therefore, it is favorable for correcting aberrations, such as chromatic aberration, by cooperating the third lens element and the fourth lens element. Moreover, the following condition can be satisfied: $50.0<V3+V4<90.0$.

When a central thickness of the second lens element is CT2, and an axial distance between the first lens element and the second lens element is T12, the following condition is satisfied: $0.41<T12/CT2<3.8$. Therefore, it is favorable for correcting aberrations and reducing the difficulty of assembling by cooperating the first lens element and the second lens element. Moreover, the following condition can be satisfied: $0.70<T12/CT2<2.8$.

When an axial distance between the object-side surface of the first lens element and the image-side surface of the sixth lens element is TD, and the axial distance between the third lens element and the fourth lens element is T34, the following condition is satisfied: $1.8<TD/T34<5.0$. Therefore, it is favorable for correcting aberrations and reducing the total track length by adjusting the ratio between the distance between the third lens element and the fourth lens element and the length of the photographing optical lens assembly.

When the focal length of the photographing optical lens assembly is f, and a focal length of the sixth lens element is f6, and the following condition is satisfied: $-0.90\leq f/f6<0.60$. Therefore, it is favorable for forming the proper back focal length by avoiding excessive refractive power of the sixth lens element. Moreover, the following condition can be satisfied: $-0.70<f/f6<0.40$.

The photographing optical lens assembly can further include an aperture stop located on an object side of the third lens element. Therefore, it is favorable for obtaining the balance between the field of view and the size by adjusting the aperture location.

When an axial distance between the aperture stop and the image surface is SL, and the axial distance between the object-side surface of the first lens element and the image surface is TL, the following condition is satisfied: 0.60<SL/TL<1.2. Therefore, it is favorable for reducing the total track length of the photographing optical lens assembly by further adjusting the aperture location. Moreover, the following condition can be satisfied: 0.70<SL/TL<1.0.

When the focal length of the photographing optical lens assembly is f, and a curvature radius of the object-side surface of the first lens element is R1, the following condition is satisfied: 3.2<f/R1. Therefore, it is favorable for providing the telephoto characteristic by adjusting the focal length of the photographing optical lens assembly and the surface shape of the first lens element.

At least three of the six lens elements can have Abbe numbers smaller than 45. Therefore, it is favorable for enhancing the correction of aberrations, such as chromatic aberration, by arranging the material with lower Abbe number. Moreover, at least four of the six lens elements can have Abbe numbers smaller than 45.

When the axial distance between the object-side surface of the first lens element and the image surface is TL, and a maximum image height of the photographing optical lens assembly is ImgH, the following condition is satisfied: 1.6<TL/ImgH<5.0. Therefore, it is favorable for reducing the total track length, enlarging the area of the image surface, and maintaining the image quality at the same time.

When half of a maximum field of view of the photographing optical lens assembly is HFOV, the following condition is satisfied: 10.0 degrees<HFOV<30.0 degrees. Therefore, it is favorable for obtaining the telephoto characteristic and maintaining the size of the photographing optical lens assembly.

When the axial distance between the object-side surface of the first lens element and the image surface is TL, the following condition is satisfied: 2.0 mm<TL<20 mm. Therefore, it is favorable for maintaining the total track length and the manufacturing and assembling yield rate of the photographing optical lens assembly. Moreover, the following condition can be satisfied: 3.5 mm<TL<14 mm.

When the axial distance between the object-side surface of the first lens element and the image-side surface of the sixth lens element is TD, and a central thickness of the first lens element is CT1, the following condition is satisfied: 1.8<TD/CT1<7.0. Therefore, it is favorable for reducing the total track length by adjusting the ratio between the length of the photographing optical lens assembly and the thickness of the first lens element.

When the focal length of the photographing optical lens assembly is f, and a focal length of the second lens element is f2, the following condition is satisfied: −5.0<f/f2<−0.65. Therefore, it is favorable for correcting aberrations by adjusting the refractive power of the second lens element. Moreover, the following condition can be satisfied: −4.0<f/f2<−0.85.

When the focal length of the photographing optical lens assembly is f, and the maximum image height of the photographing optical lens assembly is ImgH, the following condition is satisfied: 1.65<f/ImgH<5.50. Therefore, it is favorable for obtaining the balance between the image quality and the telephoto characteristic by adjusting the field of view and the size of the image surface.

Each of the aforementioned features of the photographing optical lens assembly can be utilized in various combinations for achieving the corresponding effects.

According to the photographing optical lens assembly of the present disclosure, the lens elements thereof can be made of glass or plastic materials. When the lens elements are made of glass materials, the distribution of the refractive power of the photographing optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced. The aspheric surfaces may be formed by plastic injection molding or glass molding.

According to the photographing optical lens assembly of the present disclosure, one or more of the lens material may optionally include an additive which alters the lens transmittance in a specific range of wavelength for reducing unwanted stray light or color deviation. For example, the additive may optionally filter out light in the wavelength range of 600 nm~800 nm for reducing excessive red light and/or near infra-red light, or may optionally filter out light in the wavelength range of 350 nm~450 nm to reduce excessive blue light and/or near ultra-violet light from interfering the final image. The additive may be homogenously mixed with a plastic material to be used in manufacturing a mixed-material lens element by injection molding.

According to the photographing optical lens assembly of the present disclosure, when a surface of a lens element is aspheric, it indicates that the surface has an aspheric shape throughout its optically effective area or a portion(s) thereof.

According to the photographing optical lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, the image surface of the photographing optical lens assembly, based on the corresponding image sensor, can be flat or curved. In particular, the image surface can be a concave curved surface facing towards the object side. According to the photographing optical lens assembly of the present disclosure, at least one image correcting element (such as a field flattener) can be selectively disposed between the lens element closest to the image side of the photographing optical lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, an electrochromic material, a liquid crystal layer or the like. The amount of incident light or the exposure time of the image can be controlled by the aperture adjusting unit to enhance the image moderation ability. In addition, the aperture adjusting unit can be the aperture stop of the photographing optical lens assembly according to the present disclosure, so as to moderate the image properties such as depth of field or the exposure speed by changing f-number.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. It is favorable for obtaining the compact size and enhancing the image quality of the photographing optical lens assembly by properly arranging the refractive power and the surface shape of the fifth lens element. Preferably, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Preferably, the electronic device can further include, but not limited to, a control unit, a display, a storage unit, a random access memory unit (RAM) or a combination thereof.

According to the above description of the present disclosure, the following specific embodiments are provided for further explanation.

1st Embodiment

Figure 2:
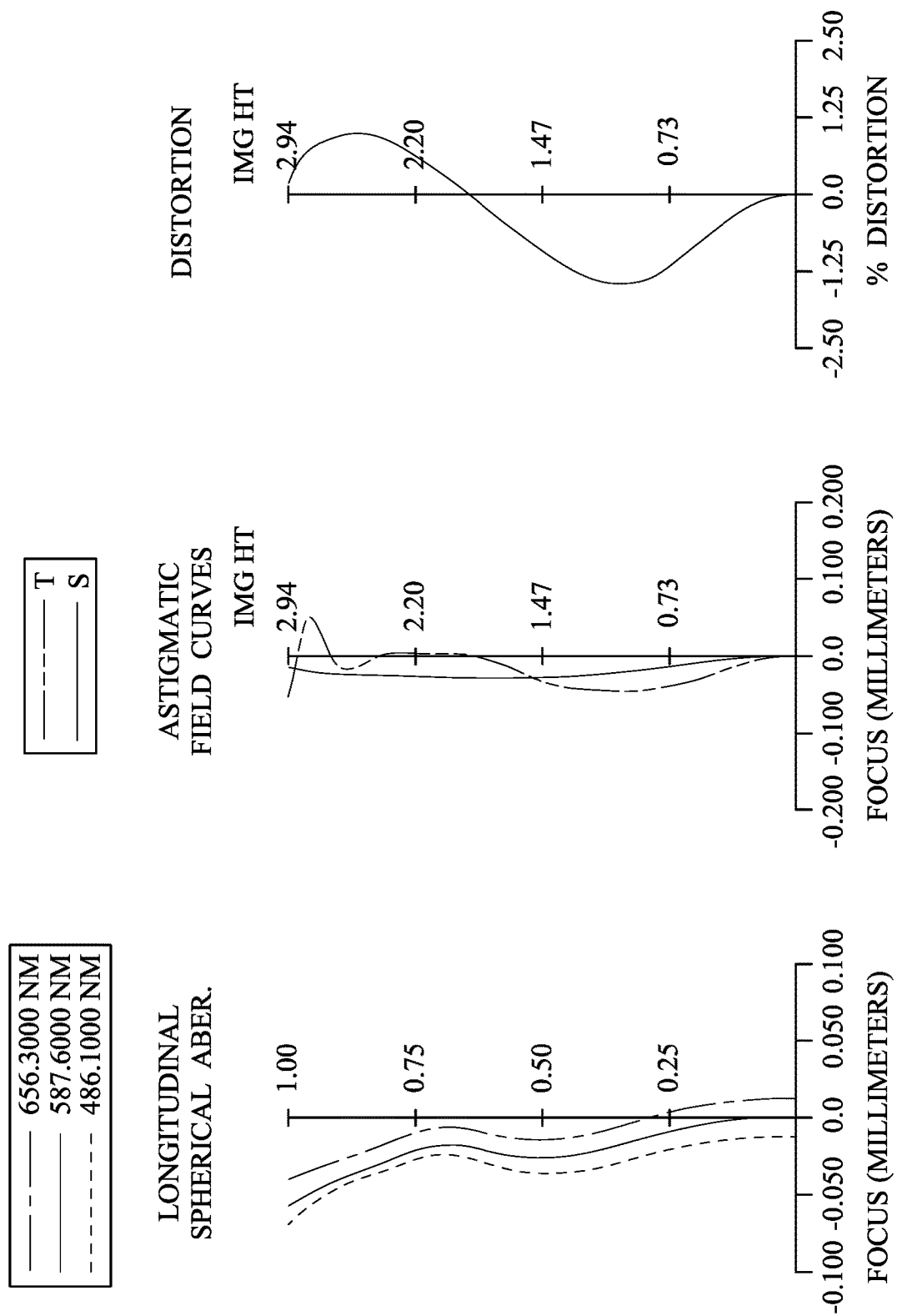
FIG. 2 shows spherical aberration curves, astigmatic field curves and a distortion curve of the imaging apparatus according to the 1st embodiment.

FIG. 1 is a schematic view of an imaging apparatus according to the 1st embodiment of the present disclosure. FIG. 2 shows spherical aberration curves, astigmatic field curves and a distortion curve of the imaging apparatus according to the 1st embodiment. In FIG. 1, the imaging apparatus includes a photographing optical lens assembly (its reference numeral is omitted) and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, a filter 170 and an image surface 180, wherein the image sensor 190 is disposed on the image surface 180 of the photographing optical lens assembly. The photographing optical lens assembly includes six lens elements (110, 120, 130, 140, 150, 160) without additional one or more lens elements inserted between the first lens element 110 and the sixth lens element 160.

Figure 21:
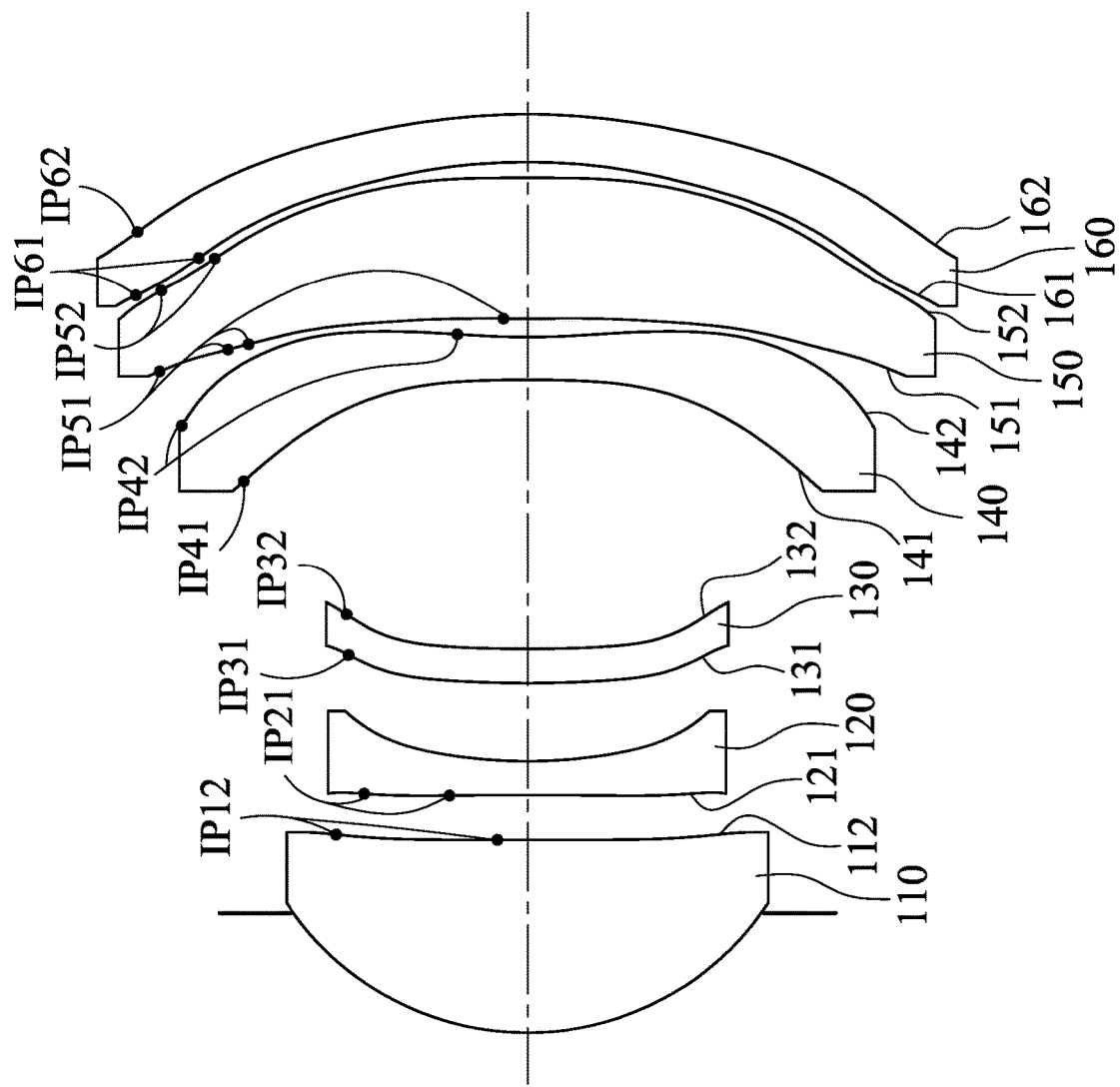
FIG. 21 is a schematic view of inflection points according to the 1st embodiment of FIG. 1.

The first lens element 110 with positive refractive power has an object-side surface 111 being convex in a paraxial region thereof and an image-side surface 112 being convex in a paraxial region thereof. The first lens element 110 is made of a plastic material, and has the object-side surface 111 and the image-side surface 112 being both aspheric. Furthermore, FIG. 21 is a schematic view of inflection points according to the 1st embodiment of FIG. 1. In FIG. 21, the image-side surface 112 of the first lens element 110 includes at least one inflection point IP12.

The second lens element 120 with negative refractive power has an object-side surface 121 being concave in a paraxial region thereof and an image-side surface 122 being concave in a paraxial region thereof. The second lens element 120 is made of a plastic material, and has the object-side surface 121 and the image-side surface 122 being both aspheric. Furthermore, the object-side surface 121 of the second lens element 120 includes at least one inflection point IP21.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, each of the object-side surface 131 and the image-side surface 132 of the third lens element 130 includes at least one inflection point IP31, IP32.

The fourth lens element 140 with negative refractive power has an object-side surface 141 being concave in a paraxial region thereof and an image-side surface 142 being concave in a paraxial region thereof. The fourth lens element 140 is made of a plastic material, and has the object-side surface 141 and the image-side surface 142 being both aspheric. Furthermore, each of the object-side surface 141 and the image-side surface 142 of the fourth lens element 140 includes at least one inflection point IP41, IP42, and the image-side surface 142 of the fourth lens element 140 includes a shape changing from concave to convex in an off-axis region thereof.

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric. Furthermore, each of the object-side surface 151 and the image-side surface 152 of the fifth lens element 150 includes at least one inflection point IP51, IP52.

The sixth lens element 160 with positive refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, each of the object-side surface 161 and the image-side surface 162 of the sixth lens element 160 includes at least one inflection point IP61, IP62.

The filter 170 is made of a glass material, which is located between the sixth lens element 160 and the image surface 180 in order, and will not affect the focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the relative distance between a point on the aspheric surface spaced at a distance Y from the optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=6.80 mm; Fno=2.45; and HFOV=23.4 degrees.

In the photographing optical lens assembly according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, and a minimum among Abbe numbers of the six lens elements of the photographing optical lens assembly is Vmin (that is, the minimum among V1, V2, V3, V4, V5 and V6), the following conditions are satisfied: V3+V4=75.4; V5=20.4; and Vmin=19.4.

In the photographing optical lens assembly according to the 1st embodiment, when an axial distance between the image-side surface 162 of the sixth lens element 160 and the image surface 180 is BL, an axial distance between the object-side surface 111 of the first lens element 110 and the image surface 180 is TL, and an axial distance between the aperture stop 100 and the image surface 180 is SL, the following conditions are satisfied: BL/TL=0.10; and SL/TL=0.88.

In the photographing optical lens assembly according to the 1st embodiment, when a central thickness of the second lens element 120 is CT2, and an axial distance between the first lens element 110 and the second lens element 120 is T12, the following condition is satisfied: T12/CT2=1.31.

In the photographing optical lens assembly according to the 1st embodiment, when an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following condition is satisfied: (T45+T56)/T34=0.13.

In the photographing optical lens assembly according to the 1st embodiment, when an axial distance between the object-side surface 111 of the first lens element 110 and the image-side surface 162 of the sixth lens element 160 is TD, a central thickness of the first lens element 110 is CT1, and the axial distance between the third lens element 130 and the fourth lens element 140 is T34, the following conditions are satisfied: TD/CT1=4.76; and TD/T34=3.41.

In the photographing optical lens assembly according to the 1st embodiment, when the axial distance between the object-side surface 111 of the first lens element 110 and the image surface 180 is TL, the focal length of the photographing optical lens assembly is f, and a maximum image height of the photographing optical lens assembly is ImgH (half of a diagonal length of an effective photosensitive area of the image sensor 190), the following conditions are satisfied: TL=5.99 mm; TL/f=0.88; and TL/ImgH=2.04.

In the photographing optical lens assembly according to the 1st embodiment, when the focal length of the photographing optical lens assembly is f, a curvature radius of the object-side surface 151 of the fifth lens element 150 is R9, and a curvature radius of the image-side surface 152 of the fifth lens element 150 is R10, the following conditions are satisfied: R10/f=−11.67; and R10/R9=−2.87.

In the photographing optical lens assembly according to the 1st embodiment, when the focal length of the photographing optical lens assembly is f, an entrance pupil diameter of the photographing optical lens assembly is EPD, a focal length of the first lens element 110 is f1, a focal length of the second lens element 120 is f2, a focal length of the sixth lens element 160 is f6, the maximum image height of the photographing optical lens assembly is ImgH, and a curvature radius of the object-side surface 111 of the first lens element 110 is R1, the following conditions are satisfied: f/EPD=2.45; f/f1=2.19; f/f2=−1.59; f/f6=0.03; f/ImgH=2.32; and f/R1=4.01.

The detailed optical data of the 1st embodiment are shown in Table 1 and the aspheric surface data are shown in Table 2 below.

TABLE 1

1st Embodiment
f = 6.80 mm, Fno = 2.45, HFOV = 23.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.700 | | | | |
| 2 | Lens 1 | 1.696 | ASP | 1.133 | Plastic | 1.540 | 58.0 | 3.11 |
| 3 | | −130.063 | ASP | 0.261 | | | | |
| 4 | Lens 2 | −332.076 | ASP | 0.200 | Plastic | 1.642 | 22.5 | −4.29 |
| 5 | | 2.776 | ASP | 0.458 | | | | |
| 6 | Lens 3 | 6.770 | ASP | 0.200 | Plastic | 1.669 | 19.4 | 43.52 |
| 7 | | 8.717 | ASP | 1.580 | | | | |
| 8 | Lens 4 | −9.368 | ASP | 0.250 | Plastic | 1.544 | 56.0 | −5.29 |
| 9 | | 4.189 | ASP | 0.108 | | | | |
| 10 | Lens 5 | 27.676 | ASP | 0.829 | Plastic | 1.660 | 20.4 | 31.19 |
| 11 | | −79.378 | ASP | 0.091 | | | | |
| 12 | Lens 6 | −4.076 | ASP | 0.280 | Plastic | 1.534 | 55.9 | 227.81 |
| 13 | | −4.038 | ASP | 0.250 | | | | |
| 14 | Filter | Plano | | 0.110 | Glass | 1.517 | 64.2 | — |
| 15 | | Plano | | 0.238 | | | | |
| 16 | Image | Plano | | — | | | | |

Reference wavelength is 587.6 nm (d-line).
Effective radius of Surface 13 is 2.520 mm.

TABLE 2

Aspheric Coefficients

| Surface # | 2 | 3 | 4 | 5 | 6 | 7 |
|---|---|---|---|---|---|---|
| k = | −2.4942E−01 | 8.3504E+01 | 9.0000E+01 | −8.3643E+00 | −1.2709E+01 | 4.5691E+01 |
| A4 = | 2.8035E−03 | 2.0019E−02 | −6.1286E−02 | −5.0447E−02 | −2.7423E−02 | −9.9328E−03 |
| A6 = | 9.8350E−03 | 9.8555E−03 | 1.5360E−01 | 1.9246E−01 | 2.6515E−02 | 1.5324E−01 |
| A8 = | −8.5876E−03 | −1.9090E−02 | −8.8005E−02 | −4.6118E−02 | 2.7672E−01 | −1.6564E−01 |
| A10 = | 4.9456E−03 | 2.2702E−02 | −5.6092E−04 | −1.3465E−02 | −3.2772E−01 | 3.2547E−01 |
| A12 = | −6.9802E−04 | −1.2300E−02 | 1.7272E−02 | 4.3161E−03 | 1.5836E−01 | −2.8605E−01 |
| A14 = | | 1.8813E−03 | −7.7709E−03 | | −3.6731E−02 | 7.5719E−02 |

| Surface # | 8 | 9 | 10 | 11 | 12 | 13 |
|---|---|---|---|---|---|---|
| k = | 2.2511E+01 | −2.1677E+00 | 3.2822E+01 | 8.2451E−01 | −2.5647E−01 | 4.9648E−01 |
| A4 = | −8.2428E−02 | −1.5163E−01 | −1.6266E−01 | −1.8722E−01 | −5.4336E−02 | 1.0431E−02 |
| A6 = | −8.1297E−02 | 9.2710E−02 | 2.1993E−01 | 1.5278E−01 | 6.4174E−02 | −1.7921E−03 |
| A8 = | 1.5482E−01 | −2.6220E−02 | −1.5979E−01 | −7.0335E−02 | −3.0595E−02 | 3.0080E−04 |
| A10 = | −1.1569E−01 | −9.5720E−02 | 6.2489E−02 | 1.7268E−02 | 6.5602E−03 | −1.7243E−04 |
| A12 = | 4.6748E−02 | 8.2057E−03 | −1.3349E−02 | −2.1812E−03 | −6.2518E−04 | 3.1370E−05 |
| A14 = | −9.9014E−03 | −1.9264E−03 | 1.4692E−03 | 1.2647E−04 | 2.0811E−05 | −1.4818E−06 |
| A16 = | 8.6168E−04 | 1.5306E−04 | −6.5202E−05 | −2.3120E−06 | | |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

According to the 1st embodiment, the numbers of inflection points of the object-side surfaces and the image-side surfaces of the first lens element 110, the second lens element 120, the third lens element 130, the fourth lens element 140, the fifth lens element 150 and the sixth lens element 160 are listed as follows.

| 1st Embodiment - Numbers of inflection points | | | | | | |
|---|---|---|---|---|---|---|
| | 110 | 120 | 130 | 140 | 150 | 160 |
| Object-side surface | 0 | 2 | 1 | 1 | 4 | 2 |
| Image-side surface | 2 | 0 | 1 | 2 | 2 | 1 |

Furthermore, according to the 1st embodiment of the present disclosure, at least three of the six lens elements of the photographing optical lens assembly have Abbe numbers smaller than 45. Specifically, according to the 1st embodiment, three lens elements have Abbe numbers smaller than 45, which are the second lens element 120, the third lens element 130 and the fifth lens element 150.

2nd Embodiment

Figure 3:
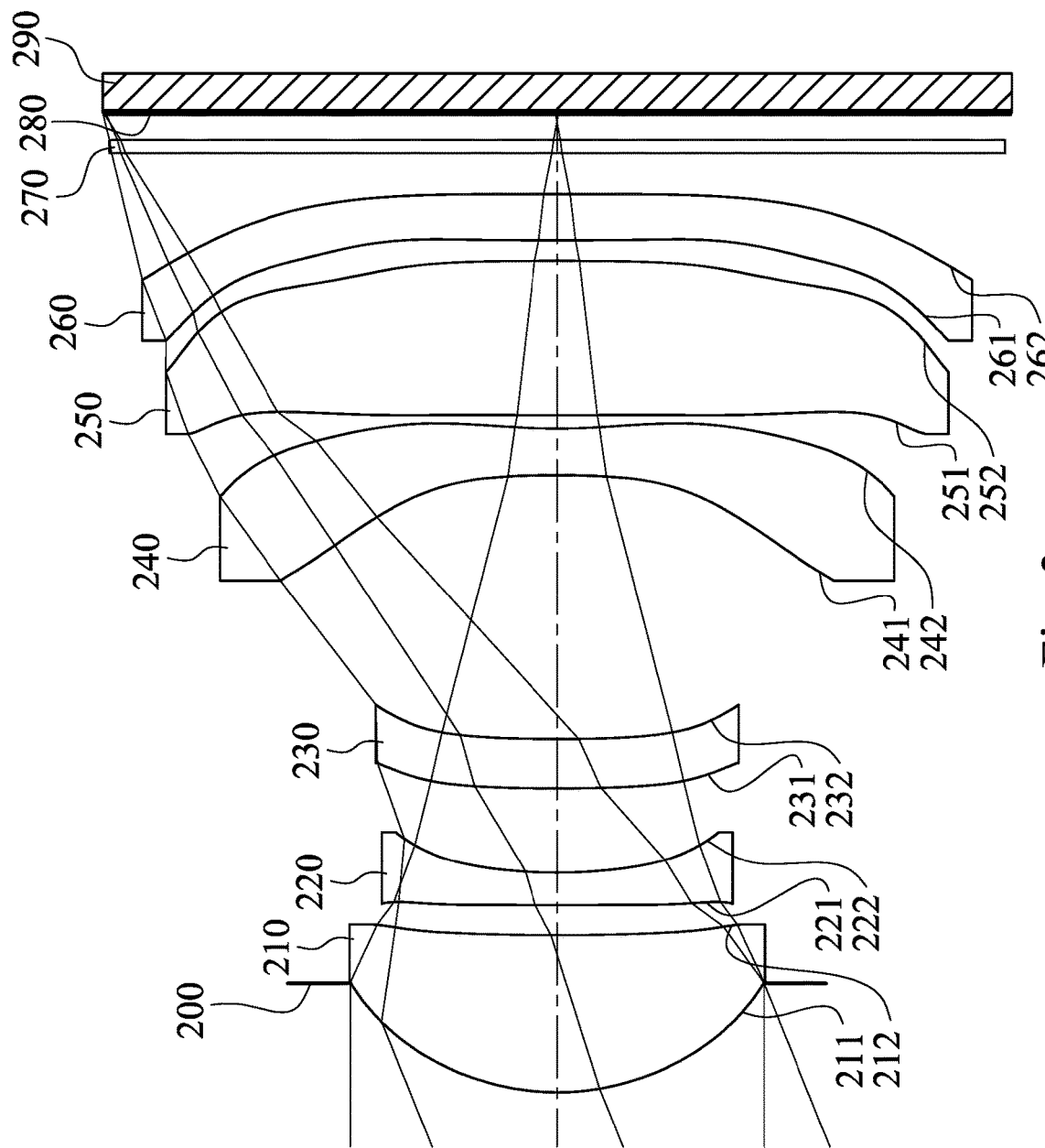
FIG. 3 is a schematic view of an imaging apparatus according to the 2nd embodiment of the present disclosure.

FIG. 3 is a schematic view of an imaging apparatus according to the 2nd embodiment of the present disclosure.

Figure 4:
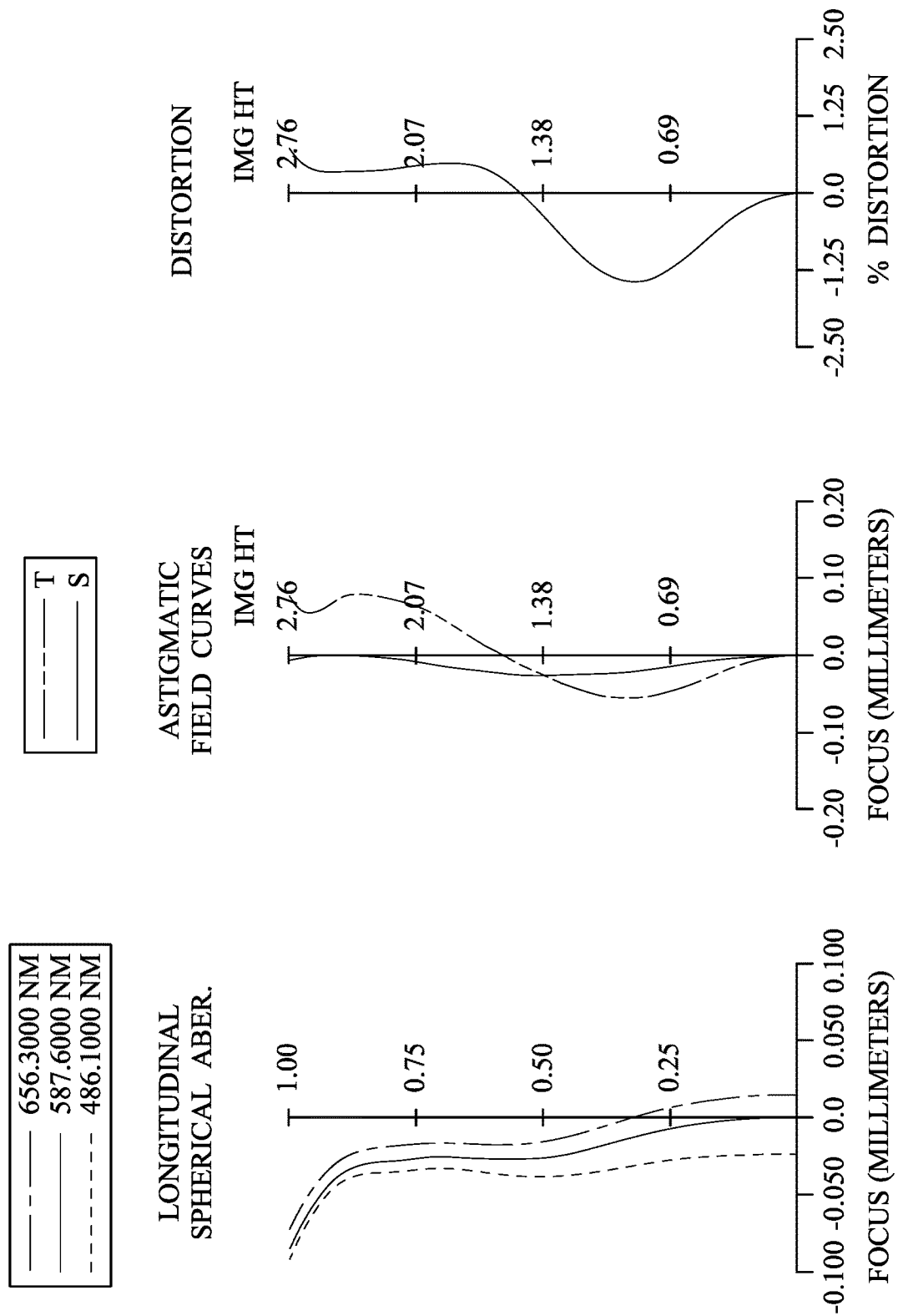
FIG. 4 shows spherical aberration curves, astigmatic field curves and a distortion curve of the imaging apparatus according to the 2nd embodiment.

FIG. 4 shows spherical aberration curves, astigmatic field curves and a distortion curve of the imaging apparatus according to the 2nd embodiment. In FIG. 3, the imaging apparatus includes a photographing optical lens assembly (its reference numeral is omitted) and an image sensor 290. The photographing optical lens assembly includes, in order from an object side to an image side, an aperture stop 200, a first lens element 210, a second lens element 220, a third lens element 230, a fourth lens element 240, a fifth lens element 250, a sixth lens element 260, a filter 270 and an image surface 280, wherein the image sensor 290 is disposed on the image surface 280 of the photographing optical lens assembly. The photographing optical lens assembly includes six lens elements (210, 220, 230, 240, 250, 260) without additional one or more lens elements inserted between the first lens element 210 and the sixth lens element 260.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric. Furthermore, the image-side surface 212 of the first lens element 210 includes at least one inflection point.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric. Furthermore, the object-side surface 221 of the second lens element 220 includes at least one inflection point.

The third lens element 230 with negative refractive power has an object-side surface 231 being convex in a paraxial region thereof and an image-side surface 232 being concave in a paraxial region thereof. The third lens element 230 is made of a plastic material, and has the object-side surface 231 and the image-side surface 232 being both aspheric. Furthermore, the object-side surface 231 of the third lens element 230 includes at least one inflection point.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric. Furthermore, each of the object-side surface 241 and the image-side surface 242 of the fourth lens element 240 includes at least one inflection point, and the image-side surface 242 of the fourth lens element 240 includes a shape changing from concave to convex in an off-axis region thereof.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, each of the object-side surface 251 and the image-side surface 252 of the fifth lens element 250 includes at least one inflection point.

The sixth lens element 260 has an object-side surface 261 being planar in a paraxial region thereof and an image-side surface 262 being planar in a paraxial region thereof. The sixth lens element 260 is made of a plastic material, and has the object-side surface 261 and the image-side surface 262 being both aspheric. Furthermore, the object-side surface 261 of the sixth lens element 260 includes at least one inflection point.

The filter 270 is made of a glass material, which is located between the sixth lens element 260 and the image surface 280 in order, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 6.81 mm, Fno = 2.70, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.665 | | | | |
| 2 | Lens 1 | 1.570 | ASP | 0.958 | Plastic | 1.545 | 56.1 | 3.20 |
| 3 | | 12.493 | ASP | 0.184 | | | | |
| 4 | Lens 2 | 23.199 | ASP | 0.200 | Plastic | 1.639 | 23.2 | −5.52 |
| 5 | | 3.051 | ASP | 0.515 | | | | |
| 6 | Lens 3 | 9.971 | ASP | 0.301 | Plastic | 1.669 | 19.4 | −228.54 |
| 7 | | 9.247 | ASP | 1.614 | | | | |
| 8 | Lens 4 | −7.695 | ASP | 0.284 | Plastic | 1.544 | 56.0 | −4.29 |
| 9 | | 3.389 | ASP | 0.081 | | | | |
| 10 | Lens 5 | 20.078 | ASP | 0.947 | Plastic | 1.642 | 22.5 | 19.37 |
| 11 | | −32.045 | ASP | 0.126 | | | | |
| 12 | Lens 6 | ∞ | ASP | 0.280 | Plastic | 1.669 | 19.4 | — |
| 13 | | ∞ | ASP | 0.250 | | | | |
| 14 | Filter | Plano | | 0.080 | Glass | 1.517 | 64.2 | — |
| 15 | | Plano | | 0.169 | | | | |
| 16 | Image | Plano | | — | | | | |

Reference wavelength is 587.6 nm (d-line)

Effective radius of Surface 9 is 2.060 mm

TABLE 4

| Aspheric Coefficients | | | | | | |
|---|---|---|---|---|---|---|
| Surface # | 2 | 3 | 4 | 5 | 6 | 7 |
| k = | −1.5253E−01 | 2.9794E+01 | 9.0000E+01 | −4.0100E+00 | −3.3223E+00 | 4.4431E+01 |
| A4 = | 1.3513E−03 | −3.6803E−02 | −1.0890E−01 | −3.8928E−02 | −1.7583E−03 | −3.9192E−03 |
| A6 = | 1.0817E−02 | 5.9948E−02 | 1.8246E−01 | 1.7866E−01 | 5.3294E−02 | 1.7962E−01 |
| A8 = | −5.2369E−03 | 2.6342E−02 | 1.2834E−01 | 2.0263E−01 | 1.7139E−01 | −2.4573E−01 |
| A10 = | 1.7148E−03 | −2.8048E−02 | −4.3767E−01 | −4.5447E−01 | −3.3167E−01 | 2.9949E−01 |
| A12 = | 1.8382E−03 | 1.9169E−02 | 3.1989E−01 | 2.1913E−01 | 2.4837E−01 | −1.8979E−01 |
| A14 = | | −8.6728E−03 | −8.8470E−02 | | −7.4194E−02 | 4.1144E−02 |

| Surface # | 8 | 9 | 10 | 11 | 12 | 13 |
|---|---|---|---|---|---|---|
| k = | −2.7492E+01 | 4.2160E−01 | 4.9330E+01 | 6.4977E+01 | 0.0000E+00 | 0.0000E+00 |
| A4 = | −1.7792E−01 | −2.1398E−01 | −7.5039E−02 | 4.8157E−03 | 7.5135E−02 | −1.3180E−02 |
| A6 = | 2.5534E−02 | 1.1218E−01 | 8.3050E−02 | −1.0067E−01 | −1.4281E−01 | −1.5139E−03 |
| A8 = | 5.0745E−03 | −4.5236E−02 | −4.2888E−02 | 9.1845E−02 | 8.2236E−02 | 3.8853E−04 |
| A10 = | 2.7796E−02 | 1.5484E−02 | 1.1767E−02 | −3.6632E−02 | −2.3190E−02 | −2.6921E−05 |
| A12 = | −2.5270E−02 | −3.9825E−03 | −1.6559E−03 | 7.6442E−03 | 3.4364E−03 | 8.7007E−07 |
| A14 = | 8.0169E−03 | 5.8362E−04 | 8.1700E−05 | −8.2933E−04 | −2.5766E−04 | −1.3807E−08 |
| A16 = | −8.9682E−04 | −3.5377E−05 | 1.9300E−06 | 3.7086E−05 | 7.7441E−06 | 8.8570E−11 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.81 | TL [mm] | 5.99 |
| Fno | 2.70 | TL/f | 0.88 |
| HFOV [deg.] | 22.0 | TL/ImgH | 2.17 |
| V3 + V4 | 75.4 | R10/f | −4.70 |
| V5 | 22.5 | R10/R9 | −1.60 |
| Vmin | 19.4 | f/EPD | 2.70 |
| BL/TL | 0.08 | f/f1 | 2.13 |
| SL/TL | 0.89 | f/f2 | −1.23 |
| T12/CT2 | 0.92 | f/f6 | 0.00 |
| (T45 + T56)/T34 | 0.13 | f/ImgH | 2.47 |
| TD/CT1 | 5.73 | f/R1 | 4.34 |
| TD/T34 | 3.40 | | |

According to the 2nd embodiment, the numbers of inflection points of the object-side surfaces and the image-side surfaces of the first lens element 210, the second lens element 220, the third lens element 230, the fourth lens element 240, the fifth lens element 250 and the sixth lens element 260 are listed as follows.

| 2nd Embodiment - Numbers of inflection points | | | | | | |
|---|---|---|---|---|---|---|
| | 210 | 220 | 230 | 240 | 250 | 260 |
| Object-side surface | 0 | 3 | 1 | 2 | 4 | 2 |
| Image-side surface | 1 | 0 | 0 | 1 | 3 | 0 |

Furthermore, according to the 2nd embodiment of the present disclosure, at least three of the six lens elements of the photographing optical lens assembly have Abbe numbers smaller than 45. Specifically, according to the 2nd embodiment, four lens elements have Abbe numbers smaller than 45, which are the second lens element 220, the third lens element 230, the fifth lens element 250 and the sixth lens element 260.

3rd Embodiment

Figure 5:
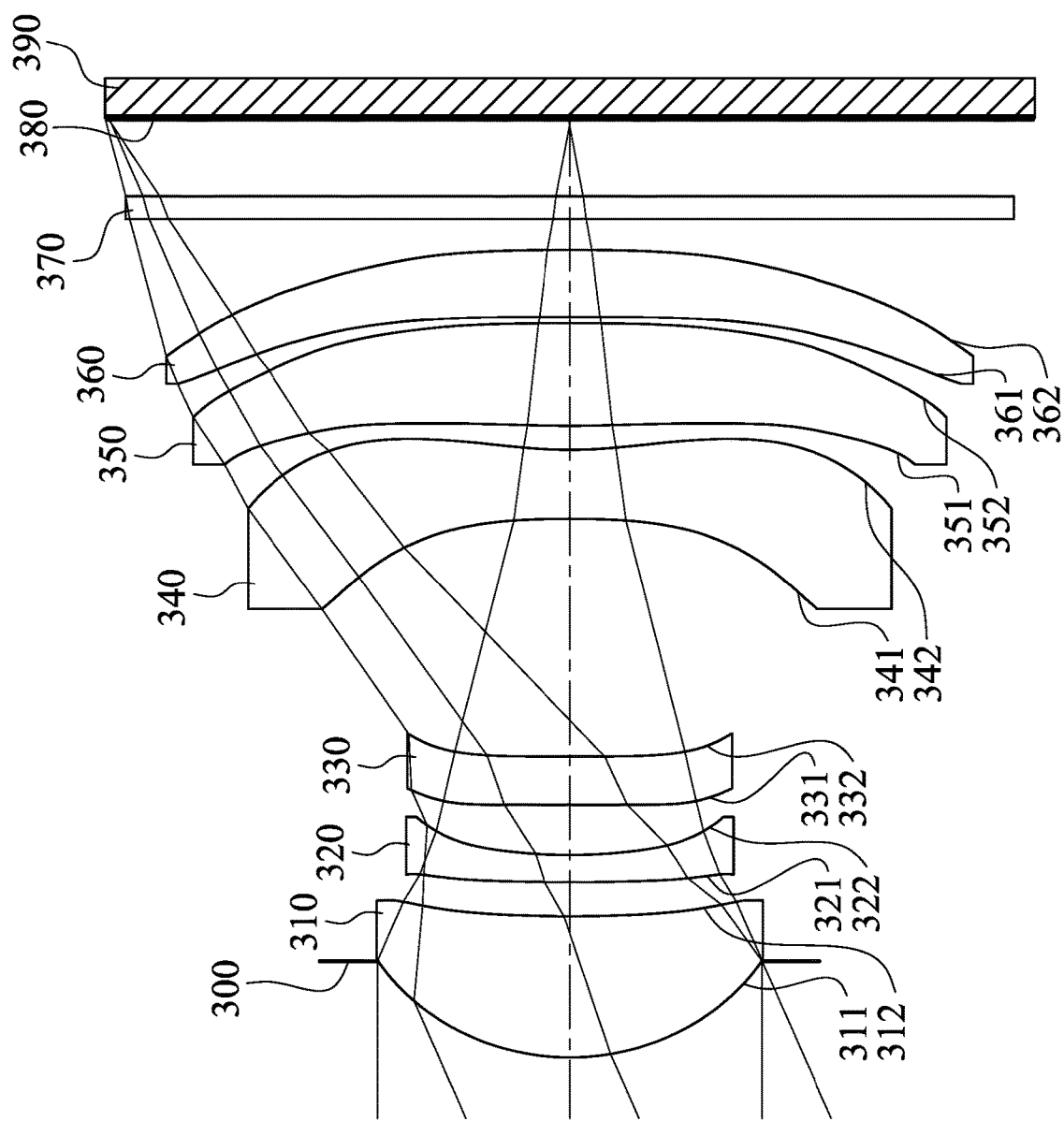
FIG. 5 is a schematic view of an imaging apparatus according to the 3rd embodiment of the present disclosure.
Figure 6:
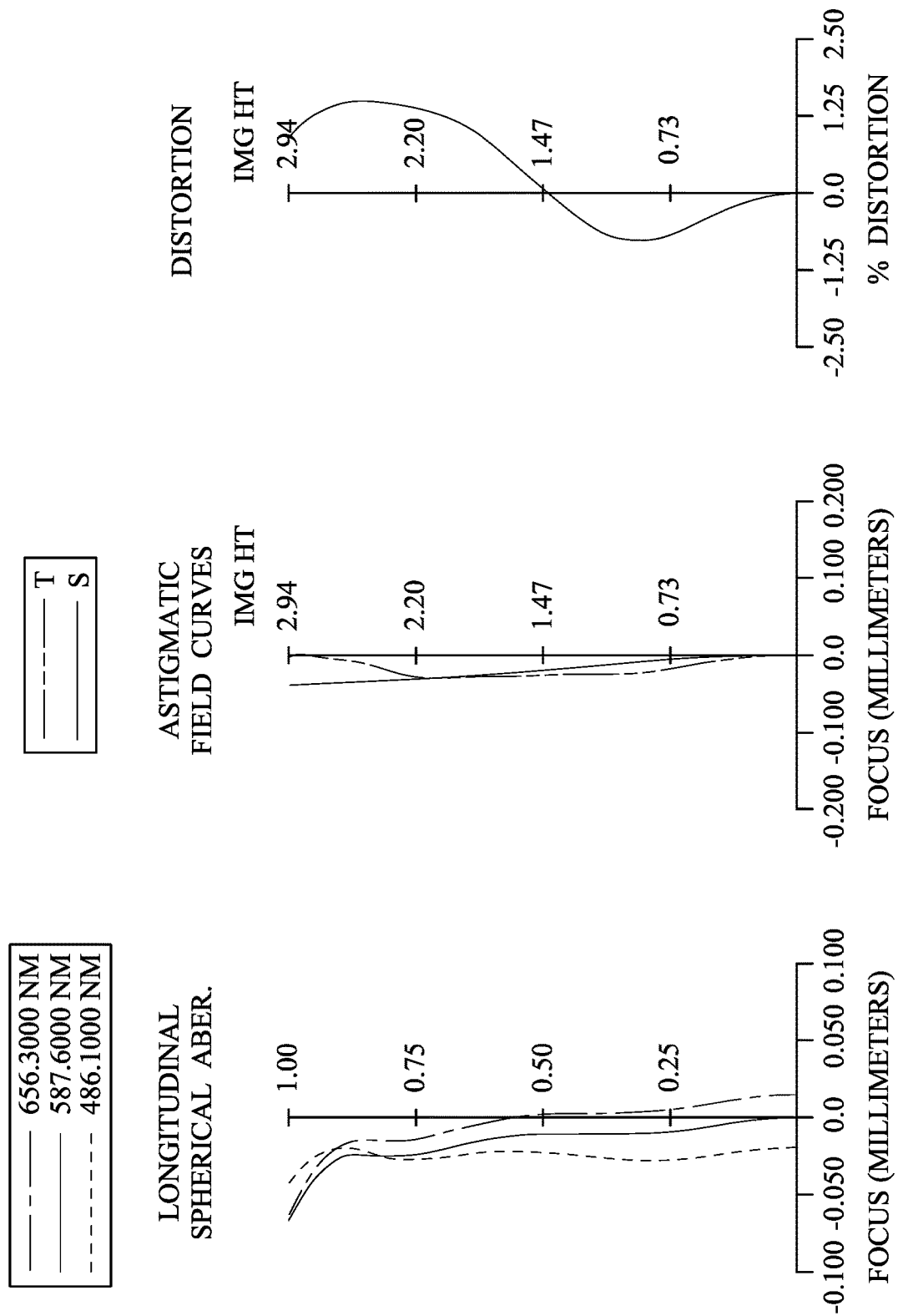
FIG. 6 shows spherical aberration curves, astigmatic field curves and a distortion curve of the imaging apparatus according to the 3rd embodiment.

FIG. 5 is a schematic view of an imaging apparatus according to the 3rd embodiment of the present disclosure. FIG. 6 shows spherical aberration curves, astigmatic field curves and a distortion curve of the imaging apparatus according to the 3rd embodiment. In FIG. 5, the imaging apparatus includes a photographing optical lens assembly (its reference numeral is omitted) and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, a filter 370 and an image surface 380, wherein the image sensor 390 is disposed on the image surface 380 of the photographing optical lens assembly. The photographing optical lens assembly includes six lens elements (310, 320, 330, 340, 350, 360) without additional one or more lens elements inserted between the first lens element 310 and the sixth lens element 360.

The first lens element 310 with positive refractive power has an object-side surface 311 being convex in a paraxial region thereof and an image-side surface 312 being concave in a paraxial region thereof. The first lens element 310 is made of a plastic material, and has the object-side surface 311 and the image-side surface 312 being both aspheric. Furthermore, the image-side surface 312 of the first lens element 310 includes at least one inflection point.

The second lens element 320 with negative refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric. Furthermore, the object-side surface 321 of the second lens element 320 includes at least one inflection point.

The third lens element 330 with negative refractive power has an object-side surface 331 being concave in a paraxial region thereof and an image-side surface 332 being concave in a paraxial region thereof. The third lens element 330 is made of a plastic material, and has the object-side surface 331 and the image-side surface 332 being both aspheric. Furthermore, the object-side surface 331 of the third lens element 330 includes at least one inflection point.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric. Furthermore, each of the object-side surface 341 and the image-side surface 342 of the fourth lens element 340 includes at least one inflection point, and the image-side surface 342 of the fourth lens element 340 includes a shape changing from concave to convex in an off-axis region thereof.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 of the fifth lens element 350 includes at least one inflection point.

The sixth lens element 360 with positive refractive power has an object-side surface 361 being convex in a paraxial region thereof and an image-side surface 362 being convex in a paraxial region thereof. The sixth lens element 360 is made of a plastic material, and has the object-side surface 361 and the image-side surface 362 being both aspheric. Furthermore, each of the object-side surface 361 and the image-side surface 362 of the sixth lens element 360 includes at least one inflection point.

The filter 370 is made of a glass material, which is located between the sixth lens element 360 and the image surface 380 in order, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 6.61 mm, Fno = 2.70, HFOV = 23.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.612 | | | | |
| 2 | Lens 1 | 1.567 | ASP | 0.898 | Plastic | 1.560 | 57.0 | 3.28 |
| 3 | | 8.426 | ASP | 0.217 | | | | |
| 4 | Lens 2 | 11.875 | ASP | 0.177 | Plastic | 1.660 | 20.4 | −7.04 |
| 5 | | 3.321 | ASP | 0.320 | | | | |
| 6 | Lens 3 | −43.290 | ASP | 0.306 | Plastic | 1.639 | 23.3 | −41.89 |
| 7 | | 70.253 | ASP | 1.516 | | | | |
| 8 | Lens 4 | −7.256 | ASP | 0.440 | Plastic | 1.534 | 55.9 | −3.80 |
| 9 | | 2.870 | ASP | 0.152 | | | | |
| 10 | Lens 5 | 7.308 | ASP | 0.654 | Plastic | 1.669 | 19.4 | 10.22 |
| 11 | | −103.093 | ASP | 0.039 | | | | |
| 12 | Lens 6 | 158.904 | ASP | 0.430 | Plastic | 1.544 | 56.0 | 33.91 |
| 13 | | −20.849 | ASP | 0.196 | | | | |
| 14 | Filter | Plano | | 0.145 | Glass | 1.517 | 64.2 | — |
| 15 | | Plano | | 0.498 | | | | |
| 16 | Image | Plano | | — | | | | |

Reference wavelength is 587.6 nm (d-line)
Effective radius of Surface 9 is 2.050 mm

TABLE 6

Aspheric Coefficients

| Surface # | 2 | 3 | 4 | 5 | 6 | 7 |
|---|---|---|---|---|---|---|
| k = | −1.3870E−01 | 3.4372E+01 | 8.9631E+01 | −3.7776E+00 | −9.9000E+01 | 9.0000E+01 |
| A4 = | 6.3682E−03 | 3.3344E−03 | −6.3921E−02 | −4.9805E−02 | 1.1712E−02 | 5.4184E−02 |
| A6 = | 1.1379E−02 | −4.4911E−02 | 1.0621E−02 | 1.2514E−01 | −1.9049E−03 | 5.3540E−02 |
| A8 = | 7.0029E−03 | 1.7704E−01 | 5.4820E−01 | 3.9811E−01 | 4.3199E−01 | 9.1157E−02 |
| A10 = | −4.9569E−03 | −2.2929E−01 | −1.0156E+00 | −5.9215E−01 | −6.7279E−01 | −1.4234E−01 |
| A12 = | 3.0629E−03 | 1.4307E−01 | 7.2505E−01 | 2.3870E−01 | 4.5896E−01 | 9.3603E−02 |
| A14 = | | −3.9067E−02 | −2.0514E−01 | | −1.2854E−01 | −2.9520E−02 |

| Surface # | 8 | 9 | 10 | 11 | 12 | 13 |
|---|---|---|---|---|---|---|
| k = | 1.1642E+01 | −1.1783E+00 | −5.0593E+01 | −9.9000E+01 | −9.9000E+01 | 4.9861E+01 |
| A4 = | −9.8698E−02 | −1.7414E−01 | −1.1945E−01 | −8.5610E−02 | −3.1700E−02 | −4.4525E−02 |
| A6 = | −1.0717E−02 | 1.0901E−01 | 1.4259E−01 | 7.0227E−02 | 6.9423E−03 | 1.4625E−02 |
| A8 = | 4.4529E−02 | −5.2181E−02 | −9.2291E−02 | −3.2433E−02 | −9.9831E−04 | −2.2955E−03 |
| A10 = | −2.0254E−02 | 1.4468E−02 | 3.2323E−02 | 7.4634E−03 | 6.5041E−05 | 1.2975E−04 |
| A12 = | −2.3607E−03 | −2.1867E−03 | −6.3114E−03 | −7.9867E−04 | | |
| A14 = | 3.4047E−03 | 1.5315E−04 | 6.5624E−04 | 2.7265E−05 | | |
| A16 = | −5.5586E−04 | −3.0200E−06 | −2.8936E−05 | 5.4325E−07 | | |

In the 3rd embodiment, the equation of the aspheric surface profiles of the aforementioned lens elements is the same as the equation of the 1st embodiment. Also, the definition's of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.61 | TL [mm] | 5.99 |
| Fno | 2.70 | TL/f | 0.91 |
| HFOV [deg.] | 23.8 | TL/ImgH | 2.04 |
| V3 + V4 | 79.2 | R10/f | −15.60 |
| V5 | 19.4 | R10/R9 | −14.11 |
| Vmin | 19.4 | f/EPD | 2.70 |
| BL/TL | 0.14 | f/f1 | 2.01 |
| SL/TL | 0.90 | f/f2 | −0.94 |
| T12/CT2 | 1.23 | f/f6 | 0.19 |
| (T45 + T56)/T34 | 0.13 | f/ImgH | 2.25 |
| TD/CT1 | 5.73 | f/R1 | 4.22 |
| TD/T34 | 3.40 | | |

According to the 3rd embodiment, the numbers of inflection points of the object-side surfaces and the image-side surfaces of the first lens element 310, the second lens element 320, the third lens element 330, the fourth lens element 340, the fifth lens element 350 and the sixth lens element 360 are listed as follows.

| 3rd Embodiment - Numbers of inflection points | | | | | | |
|---|---|---|---|---|---|---|
| | 310 | 320 | 330 | 340 | 350 | 360 |
| Object-side surface | 0 | 1 | 1 | 1 | 1 | 2 |
| Image-side surface | 1 | 0 | 0 | 1 | 0 | 1 |

Furthermore, according to the 3rd embodiment of the present disclosure, at least three of the six lens elements of the photographing optical lens assembly have Abbe numbers smaller than 45. Specifically, according to the 3rd embodiment, three lens elements have Abbe numbers smaller than 45, which are the second lens element 320, the third lens element 330 and the fifth lens element 350.

4th Embodiment

Figure 7:
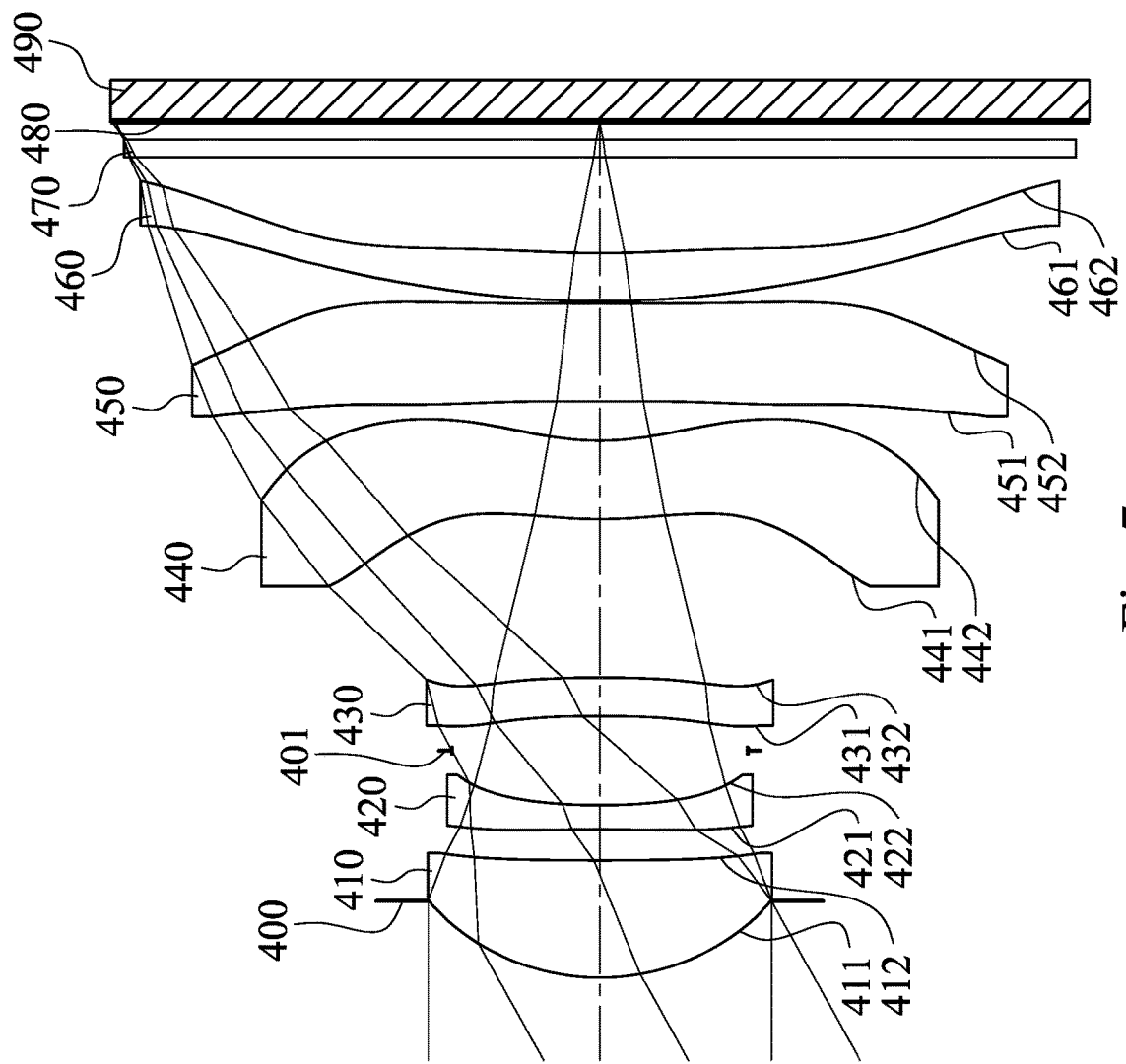
FIG. 7 is a schematic view of an imaging apparatus according to the 4th embodiment of the present disclosure.
Figure 8:
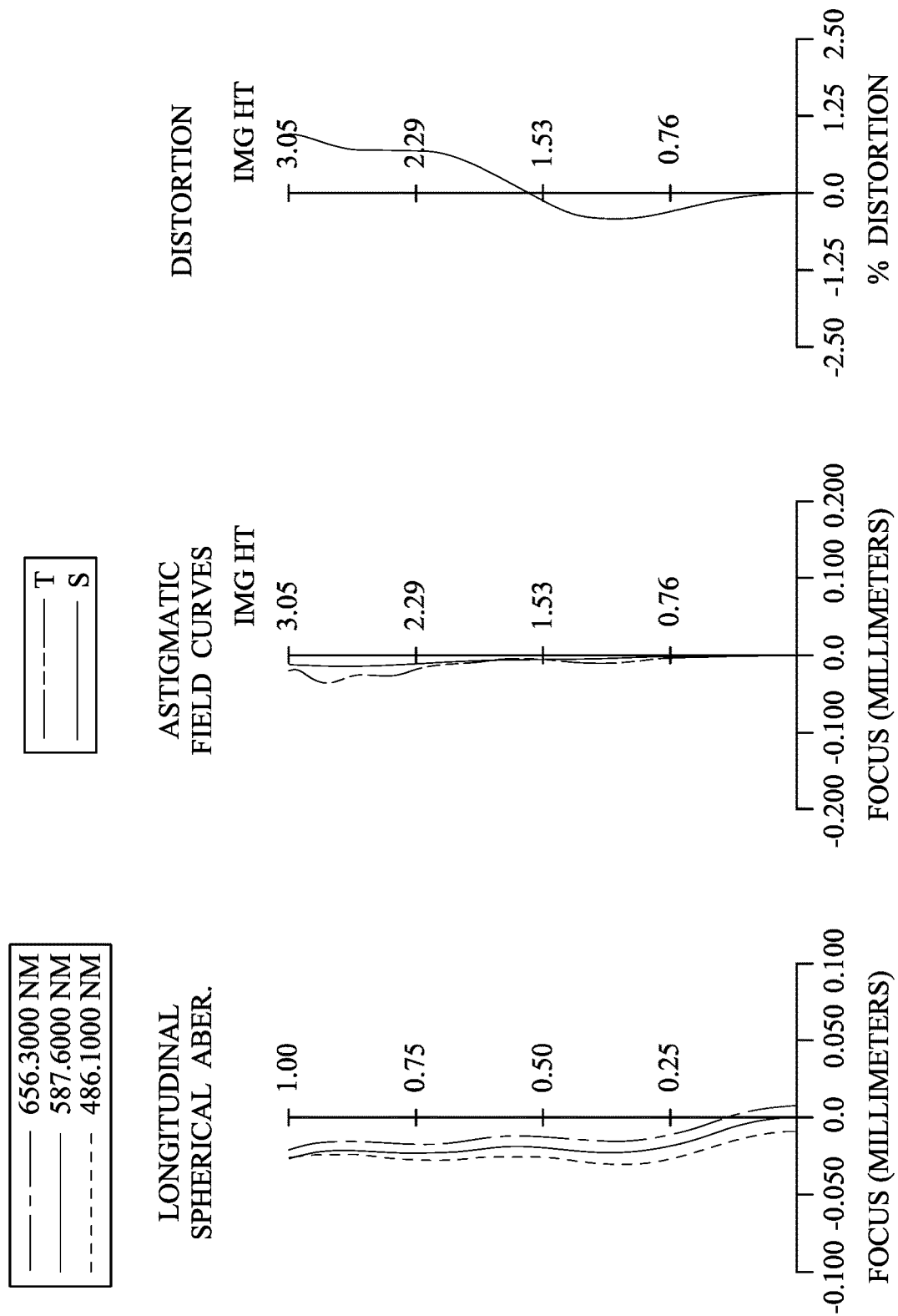
FIG. 8 shows spherical aberration curves, astigmatic field curves and a distortion curve of the imaging apparatus according to the 4th embodiment.

FIG. 7 is a schematic view of an imaging apparatus according to the 4th embodiment of the present disclosure. FIG. 8 shows spherical aberration curves, astigmatic field curves and a distortion curve of the imaging apparatus according to the 4th embodiment. In FIG. 7, the imaging apparatus includes a photographing optical lens assembly (its reference numeral is omitted) and an image sensor 490. The photographing optical lens assembly includes, in order from an object side to an image side, an aperture stop 400, a first lens element 410, a second lens element 420, a stop 401, a third lens element 430, a fourth lens element 440, a fifth lens element 450, a sixth lens element 460, a filter 470 and an image surface 480, wherein the image sensor 490 is disposed on the image surface 480 of the photographing optical lens assembly. The photographing optical lens assembly includes six lens elements (410, 420, 430, 440, 450, 460) without additional one or more lens elements inserted between the first lens element 410 and the sixth lens element 460.

The first lens element 410 with positive refractive power has an object-side surface 411 being convex in a paraxial region thereof and an image-side surface 412 being concave in a paraxial region thereof. The first lens element 410 is made of a plastic material, and has the object-side surface 411 and the image-side surface 412 being both aspheric. Furthermore, the image-side surface 412 of the first lens element 410 includes at least one inflection point.

The second lens element 420 with negative refractive power has an object-side surface 421 being concave in a paraxial region thereof and an image-side surface 422 being concave in a paraxial region thereof. The second lens element 420 is made of a plastic material, and has the object-side surface 421 and the image-side surface 422 being both aspheric. Furthermore, the object-side surface 421 of the second lens element 420 includes at least one inflection point.

The third lens element 430 with negative refractive power has an object-side surface 431 being concave in a paraxial region thereof and an image-side surface 432 being convex in a paraxial region thereof. The third lens element 430 is made of a plastic material, and has the object-side surface 431 and the image-side surface 432 being both aspheric. Furthermore, each of the object-side surface 431 and the image-side surface 432 of the third lens element 430 includes at least one inflection point.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, each of the object-side surface 441 and the image-side surface 442 of the fourth lens element 440 includes at least one inflection point, and the image-side surface 442 of the fourth lens element 440 includes a shape changing from concave to convex in an off-axis region thereof.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with positive refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point.

The filter 470 is made of a glass material, which is located between the sixth lens element 460 and the image surface 480 in order, and will not affect the focal length of the photographing optical lens assembly.

The detailed optical data of the 4th embodiment are shown in Table 7 and the aspheric surface data are shown in Table 8 below.

TABLE 7

4th Embodiment
f = 5.47 mm, Fno = 2.55, HFOV = 29.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.479 | | | | |
| 2 | Lens 1 | 1.466 | ASP | 0.733 | Plastic | 1.545 | 56.1 | 2.83 |
| 3 | | 24.112 | ASP | 0.194 | | | | |
| 4 | Lens 2 | −18.649 | ASP | 0.152 | Plastic | 1.639 | 23.5 | −4.98 |
| 5 | | 3.848 | ASP | 0.340 | | | | |
| 6 | Stop | Plano | | 0.215 | | | | |
| 7 | Lens 3 | −10.743 | ASP | 0.244 | Plastic | 1.669 | 19.4 | −184.35 |
| 8 | | −11.875 | ASP | 0.991 | | | | |
| 9 | Lens 4 | 2.870 | ASP | 0.491 | Plastic | 1.544 | 56.0 | −8.28 |
| 10 | | 1.648 | ASP | 0.250 | | | | |
| 11 | Lens 5 | 106.789 | ASP | 0.612 | Plastic | 1.614 | 26.0 | 113.52 |
| 12 | | −200.000 | ASP | 0.015 | | | | |
| 13 | Lens 6 | 6.538 | ASP | 0.300 | Plastic | 1.650 | 21.8 | 184.60 |
| 14 | | 6.790 | ASP | 0.600 | | | | |
| 15 | Filter | Plano | | 0.110 | Glass | 1.517 | 64.2 | — |
| 16 | | Plano | | 0.114 | | | | |
| 17 | Image | Plano | | — | | | | |

Reference wavelength is 587.6 nm (d-line)
Effective radius of Surface 6 (stop) is 0.925 mm

TABLE 8

Aspheric Coefficients

| Surface # | 2 | 3 | 4 | 5 | 7 | 8 |
|---|---|---|---|---|---|---|
| k = | −2.4126E−01 | 5.6022E+01 | −9.9000E+01 | −3.0914E+01 | −3.6678E+01 | −7.9353E+01 |
| A4 = | 1.3258E−02 | −4.4611E−03 | −1.1545E−02 | 6.2698E−02 | −1.9236E−01 | −1.7528E−01 |
| A6 = | −2.9121E−03 | 6.4611E−02 | 2.4946E−01 | 2.7743E−01 | 1.8888E−01 | 2.0480E−01 |
| A8 = | 2.5008E−02 | −8.5595E−02 | −3.4494E−01 | −5.0372E−01 | −5.5260E−02 | −1.0281E−01 |
| A10 = | −2.3198E−02 | 8.5103E−02 | 2.8297E−01 | 7.9774E−01 | 1.8117E−01 | 1.4574E−01 |
| A12 = | 1.2768E−02 | −3.6183E−02 | −1.2639E−01 | −6.6246E−01 | −1.7346E−01 | −7.2302E−02 |
| A14 = | | | | 2.2324E−01 | 3.6520E−02 | |

| Surface # | 9 | 10 | 11 | 12 | 13 | 14 |
|---|---|---|---|---|---|---|
| k = | −8.4337E−01 | −8.1926E+00 | −9.9000E+01 | 9.0000E+01 | −1.2346E+00 | −6.0996E+00 |
| A4 = | −2.3419E−01 | −7.1472E−02 | −7.9946E−02 | 1.4504E−02 | 1.2288E−03 | −7.4329E−02 |
| A6 = | 8.4042E−02 | −3.6796E−02 | 8.8904E−02 | −3.9888E−03 | −2.3074E−03 | 3.9729E−02 |
| A8 = | −1.0231E−01 | 5.5512E−02 | −4.0551E−02 | −1.8634E−03 | 8.9291E−04 | −8.9605E−03 |
| A10 = | 1.0412E−01 | −2.8835E−02 | 8.1368E−03 | 3.2944E−04 | −1.5666E−04 | 1.0542E−03 |
| A12 = | −5.2007E−02 | 7.5313E−03 | −3.2585E−04 | 4.4562E−05 | 1.2315E−05 | −6.4308E−05 |
| A14 = | 1.2596E−02 | −9.3690E−04 | −1.4252E−04 | −1.0922E−05 | −3.7321E−07 | 1.6100E−06 |
| A16 = | −1.1850E−03 | 2.8379E−05 | 2.3320E−05 | 5.0541E−07 | | |
| A18 = | | 2.6135E−06 | −1.1152E−06 | | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.47 | TL [mm] | 5.36 |
| Fno | 2.55 | TL/f | 0.98 |
| HFOV [deg.] | 29.0 | TL/ImgH | 1.76 |
| V3 + V4 | 75.4 | R10/f | −36.54 |
| V5 | 26.0 | R10/R9 | −1.87 |
| Vmin | 19.4 | f/EPD | 2.55 |
| BL/TL | 0.15 | f/f1 | 1.93 |
| SL/TL | 0.91 | f/f2 | −1.10 |
| T12/CT2 | 1.28 | f/f6 | 0.03 |
| (T45 + T56)/T34 | 0.27 | f/ImgH | 1.79 |
| TD/CT1 | 6.19 | f/R1 | 3.73 |
| TD/T34 | 4.58 | | |

According to the 4th embodiment, the numbers of inflection points of the object-side surfaces and the image-side surfaces of the first lens element 410, the second lens element 420, the third lens element 430, the fourth lens element 440, the fifth lens element 450 and the sixth lens element 460 are listed as follows.

4th Embodiment - Numbers of inflection points

|  | 410 | 420 | 430 | 440 | 450 | 460 |
|---|---|---|---|---|---|---|
| Object-side surface | 0 | 2 | 1 | 2 | 5 | 1 |
| Image-side surface | 1 | 0 | 1 | 2 | 4 | 3 |

Furthermore, according to the 4th embodiment of the present disclosure, at least three of the six lens elements of the photographing optical lens assembly have Abbe numbers smaller than 45. Specifically, according to the 4th embodiment, four lens elements have Abbe numbers smaller than 45, which are the second lens element 420, the third lens element 430, the fifth lens element 450 and the sixth lens element 460.

5th Embodiment

Figure 9:
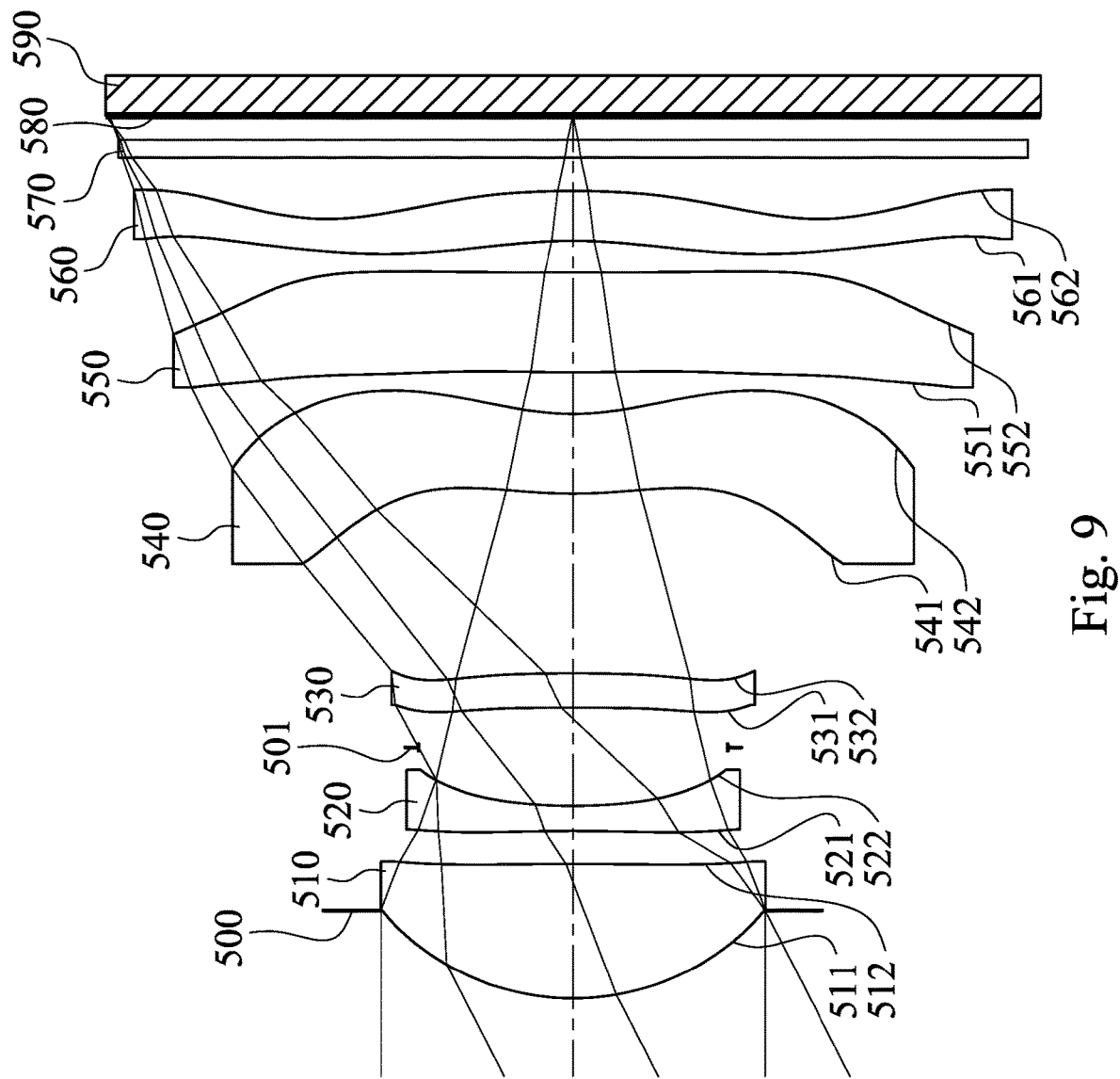
FIG. 9 is a schematic view of an imaging apparatus according to the 5th embodiment of the present disclosure.
Figure 10:
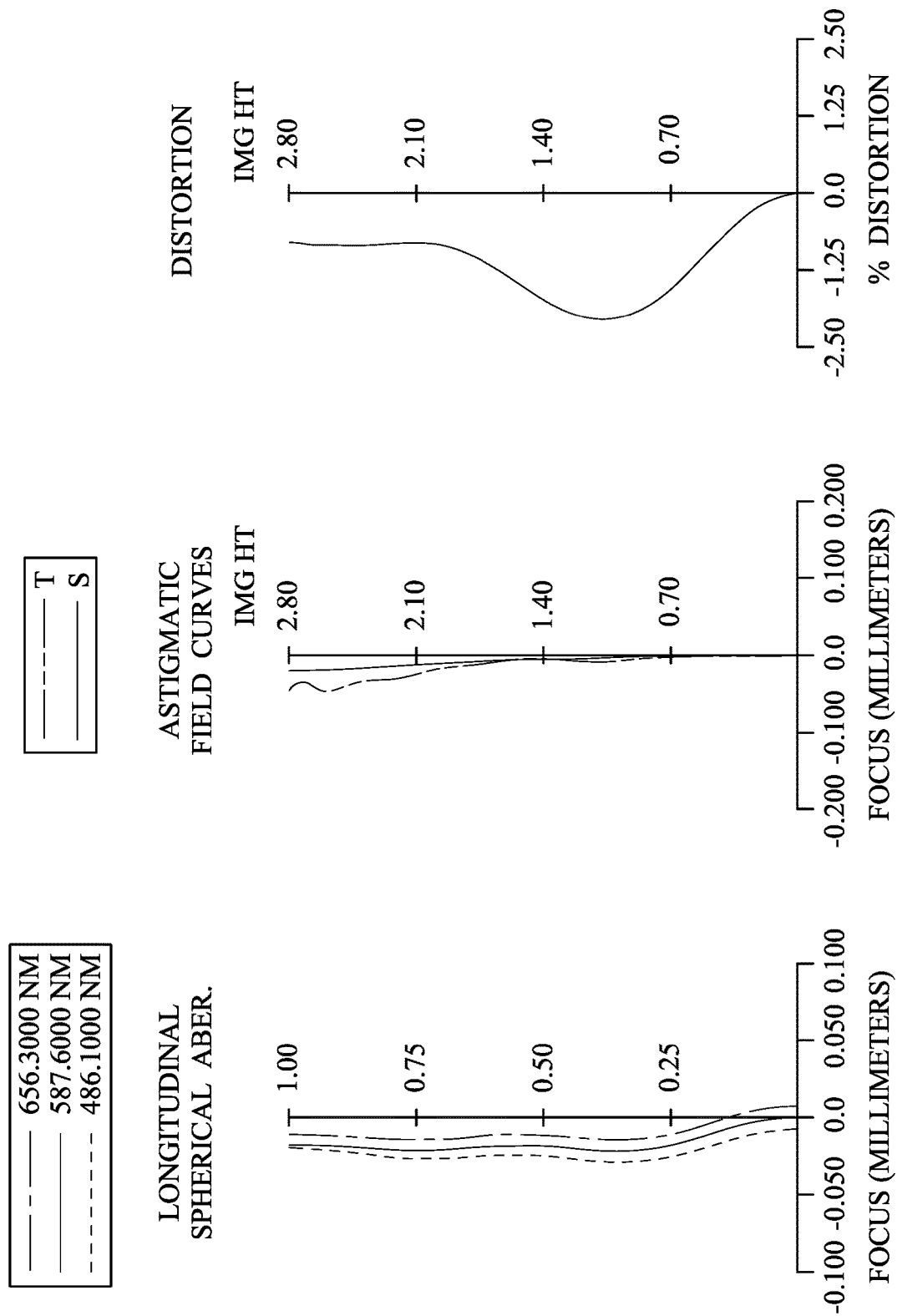
FIG. 10 shows spherical aberration curves, astigmatic field curves and a distortion curve of the imaging apparatus according to the 5th embodiment.

FIG. 9 is a schematic view of an imaging apparatus according to the 5th embodiment of the present disclosure. FIG. 10 shows spherical aberration curves, astigmatic field curves and a distortion curve of the imaging apparatus according to the 5th embodiment. In FIG. 9, the imaging apparatus includes a photographing optical lens assembly (its reference numeral is omitted) and an image sensor 590. The photographing optical lens assembly includes, in order from an object side to an image side, an aperture stop 500, a first lens element 510, a second lens element 520, a stop 501, a third lens element 530, a fourth lens element 540, a fifth lens element 550, a sixth lens element 560, a filter 570 and an image surface 580, wherein the image sensor 590 is disposed on the image surface 580 of the photographing optical lens assembly. The photographing optical lens assembly includes six lens elements (510, 520, 530, 540, 550, 560) without additional one or more lens elements inserted between the first lens element 510 and the sixth lens element 560.

The first lens element 510 with positive refractive power has an object-side surface 511 being convex in a paraxial region thereof and an image-side surface 512 being convex in a paraxial region thereof. The first lens element 510 is made of a plastic material, and has the object-side surface 511 and the image-side surface 512 being both aspheric. Furthermore, the image-side surface 512 of the first lens element 510 includes at least one inflection point.

The second lens element 520 with negative refractive power has an object-side surface 521 being concave in a paraxial region thereof and an image-side surface 522 being concave in a paraxial region thereof. The second lens element 520 is made of a plastic material, and has the object-side surface 521 and the image-side surface 522 being both aspheric. Furthermore, the object-side surface 521 of the second lens element 520 includes at least one inflection point.

The third lens element 530 with positive refractive power has an object-side surface 531 being concave in a paraxial region thereof and an image-side surface 532 being convex in a paraxial region thereof. The third lens element 530 is made of a plastic material, and has the object-side surface 531 and the image-side surface 532 being both aspheric. Furthermore, each of the object-side surface 531 and the image-side surface 532 of the third lens element 530 includes at least one inflection point.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, each of the object-side surface 541 and the image-side surface 542 of the fourth lens element 540 includes at least one inflection point, and the image-side surface 542 of the fourth lens element 540 includes a shape changing from concave to convex in an off-axis region thereof.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, each of the object-side surface 551 and the image-side surface 552 of the fifth lens element 550 includes at least one inflection point.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point.

The filter 570 is made of a glass material, which is located between the sixth lens element 560 and the image surface 580 in order, and will not affect the focal length of the photographing optical lens assembly.

The detailed optical data of the 5th embodiment are shown in Table 9 and the aspheric surface data are shown in Table 10 below.

TABLE 9

5th Embodiment
f = 5.52 mm, Fno = 2.39, HFOV = 27.2 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.530 |  |  |  |  |
| 2 | Lens 1 | 1.531 | ASP | 0.809 | Plastic | 1.545 | 56.1 | 2.70 |
| 3 |  | −29.768 | ASP | 0.199 |  |  |  |  |
| 4 | Lens 2 | −12.456 | ASP | 0.150 | Plastic | 1.639 | 23.5 | −3.88 |
| 5 |  | 3.106 | ASP | 0.352 |  |  |  |  |
| 6 | Stop | Plano |  | 0.239 |  |  |  |  |
| 7 | Lens 3 | −200.000 | ASP | 0.210 | Plastic | 1.680 | 18.4 | 27.70 |
| 8 |  | −17.222 | ASP | 1.080 |  |  |  |  |
| 9 | Lens 4 | 2.970 | ASP | 0.484 | Plastic | 1.544 | 56.0 | −7.27 |

TABLE 9-continued

5th Embodiment
f = 5.52 mm, Fno = 2.39, HFOV = 27.2 deg.

| Surface # | | Curvature Radius | | Thickness | Material | Index | Abbe # | Focal Length |
|---|---|---|---|---|---|---|---|---|
| 10 | | 1.599 | ASP | 0.250 | | | | |
| 11 | Lens 5 | 10.601 | ASP | 0.600 | Plastic | 1.614 | 26.0 | 16.42 |
| 12 | | −200.000 | ASP | 0.190 | | | | |
| 13 | Lens 6 | −3.029 | ASP | 0.300 | Plastic | 1.642 | 22.5 | −11.97 |
| 14 | | −5.195 | ASP | 0.200 | | | | |
| 15 | Filter | Plano | | 0.110 | Glass | 1.517 | 64.2 | — |
| 16 | | Plano | | 0.146 | | | | |
| 17 | Image | Plano | | — | | | | |

Reference wavelength is 587.6 nm (d-line)
Effective radius of Surface 6 (stop) is 0.930 mm

TABLE 10

Aspheric Coefficients

| Surface # | 2 | 3 | 4 | 5 | 7 | 8 |
|---|---|---|---|---|---|---|
| k = | −2.9950E−01 | 3.9824E+01 | −6.0193E+01 | −2.8538E+01 | −9.9000E+01 | −9.9000E+01 |
| A4 = | 1.2753E−02 | 1.3774E−02 | 1.5872E−02 | 1.3064E−01 | −1.6825E−01 | −1.5614E−01 |
| A6 = | −4.4705E−03 | 3.5003E−02 | 1.5011E−01 | 8.1066E−02 | 1.8990E−01 | 1.8109E−01 |
| A8 = | 1.8988E−02 | −4.5971E−02 | −2.1889E−01 | −1.4776E−01 | −1.4602E−01 | −1.0968E−01 |
| A10 = | −1.4503E−02 | 3.5448E−02 | 1.5261E−01 | 2.4142E−01 | 3.1054E−01 | 1.6128E−01 |
| A12 = | 6.3436E−03 | −1.1857E−02 | −5.3257E−02 | −1.8664E−01 | −2.5167E−01 | −7.1181E−02 |
| A14 = | | | | 6.2724E−02 | 6.3201E−02 | |

| Surface # | 9 | 10 | 11 | 12 | 13 | 14 |
|---|---|---|---|---|---|---|
| k = | −2.0925E+00 | −8.9661E+00 | −9.8362E+01 | −9.9000E+01 | −2.0060E+01 | −5.5960E+01 |
| A4 = | −2.3395E−01 | −7.2431E−02 | −1.0247E−01 | 3.1757E−02 | 5.1602E−02 | −9.6956E−02 |
| A6 = | 1.4141E−01 | 2.4968E−04 | 7.3516E−02 | −4.3046E−02 | −8.3550E−03 | 7.4041E−02 |
| A8 = | −1.9625E−01 | 6.6630E−03 | −1.0326E−02 | 2.9727E−02 | −1.8489E−03 | −2.1285E−02 |
| A10 = | 1.7373E−01 | 8.3436E−03 | −1.0689E−02 | −1.2990E−02 | 8.9884E−04 | 3.1607E−03 |
| A12 = | −8.0554E−02 | −7.1291E−03 | 5.7661E−03 | 3.0553E−03 | −1.2705E−04 | −2.4564E−04 |
| A14 = | 1.8842E−02 | 2.5411E−03 | −1.2253E−03 | −3.5427E−04 | 6.1767E−06 | 7.9157E−06 |
| A16 = | −1.7453E−03 | −4.3139E−04 | 1.2294E−04 | 1.6008E−05 | | |
| A18 = | | 2.8490E−05 | −4.8082E−06 | | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.52 | TL [mm] | 5.32 |
| Fno | 2.39 | TL/f | 0.96 |
| HFOV [deg.] | 27.2 | TL/ImgH | 1.90 |
| V3 + V4 | 74.4 | R10/f | −36.25 |
| V5 | 26.0 | R10/R9 | −18.87 |
| Vmin | 18.4 | f/EPD | 2.39 |
| BL/TL | 0.09 | f/f1 | 2.05 |
| SL/TL | 0.90 | f/f2 | −1.42 |
| T12/CT2 | 1.33 | f/f6 | −0.46 |
| (T45 + T56)/T34 | 0.41 | f/ImgH | 1.97 |
| TD/CT1 | 6.01 | f/R1 | 3.60 |
| TD/T34 | 4.50 | | |

According to the 5th embodiment, the numbers of inflection points of the object-side surfaces and the image-side surfaces of the first lens element 510, the second lens element 520, the third lens element 530, the fourth lens element 540, the fifth lens element 550 and the sixth lens element 560 are listed as follows.

| 5th Embodiment - Numbers of inflection points | | | | | | |
|---|---|---|---|---|---|---|
| | 510 | 520 | 530 | 540 | 550 | 560 |
| Object-side surface | 0 | 2 | 1 | 2 | 6 | 2 |
| Image-side surface | 1 | 0 | 1 | 1 | 5 | 2 |

Furthermore, according to the 5th embodiment of the present disclosure, at least three of the six lens elements of the photographing optical lens assembly have Abbe numbers smaller than 45. Specifically, according to the 5th embodiment, four lens elements have Abbe numbers smaller than 45, which are the second lens element 520, the third lens element 530, the fifth lens element 550 and the sixth lens element 560.

6th Embodiment

Figure 11:
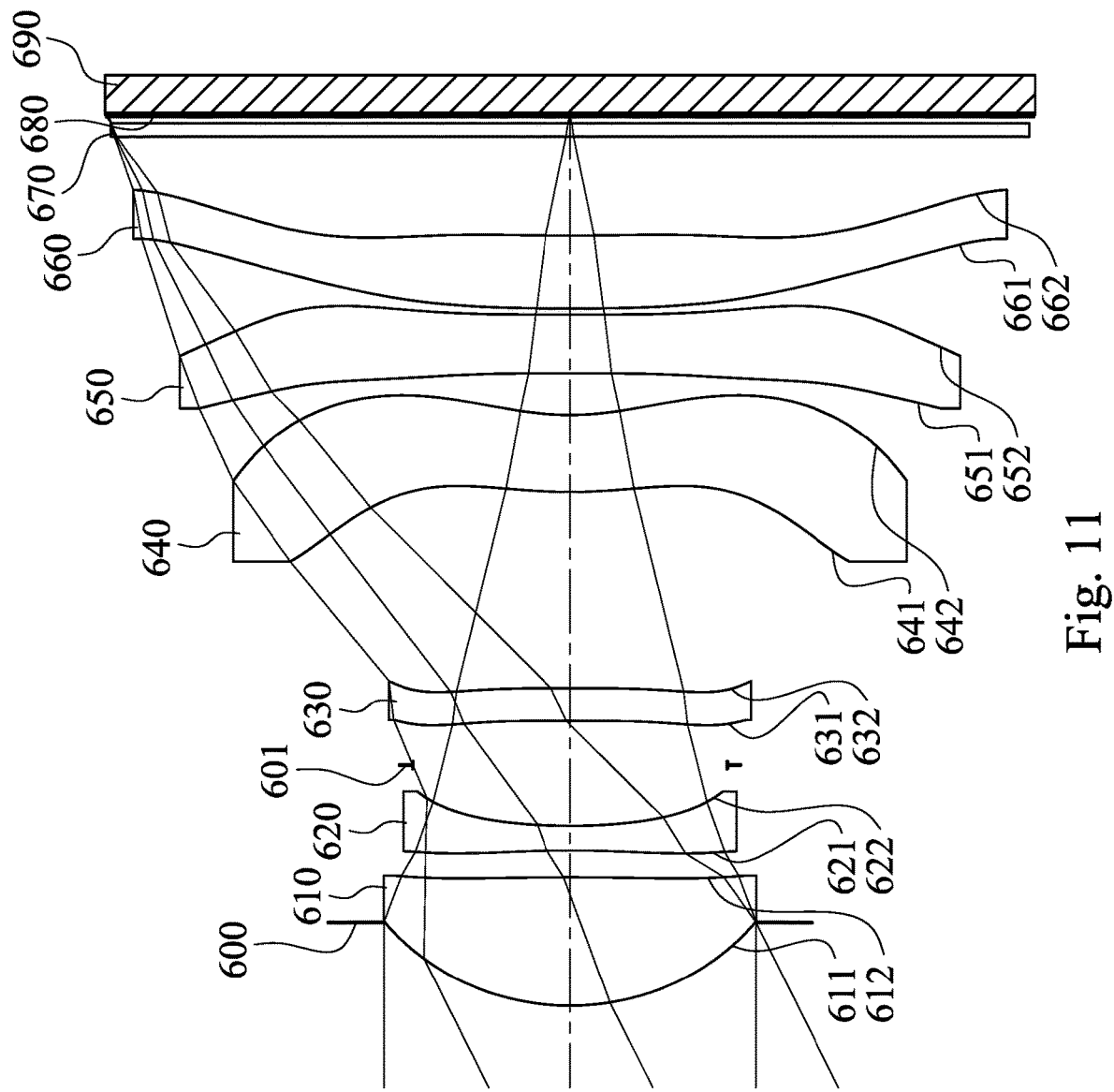
FIG. 11 is a schematic view of an imaging apparatus according to the 6th embodiment of the present disclosure.
Figure 12:
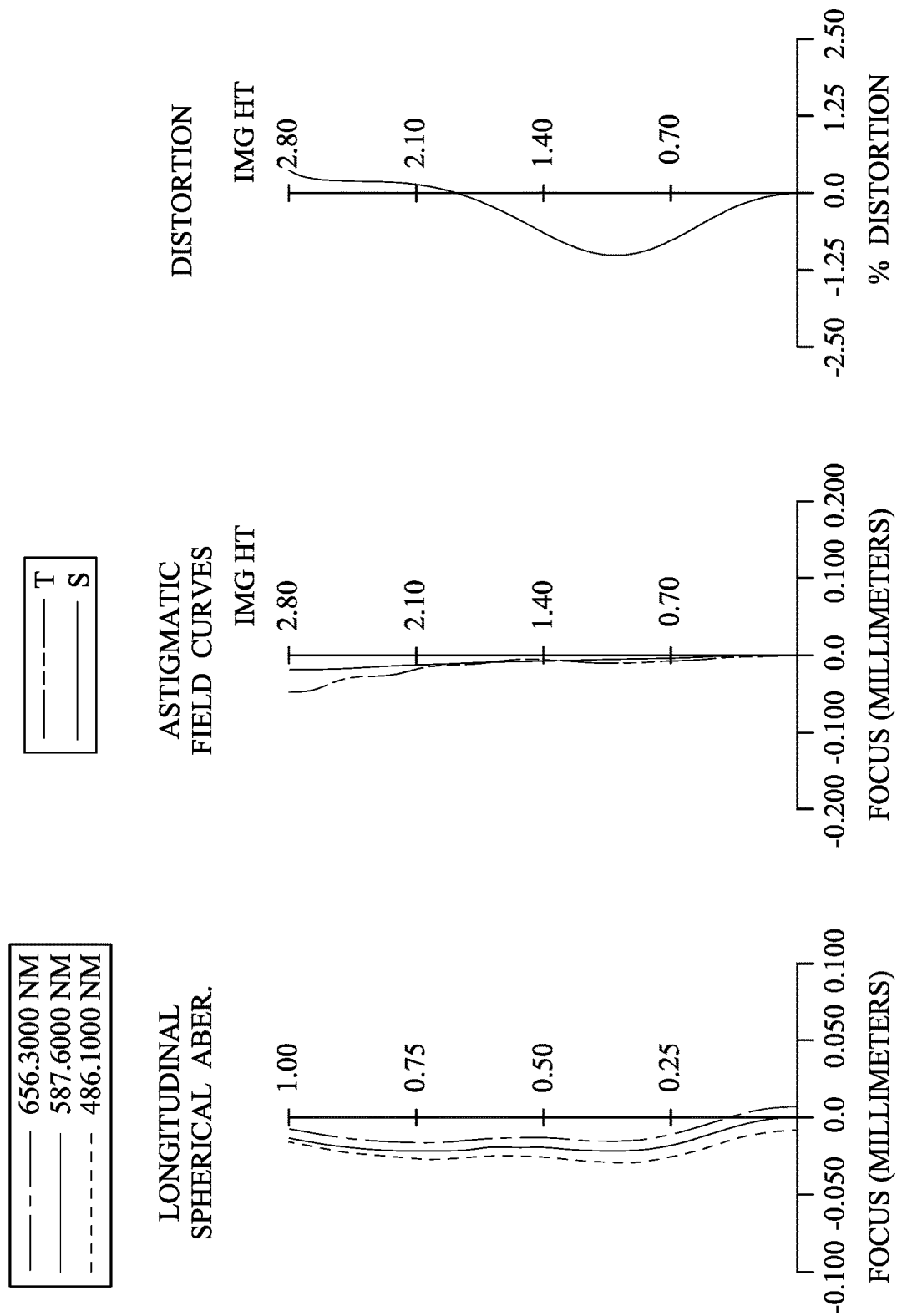
FIG. 12 shows spherical aberration curves, astigmatic field curves and a distortion curve of the imaging apparatus according to the 6th embodiment.

FIG. 11 is a schematic view of an imaging apparatus according to the 6th embodiment of the present disclosure. FIG. 12 shows spherical aberration curves, astigmatic field curves and a distortion curve of the imaging apparatus according to the 6th embodiment. In FIG. 11, the imaging apparatus includes a photographing optical lens assembly (its reference numeral is omitted) and an image sensor 690. The photographing optical lens assembly includes, in order from an object side to an image side, an aperture stop 600, a first lens element 610, a second lens element 620, a stop 601, a third lens element 630, a fourth lens element 640, a fifth lens element 650, a sixth lens element 660, a filter 670 and an image surface 680, wherein the image sensor 690 is disposed on the image surface 680 of the photographing optical lens assembly. The photographing optical lens assembly includes six lens elements (610, 620, 630, 640, 650, 660) without additional one or more lens elements inserted between the first lens element 610 and the sixth lens element 660.

The first lens element 610 with positive refractive power has an object-side surface 611 being convex in a paraxial region thereof and an image-side surface 612 being convex in a paraxial region thereof. The first lens element 610 is made of a plastic material, and has the object-side surface 611 and the image-side surface 612 being both aspheric. Furthermore, the image-side surface 612 of the first lens element 610 includes at least one inflection point.

The second lens element 620 with negative refractive power has an object-side surface 621 being concave in a paraxial region thereof and an image-side surface 622 being concave in a paraxial region thereof. The second lens element 620 is made of a plastic material, and has the object-side surface 621 and the image-side surface 622 being both aspheric. Furthermore, the object-side surface 621 of the second lens element 620 includes at least one inflection point.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric. Furthermore, each of the object-side surface 631 and the image-side surface 632 of the third lens element 630 includes at least one inflection point.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, each of the object-side surface 641 and the image-side surface 642 of the fourth lens element 640 includes at least one inflection point, and the image-side surface 642 of the fourth lens element 640 includes a shape changing from concave to convex in an off-axis region thereof.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric. Furthermore, each of the object-side surface 651 and the image-side surface 652 of the fifth lens element 650 includes at least one inflection point.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, each of the object-side surface 661 and the image-side surface 662 of the sixth lens element 660 includes at least one inflection point.

The filter 670 is made of a glass material, which is located between the sixth lens element 660 and the image surface 680 in order, and will not affect the focal length of the photographing optical lens assembly.

The detailed optical data of the 6th embodiment are shown in Table 11 and the aspheric surface data are shown in Table 12 below.

TABLE 11

6th Embodiment
f = 5.59 mm, Fno = 2.49, HFOV = 26.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.505 | | | | |
| 2 | Lens 1 | 1.521 | ASP | 0.778 | Plastic | 1.545 | 56.1 | 2.62 |
| 3 | | −19.396 | ASP | 0.161 | | | | |
| 4 | Lens 2 | −7.114 | ASP | 0.150 | Plastic | 1.614 | 26.0 | −3.89 |
| 5 | | 3.625 | ASP | 0.366 | | | | |
| 6 | Stop | Plano | | 0.267 | | | | |
| 7 | Lens 3 | 143.043 | ASP | 0.200 | Plastic | 1.688 | 18.7 | 84.30 |
| 8 | | −97.498 | ASP | 1.186 | | | | |
| 9 | Lens 4 | 3.095 | ASP | 0.468 | Plastic | 1.544 | 56.0 | −8.58 |
| 10 | | 1.762 | ASP | 0.250 | | | | |
| 11 | Lens 5 | 99.818 | ASP | 0.355 | Plastic | 1.660 | 20.4 | 100.94 |
| 12 | | −200.000 | ASP | 0.036 | | | | |
| 13 | Lens 6 | 16.656 | ASP | 0.440 | Plastic | 1.688 | 18.7 | −44.52 |
| 14 | | 10.673 | ASP | 0.602 | | | | |
| 15 | Filter | Plano | | 0.080 | Glass | 1.517 | 64.2 | — |
| 16 | | Plano | | 0.051 | | | | |
| 17 | Image | Plano | | — | | | | |

Reference wavelength is 587.6 nm (d-line)
Effective radius of Surface 6 (stop) is 0.950 mm

TABLE 12

Aspheric Coefficients

| Surface # | | | | | | |
|---|---|---|---|---|---|---|
| | 2 | 3 | 4 | 5 | 7 | 8 |
| k = | −2.7454E−01 | −9.9000E+01 | −6.7376E+01 | −3.2452E+01 | 9.0000E+01 | −9.9000E+01 |
| A4 = | 1.3479E−02 | 1.3971E−02 | 1.2816E−02 | 1.0798E−01 | −1.7682E−01 | −1.5516E−01 |
| A6 = | −2.9834E−03 | 4.1519E−02 | 1.5439E−01 | 1.1962E−01 | 1.6418E−01 | 1.7799E−01 |
| A8 = | 1.8617E−02 | −5.6148E−02 | −2.2026E−01 | −2.2891E−01 | −2.7067E−02 | −6.7291E−02 |
| A10 = | −1.4957E−02 | 4.7997E−02 | 1.6673E−01 | 3.7990E−01 | 1.1955E−01 | 1.1003E−01 |
| A12 = | 7.2875E−03 | −1.7961E−02 | −6.2611E−02 | −3.0876E−01 | −1.2271E−01 | −5.6528E−02 |
| A14 = | | | | 1.1213E−01 | 2.9243E−02 | |

| Surface # | | | | | | |
|---|---|---|---|---|---|---|
| | 9 | 10 | 11 | 12 | 13 | 14 |
| k = | −7.4334E−01 | −8.6006E+00 | 6.5014E+00 | −9.9000E+01 | 3.5795E+01 | 9.0876E−01 |
| A4 = | −1.9320E−01 | −6.4659E−02 | −8.7915E−02 | 5.7742E−02 | 3.4839E−02 | −1.1261E−01 |
| A6 = | 3.1852E−02 | −7.0773E−02 | 7.7161E−02 | −3.1135E−02 | −1.0580E−02 | 7.7734E−02 |
| A8 = | −4.0416E−02 | 9.5263E−02 | −1.8723E−02 | 8.0142E−03 | 1.1545E−03 | −2.2879E−02 |
| A10 = | 5.0567E−02 | −5.4295E−02 | −7.5584E−03 | −2.9567E−03 | 3.1217E−06 | 3.5370E−03 |
| A12 = | −2.5815E−02 | 1.6696E−02 | 5.4222E−03 | 8.5514E−04 | −8.1698E−06 | −2.8295E−04 |
| A14 = | 6.1233E−03 | −2.7565E−03 | −1.2791E−03 | −1.1777E−04 | 1.7811E−07 | 9.1909E−06 |
| A16 = | −5.5546E−04 | 2.0951E−04 | 1.3923E−04 | 5.9826E−06 | | |
| A18 = | | −4.0565E−06 | −5.9078E−06 | | | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following condition:

| 6th Embodiment | | | |
|---|---|---|---|
| f [mm] | 5.59 | TL [mm] | 5.39 |
| Fno | 2.49 | TL/f | 0.96 |
| HFOV [deg.] | 26.6 | TL/ImgH | 1.92 |
| V3 + V4 | 74.7 | R10/f | −35.77 |
| V5 | 20.4 | R10/R9 | −2.00 |
| Vmin | 18.7 | f/EPD | 2.49 |
| BL/TL | 0.14 | f/f1 | 2.13 |
| SL/TL | 0.91 | f/f2 | −1.44 |
| T12/CT2 | 1.07 | f/f6 | −0.13 |
| (T45 + T56)/T34 | 0.24 | f/ImgH | 2.00 |
| TD/CT1 | 5.99 | f/R1 | 3.68 |
| TD/T34 | 3.93 | | |

According to the 6th embodiment, the numbers of inflection points of the object-side surfaces and the image-side surfaces of the first lens element 610, the second lens element 620, the third lens element 630, the fourth lens element 640, the fifth lens element 650 and the sixth lens element 660 are listed as follows.

| 6th Embodiment - Numbers of inflection points | | | | | | |
|---|---|---|---|---|---|---|
| | 610 | 620 | 630 | 640 | 650 | 660 |
| Object-side surface | 0 | 2 | 2 | 2 | 3 | 1 |
| Image-side surface | 2 | 0 | 1 | 1 | 3 | 3 |

Furthermore, according to the 6th embodiment of the present disclosure, at least three of the six lens elements of the photographing optical lens assembly have Abbe numbers smaller than 45. Specifically, according to the 6th embodiment, four lens elements have Abbe numbers smaller than 45, which are the second lens element 620, the third lens element 630, the fifth lens element 650 and the sixth lens element 660.

7th Embodiment

Figure 13:
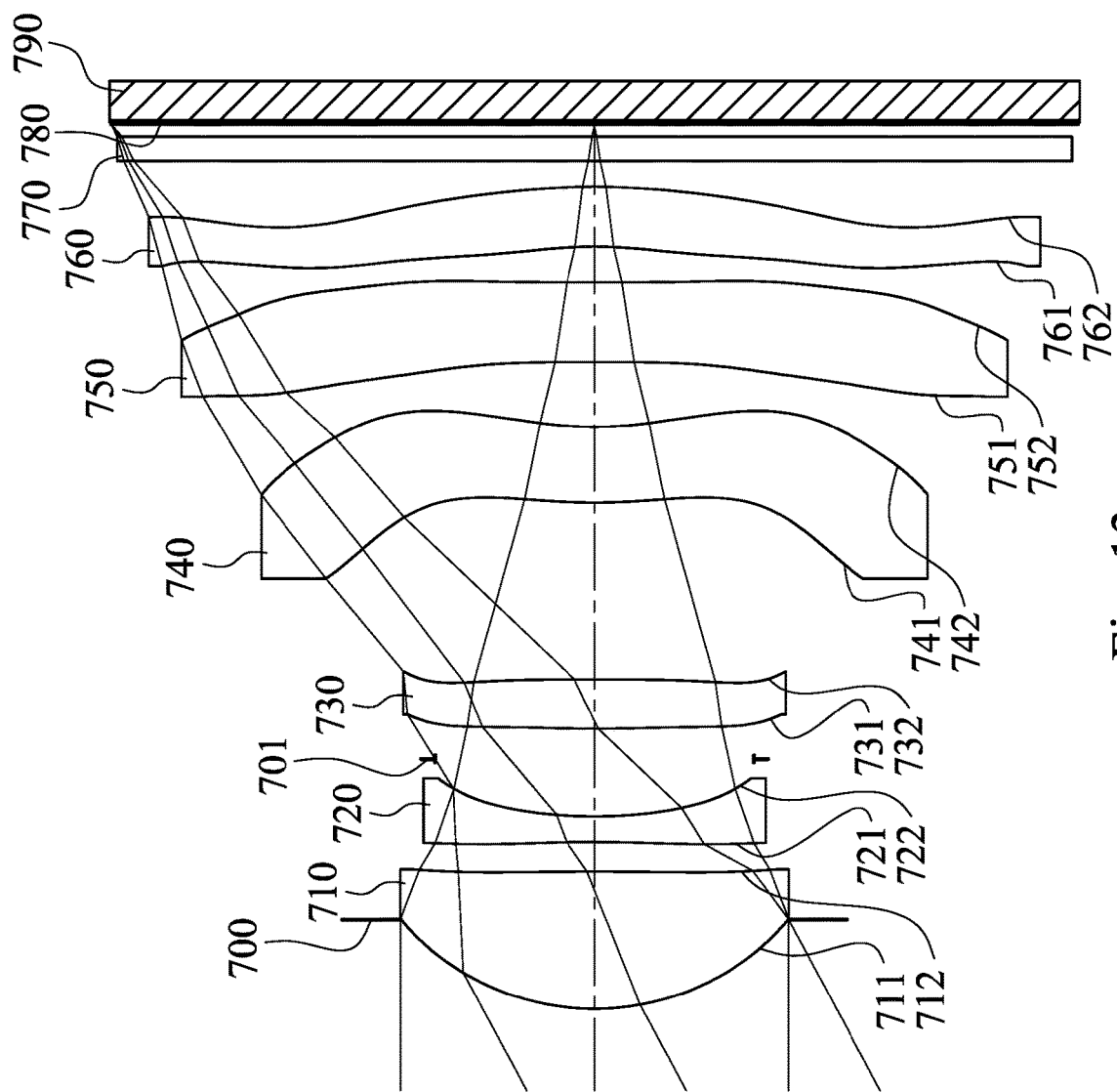
FIG. 13 is a schematic view of an imaging apparatus according to the 7th embodiment of the present disclosure.
Figure 14:
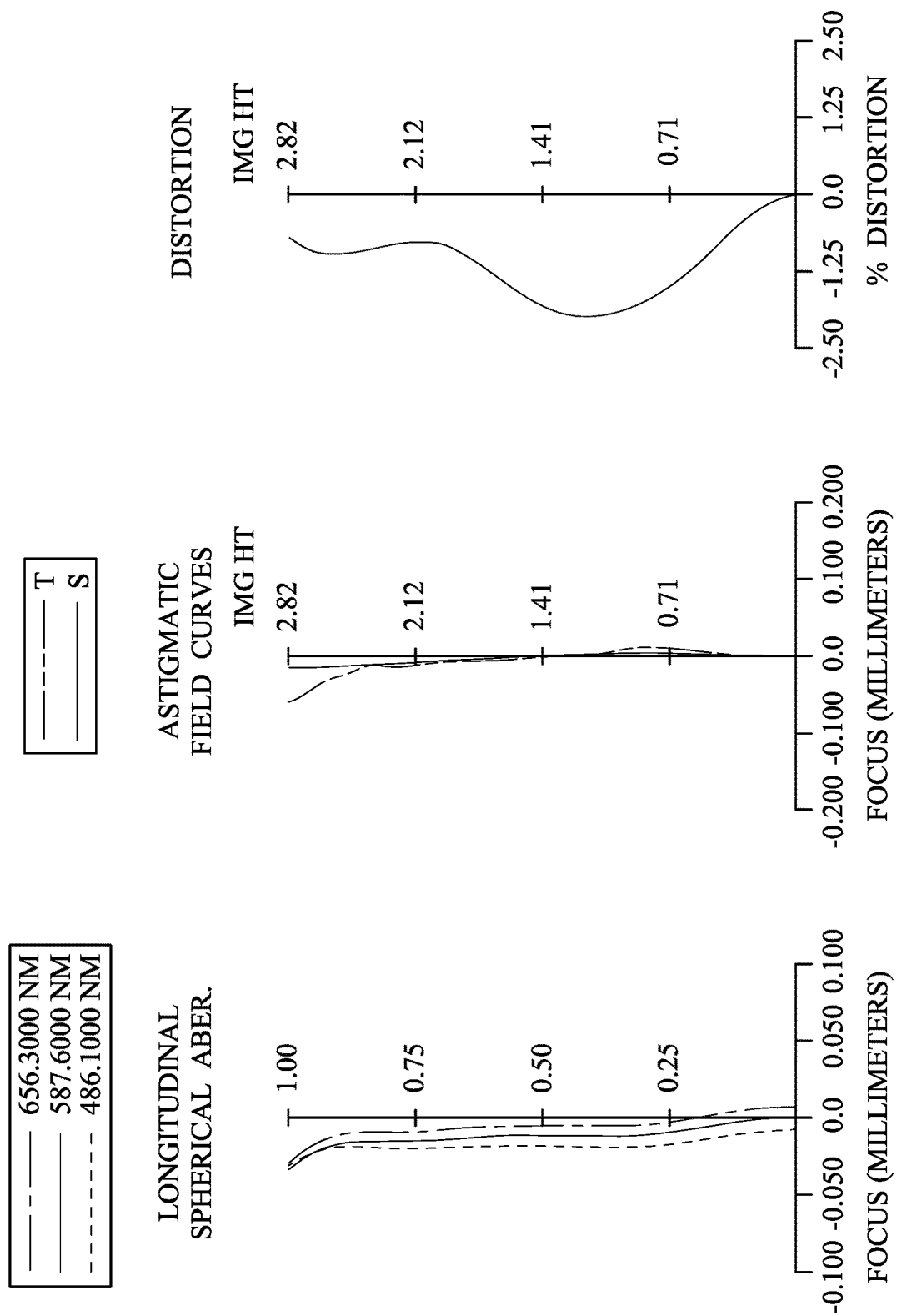
FIG. 14 shows spherical aberration curves, astigmatic field curves and a distortion curve of the imaging apparatus according to the 7th embodiment.

FIG. 13 is a schematic view of an imaging apparatus according to the 7th embodiment of the present disclosure. FIG. 14 shows spherical aberration curves, astigmatic field curves and a distortion curve of the imaging apparatus according to the 7th embodiment. In FIG. 13, the imaging apparatus includes a photographing optical lens assembly (its reference numeral is omitted) and an image sensor 790. The photographing optical lens assembly includes, in order from an object side to an image side, an aperture stop 700, a first lens element 710, a second lens element 720, a stop 701, a third lens element 730, a fourth lens element 740, a fifth lens element 750, a sixth lens element 760, a filter 770 and an image surface 780, wherein the image sensor 790 is disposed on the image surface 780 of the photographing optical lens assembly. The photographing optical lens assembly includes six lens elements (710, 720, 730, 740, 750, 760) without additional one or more lens elements inserted between the first lens element 710 and the sixth lens element 760.

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric. Furthermore, the image-side surface 712 of the first lens element 710 includes at least one inflection point.

The second lens element 720 with negative refractive power has an object-side surface 721 being concave in a paraxial region thereof and an image-side surface 722 being concave in a paraxial region thereof. The second lens element 720 is made of a plastic material, and has the object-side surface 721 and the image-side surface 722 being both aspheric. Furthermore, the object-side surface 721 of the second lens element 720 includes at least one inflection point.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric. Furthermore, each of the object-side surface 731 and the image-side surface 732 of the third lens element 730 includes at least one inflection point.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric. Furthermore, each of the object-side surface 741 and the image-side surface 742 of the fourth lens element 740 includes at least one inflection point, and the image-side surface 742 of the fourth lens element 740 includes a shape changing from concave to convex in an off-axis region thereof.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric. Furthermore, each of the object-side surface 751 and the image-side surface 752 of the fifth lens element 750 includes at least one inflection point.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 of the sixth lens element 760 includes at least one inflection point.

The filter 770 is made of a glass material, which is located between the sixth lens element 760 and the image surface 780 in order, and will not affect the focal length of the photographing optical lens assembly.

The detailed optical data of the 7th embodiment are shown in Table 13 and the aspheric surface data are shown in Table 14 below.

TABLE 13

7th Embodiment
f = 5.32 mm, Fno = 2.35, HFOV = 28.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.522 | | | | |
| 2 | Lens 1 | 1.499 | ASP | 0.801 | Plastic | 1.545 | 56.1 | 2.61 |
| 3 | | −22.879 | ASP | 0.172 | | | | |
| 4 | Lens 2 | −8.600 | ASP | 0.150 | Plastic | 1.639 | 23.3 | −3.41 |
| 5 | | 2.939 | ASP | 0.334 | | | | |
| 6 | Stop | Plano | | 0.177 | | | | |
| 7 | Lens 3 | 9.089 | ASP | 0.289 | Plastic | 1.669 | 19.4 | 13.00 |
| 8 | | −200.000 | ASP | 1.030 | | | | |
| 9 | Lens 4 | 3.375 | ASP | 0.443 | Plastic | 1.544 | 56.0 | −11.40 |
| 10 | | 2.084 | ASP | 0.378 | | | | |
| 11 | Lens 5 | 200.000 | ASP | 0.466 | Plastic | 1.566 | 37.4 | 176.74 |
| 12 | | −200.000 | ASP | 0.207 | | | | |
| 13 | Lens 6 | −2.316 | ASP | 0.349 | Plastic | 1.639 | 23.2 | −9.89 |
| 14 | | −3.871 | ASP | 0.150 | | | | |
| 15 | Filter | Plano | | 0.145 | Glass | 1.517 | 64.2 | — |
| 16 | | Plano | | 0.083 | | | | |
| 17 | Image | Plano | | — | | | | |

Reference wavelength is 587.6 nm (d-line)
Effective radius of Surface 6 (stop) is 0.930 mm

TABLE 14

Aspheric Coefficients

| | Surface # | | | | | |
|---|---|---|---|---|---|---|
| | 2 | 3 | 4 | 5 | 7 | 8 |
| k = | −2.7447E−01 | −9.9000E+01 | −7.3424E+01 | −2.6312E+01 | 5.5828E+01 | 4.5846E+01 |
| A4 = | 9.7071E−03 | 2.3701E−02 | 2.4849E−02 | 1.3954E−01 | −1.2486E−01 | −9.2174E−02 |
| A6 = | 9.8405E−03 | 2.8100E−02 | 1.2703E−01 | 9.7669E−02 | 9.6491E−02 | 4.0627E−02 |
| A8 = | −6.3330E−03 | −4.7414E−02 | −2.0296E−01 | −2.6621E−01 | −3.5031E−02 | 1.2473E−01 |
| A10 = | 6.8490E−03 | 4.3263E−02 | 1.4531E−01 | 4.9442E−01 | 9.0581E−02 | −1.9159E−01 |
| A12 = | | −1.7934E−02 | −5.2026E−02 | −4.4476E−01 | −4.9338E−02 | 1.8656E−01 |
| A14 = | | | | 1.7242E−01 | | −6.6120E−02 |

TABLE 14-continued

Aspheric Coefficients

| | Surface # | | | | | |
|---|---|---|---|---|---|---|
| | 9 | 10 | 11 | 12 | 13 | 14 |
| k = | −2.2420E+00 | −1.6669E+01 | −6.9742E+01 | −9.9000E+01 | −1.7577E+01 | −2.3017E+01 |
| A4 = | −1.9733E−01 | −2.8584E−02 | −1.3825E−01 | 9.6152E−02 | 2.2334E−01 | 4.1556E−02 |
| A6 = | 8.0880E−02 | −5.2936E−02 | 1.1830E−01 | −1.6214E−01 | −2.5295E−01 | −7.2118E−02 |
| A8 = | −1.1805E−01 | 3.6250E−02 | −4.9561E−02 | 9.5745E−02 | 1.3519E−01 | 4.2708E−02 |
| A10 = | 7.7647E−02 | −1.9045E−02 | 1.0482E−02 | −2.4925E−02 | −3.9198E−02 | −1.2180E−02 |
| A12 = | −2.0456E−02 | 7.2934E−03 | −9.1376E−04 | 1.8203E−03 | 6.3833E−03 | 1.8866E−03 |
| A14 = | 1.9503E−03 | −1.4587E−03 | −7.9979E−06 | 4.0971E−04 | −5.5062E−04 | −1.5411E−04 |
| A16 = | | 1.1034E−04 | 4.0467E−06 | −8.6846E−05 | 1.9581E−05 | 5.2136E−06 |
| A18 = | | | | 4.6821E−06 | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.32 | TL [mm] | 5.17 |
| Fno | 2.35 | TL/f | 0.97 |
| HFOV [deg.] | 28.2 | TL/ImgH | 1.83 |
| V3 + V4 | 75.4 | R10/f | −37.63 |
| V5 | 37.4 | R10/R9 | −1.00 |
| Vmin | 19.4 | f/EPD | 2.35 |
| BL/TL | 0.07 | f/f1 | 2.04 |
| SL/TL | 0.90 | f/f2 | −1.56 |
| T12/CT2 | 1.15 | f/f6 | −0.54 |
| (T45 + T56)/T34 | 0.57 | f/ImgH | 1.88 |
| TD/CT1 | 5.99 | f/R1 | 3.55 |
| TD/T34 | 4.66 | | |

According to the 7th embodiment, the numbers of inflection points of the object-side surfaces and the image-side surfaces of the first lens element 710, the second lens element 720, the third lens element 730, the fourth lens element 740, the fifth lens element 750 and the sixth lens element 760 are listed as follows.

| 7th Embodiment - Numbers of inflection points | | | | | | |
|---|---|---|---|---|---|---|
| | 710 | 720 | 730 | 740 | 750 | 760 |
| Object-side surface | 0 | 2 | 2 | 2 | 3 | 4 |
| Image-side surface | 2 | 0 | 1 | 1 | 6 | 3 |

Furthermore, according to the 7th embodiment of the present disclosure, at least three of the six lens elements of the photographing optical lens assembly have Abbe numbers smaller than 45. Specifically, according to the 7th embodiment, four lens elements have Abbe numbers smaller than 45, which are the second lens element 720, the third lens element 730, the fifth lens element 750 and the sixth lens element 760.

8th Embodiment

Figure 15:
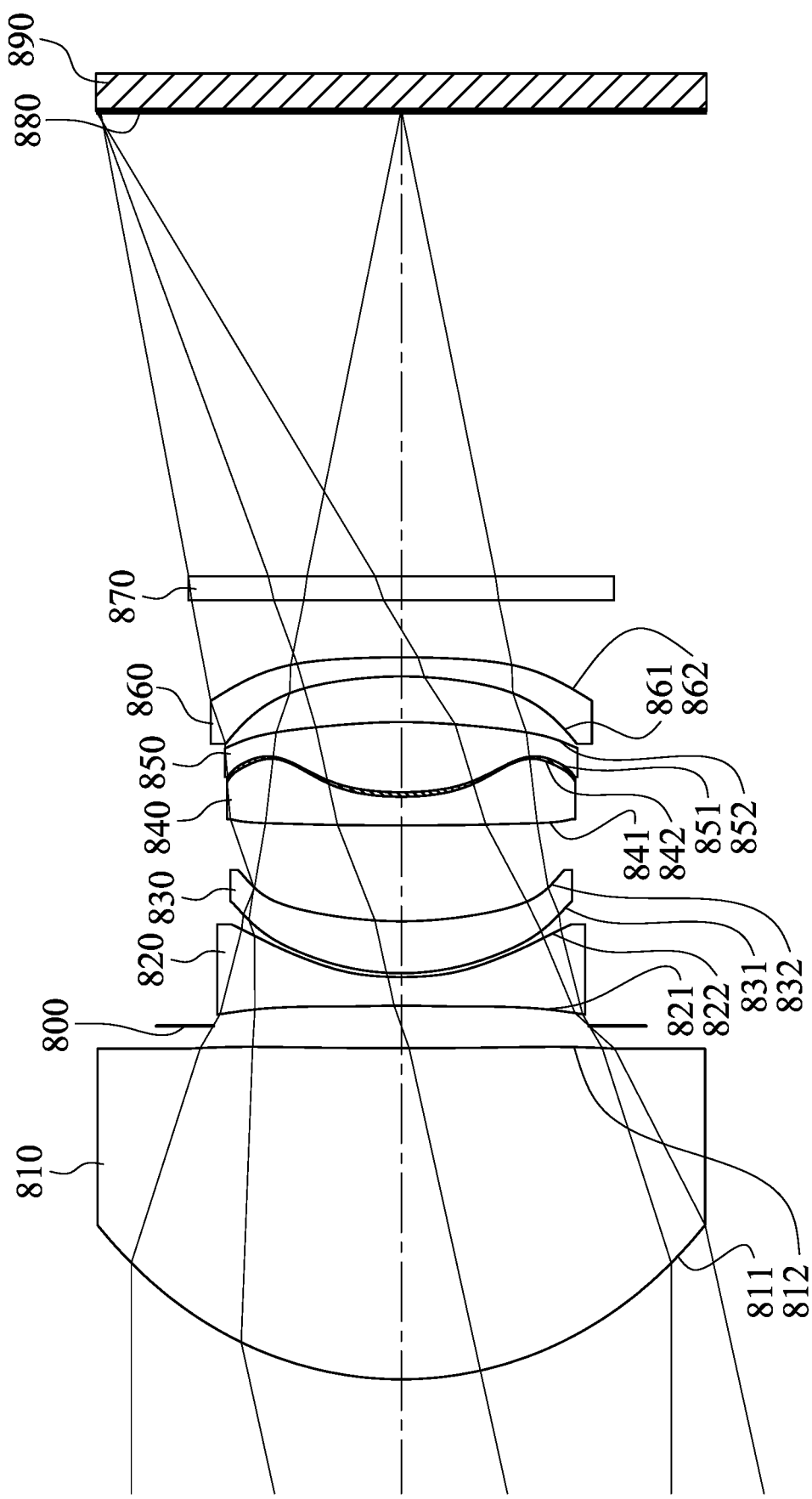
FIG. 15 is a schematic view of an imaging apparatus according to the 8th embodiment of the present disclosure.
Figure 16:
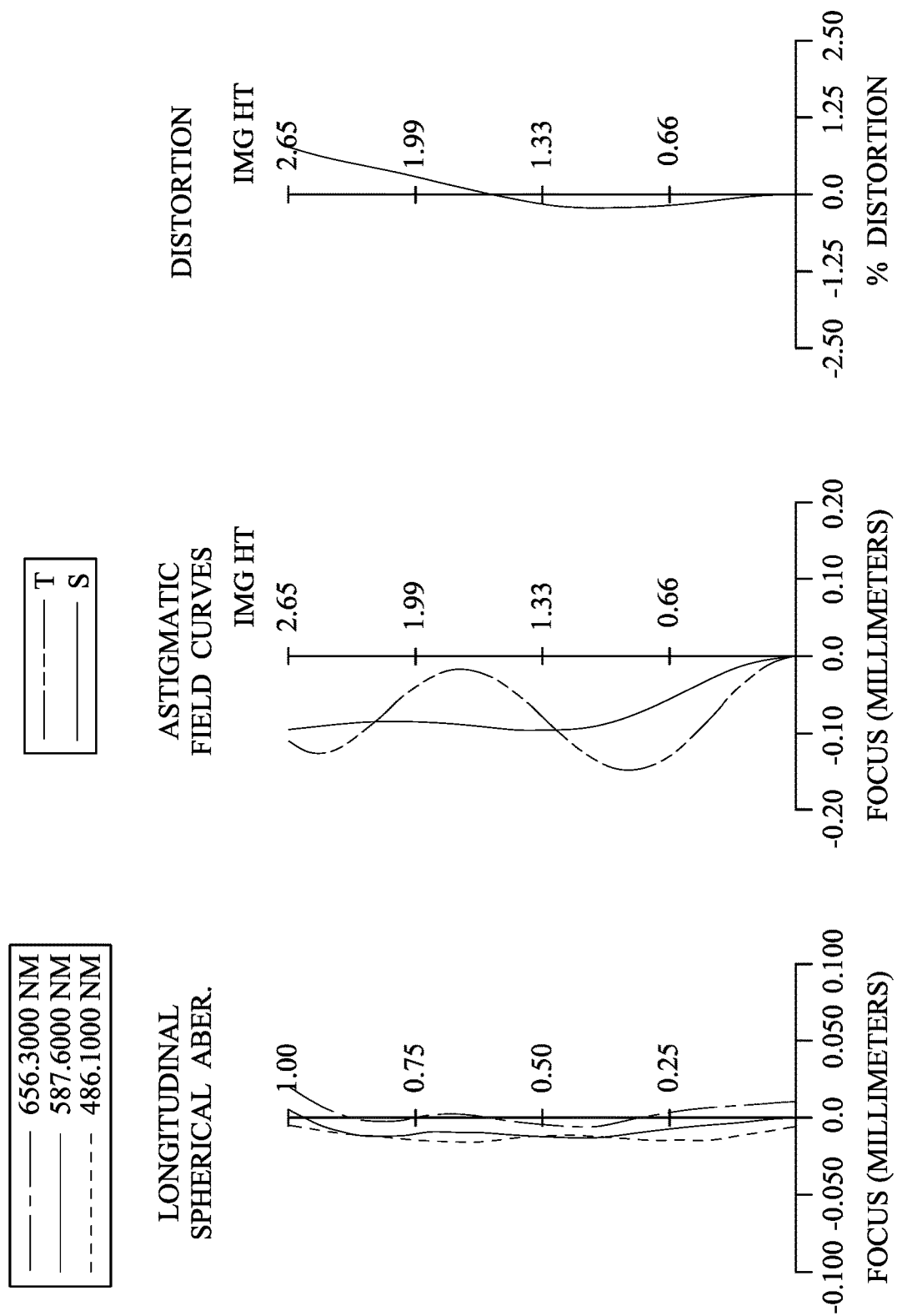
FIG. 16 shows spherical aberration curves, astigmatic field curves and a distortion curve of the imaging apparatus according to the 8th embodiment.

FIG. 15 is a schematic view of an imaging apparatus according to the 8th embodiment of the present disclosure. FIG. 16 shows spherical aberration curves, astigmatic field curves and a distortion curve of the imaging apparatus according to the 8th embodiment. In FIG. 15, the imaging apparatus includes a photographing optical lens assembly (its reference numeral is omitted) and an image sensor 890. The photographing optical lens assembly includes, in order from an object side to an image side, a first lens element 810, an aperture stop 800, a second lens element 820, a third lens element 830, a fourth lens element 840, a fifth lens element 850, a sixth lens element 860, a filter 870 and an image surface 880, wherein the image sensor 890 is disposed on the image surface 880 of the photographing optical lens assembly. The photographing optical lens assembly includes six lens elements (810, 820, 830, 840, 850, 860) without additional one or more lens elements inserted between the first lens element 810 and the sixth lens element 860.

The first lens element 810 with positive refractive power has an object-side surface 811 being convex in a paraxial region thereof and an image-side surface 812 being concave in a paraxial region thereof. The first lens element 810 is made of a glass material, and has the object-side surface 811 and the image-side surface 812 being both aspheric. Furthermore, the image-side surface 812 of the first lens element 810 includes at least one inflection point.

The second lens element 820 with negative refractive power has an object-side surface 821 being concave in a paraxial region thereof and an image-side surface 822 being concave in a paraxial region thereof. The second lens element 820 is made of a plastic material, and has the object-side surface 821 and the image-side surface 822 being both aspheric. Furthermore, each of the object-side surface 821 and the image-side surface 822 of the second lens element 820 includes at least one inflection point.

The third lens element 830 with positive refractive power has an object-side surface 831 being convex in a paraxial region thereof and an image-side surface 832 being concave in a paraxial region thereof. The third lens element 830 is made of a plastic material, and has the object-side surface 831 and the image-side surface 832 being both aspheric. Furthermore, each of the object-side surface 831 and the image-side surface 832 of the third lens element 830 includes at least one inflection point.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric. Furthermore, each of the object-side surface 841 and the image-side surface 842 of the fourth lens element 840 includes at least one inflection point, and the image-side surface 842 of the fourth lens element 840 includes a shape changing from concave to convex in an off-axis region thereof.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point. Moreover, the image-side surface 842 of the fourth lens element 840 is cemented with the object-side surface 851 of the fifth lens element 850.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric.

The filter 870 is made of a glass material, which is located between the sixth lens element 860 and the image surface 880 in order, and will not affect the focal length of the photographing optical lens assembly.

The detailed optical data of the 8th embodiment are shown in Table 15 and the aspheric surface data are shown in Table 16 below.

TABLE 15

8th Embodiment
f = 12.00 mm, Fno = 2.54, HFOV = 12.4 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Lens 1 | 3.148 ASP | 2.899 | Glass | 1.542 | 62.9 | 5.86 |
| 2 |  | 206.946 ASP | 0.194 |  |  |  |  |
| 3 | Ape. Stop | Plano | 0.178 |  |  |  |  |
| 4 | Lens 2 | −7.495 ASP | 0.250 | Plastic | 1.614 | 26.0 | −3.71 |
| 5 |  | 3.313 ASP | 0.034 |  |  |  |  |
| 6 | Lens 3 | 2.177 ASP | 0.454 | Plastic | 1.544 | 56.0 | 10.32 |
| 7 |  | 3.294 ASP | 0.840 |  |  |  |  |
| 8 | Lens 4 | 75.987 ASP | 0.250 | Plastic | 1.650 | 21.8 | −3.57 |
| 9 |  | 2.248 ASP | 0.040 | Cement | 1.485 | 53.2 |  |
| 10 | Lens 5 | 2.583 ASP | 0.614 | Plastic | 1.669 | 19.5 | 2.66 |
| 11 |  | −5.175 ASP | 0.400 |  |  |  |  |
| 12 | Lens 6 | −3.445 ASP | 0.167 | Plastic | 1.614 | 26.0 | −8.75 |
| 13 |  | −9.787 ASP | 0.500 |  |  |  |  |
| 14 | Filter | Plano | 0.210 | Glass | 1.517 | 64.2 | — |
| 15 |  | Plano | 4.072 |  |  |  |  |
| 16 | Image | Plano | — |  |  |  |  |

Reference wavelength is 587.6 nm (d-line)
Effective radius of Surface 8 is 1.495 mm

TABLE 16

Aspheric Coefficients

| Surface # | 1 | 2 | 4 | 5 | 6 | 7 |
|---|---|---|---|---|---|---|
| k = | 7.2726E−02 | 9.9000E+01 | −2.0760E+01 | 3.5289E+00 | 7.6792E−01 | 3.9167E+00 |
| A4 = | −1.8689E−03 | 1.7021E−02 | 2.1166E−01 | 2.2450E−01 | −7.5722E−02 | −1.1167E−01 |
| A6 = | 6.9078E−04 | −1.7362E−02 | −3.5479E−01 | −1.6425E−01 | 3.5254E−01 | 2.0624E−01 |
| A8 = | −3.7803E−04 | 7.3085E−03 | 3.1526E−01 | −2.6428E−01 | −7.8849E−01 | −3.1035E−01 |
| A10 = | 9.7272E−05 | −1.1060E−03 | −1.6989E−01 | 5.0812E−01 | 8.3743E−01 | 3.1830E−01 |
| A12 = | −1.4716E−05 | −2.6947E−04 | 5.4707E−02 | −3.4441E−01 | −4.6737E−01 | −2.0869E−01 |
| A14 = | 1.1484E−06 | 1.1919E−04 | −9.6509E−03 | 1.0767E−01 | 1.3476E−01 | 8.1594E−02 |
| A16 = | −4.2112E−08 | −1.1779E−05 | 7.1922E−04 | −1.3102E−02 | −1.6012E−02 | −1.3828E−02 |

| Surface # | 8 | 9 | 10 | 11 | 12 | 13 |
|---|---|---|---|---|---|---|
| k = | 9.9000E+01 | −4.3291E+01 | −3.3330E+00 | −3.8878E+01 | 1.7105E+00 | 9.6170E+00 |
| A4 = | 9.8487E−03 | 4.0795E−01 | 7.2518E−02 | −8.4238E−03 | 4.0607E−02 | 6.0391E−03 |
| A6 = | 2.4847E−02 | −2.3424E−02 | 5.2023E−01 | 5.3832E−02 | −4.9107E−02 | −3.8890E−02 |
| A8 = | −7.0823E−02 | −3.8470E−01 | −9.7297E−01 | −9.5161E−01 | 5.4120E−03 | 1.2651E−02 |
| A10 = | 7.3800E−02 | 2.7238E−01 | 7.1810E−01 | 8.0738E−02 | 9.4387E−04 | −1.1601E−03 |
| A12 = | −4.1407E−02 | −1.0552E−01 | −3.1090E−01 | −3.9683E−02 |  |  |
| A14 = | 1.2578E−02 | 3.2869E−02 | 8.2092E−02 | 1.0145E−02 |  |  |
| A16 = | −1.5708E−03 | −5.4280E−03 | −1.0054E−02 | −1.0174E−03 |  |  |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 12.00 | TL [mm] | 11.10 |
| Fno | 2.54 | TL/f | 0.93 |
| HFOV [deg.] | 12.4 | TL/ImgH | 4.19 |
| V3 + V4 | 77.8 | R10/f | −0.43 |
| V5 | 19.5 | R10/R9 | −2.00 |
| Vmin | 19.5 | f/EPD | 2.54 |
| BL/TL | 0.43 | f/f1 | 2.05 |
| SL/TL | 0.72 | f/f2 | −3.23 |
| T12/CT2 | 1.49 | f/f6 | −1.37 |
| (T45 + T56)/T34 | 0.52 | f/ImgH | 4.53 |
| TD/CT1 | 2.18 | f/R1 | 3.81 |
| TD/T34 | 7.52 | | |

According to the 8th embodiment, the numbers of inflection points of the object-side surfaces and the image-side surfaces of the first lens element 810, the second lens element 820, the third lens element 830, the fourth lens element 840, the fifth lens element 850 and the sixth lens element 860 are listed as follows.

| 8th Embodiment - Numbers of inflection points | | | | | | |
|---|---|---|---|---|---|---|
| | 810 | 820 | 830 | 840 | 850 | 860 |
| Object-side surface | 0 | 3 | 1 | 2 | 1 | 0 |
| Image-side surface | 1 | 2 | 1 | 1 | 1 | 0 |

Furthermore, according to the 8th embodiment of the present disclosure, at least three of the six lens elements of the photographing optical lens assembly have Abbe numbers smaller than 45. Specifically, according to the 8th embodiment, four lens elements have Abbe numbers smaller than 45, which are the second lens element 820, the fourth lens element 840, the fifth lens element 850 and the sixth lens element 860.

9th Embodiment

Figure 17:
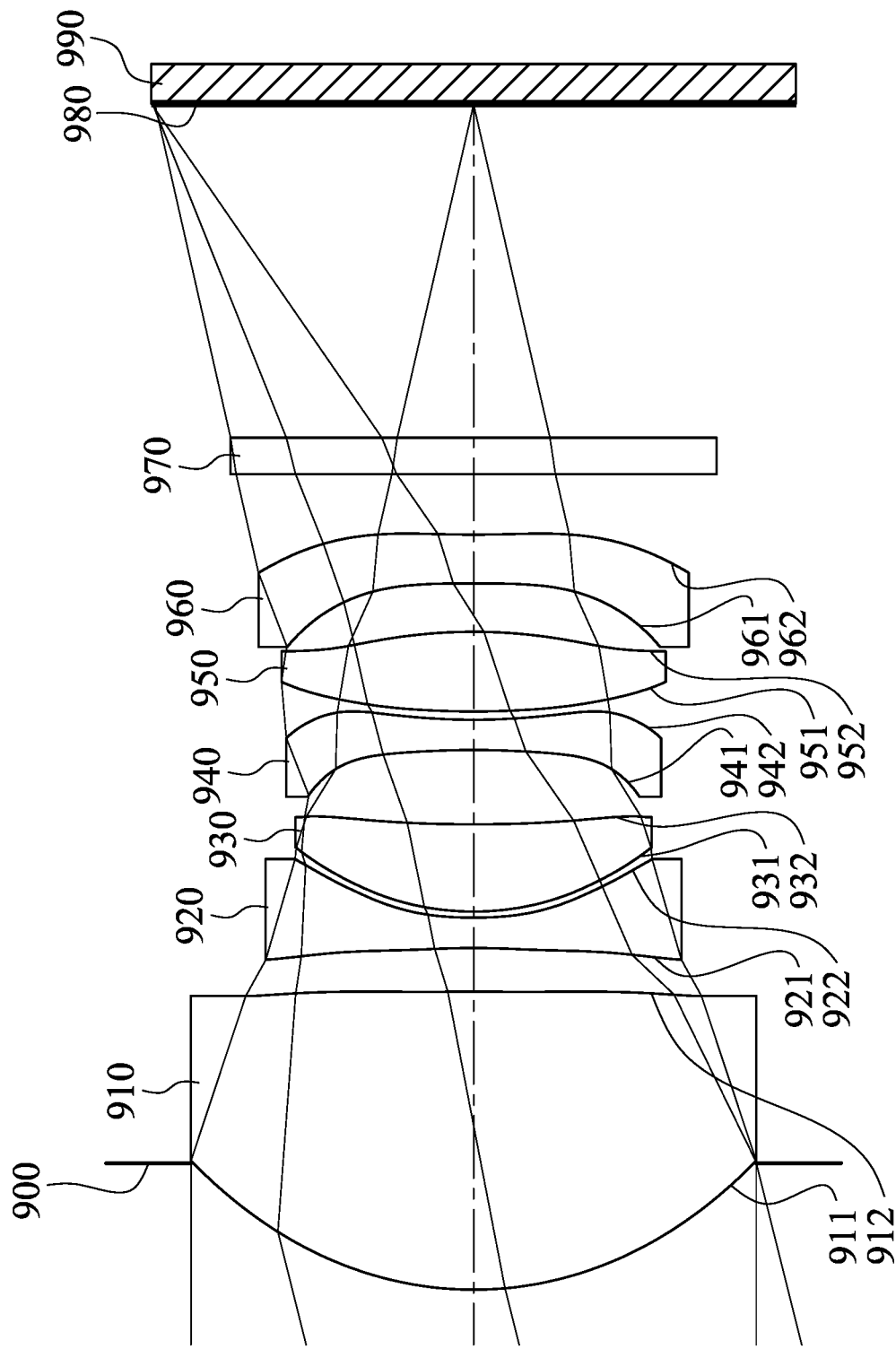
FIG. 17 is a schematic view of an imaging apparatus according to the 9th embodiment of the present disclosure.
Figure 18:
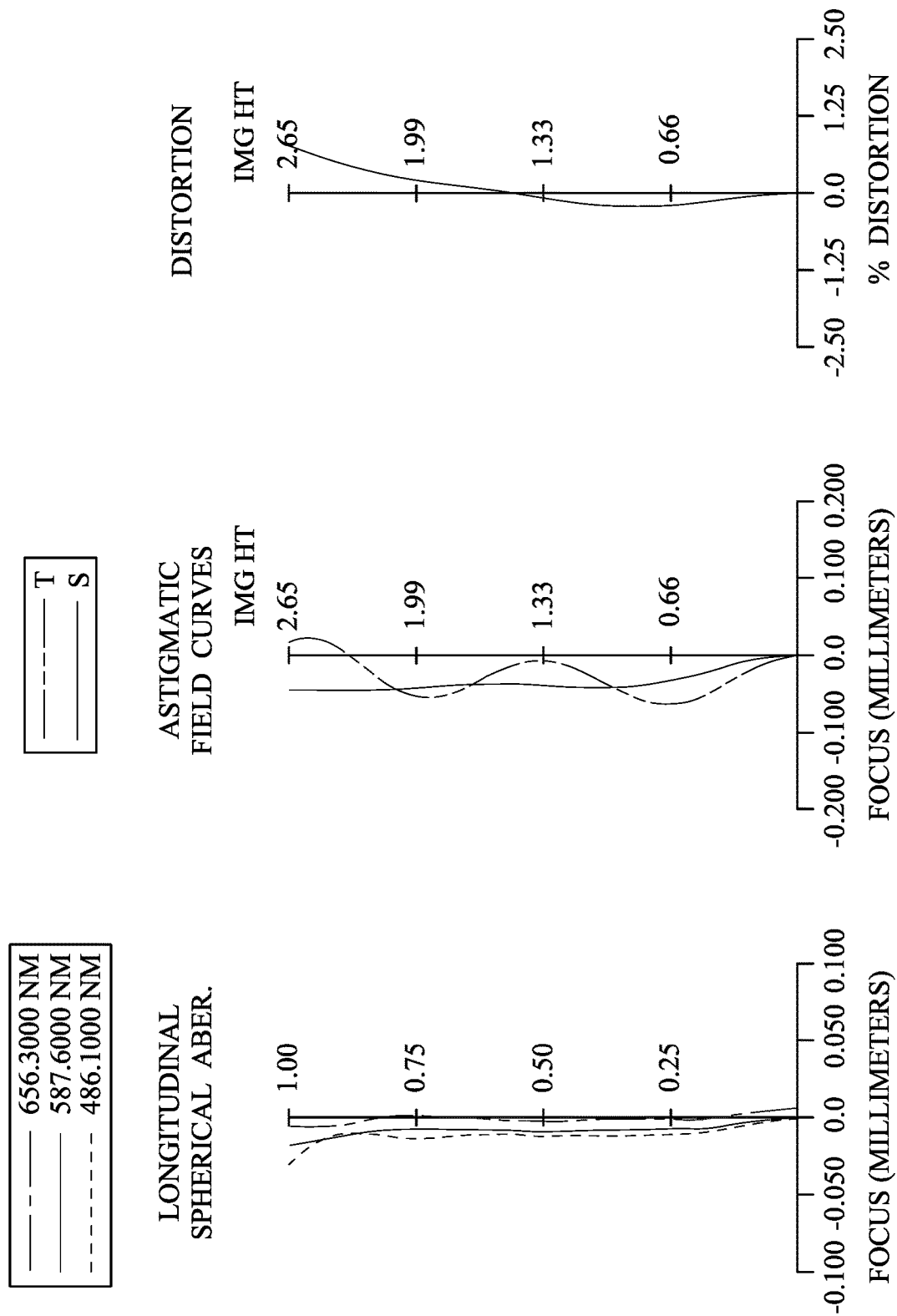
FIG. 18 shows spherical aberration curves, astigmatic field curves and a distortion curve of the imaging apparatus according to the 9th embodiment.

FIG. 17 is a schematic view of an imaging apparatus according to the 9th embodiment of the present disclosure. FIG. 18 shows spherical aberration curves, astigmatic field curves and a distortion curve of the imaging apparatus according to the 9th embodiment. In FIG. 17, the imaging apparatus includes a photographing optical lens assembly (its reference numeral is omitted) and an image sensor 990. The photographing optical lens assembly includes, in order from an object side to an image side, an aperture stop 900, a first lens element 910, a second lens element 920, a third lens element 930, a fourth lens element 940, a fifth lens element 950, a sixth lens element 960, a filter 970 and an image surface 980, wherein the image sensor 990 is disposed on the image surface 980 of the photographing optical lens assembly. The photographing optical lens assembly includes six lens elements (910, 920, 930, 940, 950, 960) without additional one or more lens elements inserted between the first lens element 910 and the sixth lens element 960.

The first lens element 910 with positive refractive power has an object-side surface 911 being convex in a paraxial region thereof and an image-side surface 912 being convex in a paraxial region thereof. The first lens element 910 is made of a plastic material, and has the object-side surface 911 and the image-side surface 912 being both aspheric. Furthermore, the image-side surface 912 of the first lens element 910 includes at least one inflection point.

The second lens element 920 with negative refractive power has an object-side surface 921 being concave in a paraxial region thereof and an image-side surface 922 being concave in a paraxial region thereof. The second lens element 920 is made of a plastic material, and has the object-side surface 921 and the image-side surface 922 being both aspheric. Furthermore, each of the object-side surface 921 and the image-side surface 922 of the second lens element 920 includes at least one inflection point.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric. Furthermore, the image-side surface 932 of the third lens element 930 includes at least one inflection point.

The fourth lens element 940 with negative refractive power has an object-side surface 941 being concave in a paraxial region thereof and an image-side surface 942 being concave in a paraxial region thereof. The fourth lens element 940 is made of a plastic material, and has the object-side surface 941 and the image-side surface 942 being both aspheric. Furthermore, the image-side surface 942 of the fourth lens element 940 includes at least one inflection point, and the image-side surface 942 of the fourth lens element 940 includes a shape changing from concave to convex in an off-axis region thereof.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric. Furthermore, the image-side surface 952 of the fifth lens element 950 includes at least one inflection point.

The sixth lens element 960 with negative refractive power has an object-side surface 961 being concave in a paraxial region thereof and an image-side surface 962 being concave in a paraxial region thereof. The sixth lens element 960 is made of a glass material, and has the object-side surface 961 and the image-side surface 962 being both aspheric. Furthermore, the image-side surface 962 of the sixth lens element 960 includes at least one inflection point.

The filter 970 is made of a glass material, which is located between the sixth lens element 960 and the image surface 980 in order, and will not affect the focal length of the photographing optical lens assembly.

The detailed optical data of the 9th embodiment are shown in Table 17 and the aspheric surface data are shown in Table 18 below.

TABLE 17

9th Embodiment
f = 10.50 mm, Fno = 2.25, HFOV = 14.1 deg.

| Surface # |        | Curvature Radius |     | Thickness | Material | Index | Abbe # | Focal Length |
|-----------|--------|------------------|-----|-----------|----------|-------|--------|--------------|
| 0 | Object | Plano | | Infinity | | | | |
| 1 | Ape. Stop | Plano | | −1.045 | | | | |
| 2 | Lens 1 | 2.894 | ASP | 2.462 | Plastic | 1.545 | 56.1 | 5.24 |
| 3 | | −142.611 | ASP | 0.362 | | | | |
| 4 | Lens 2 | −5.561 | ASP | 0.250 | Plastic | 1.614 | 26.0 | −3.22 |
| 5 | | 3.118 | ASP | 0.051 | | | | |
| 6 | Lens 3 | 2.214 | ASP | 0.721 | Plastic | 1.544 | 56.0 | 4.84 |
| 7 | | 12.320 | ASP | 0.614 | | | | |
| 8 | Lens 4 | −7.857 | ASP | 0.250 | Plastic | 1.614 | 26.0 | −4.58 |
| 9 | | 4.437 | ASP | 0.068 | | | | |
| 10 | Lens 5 | 5.916 | ASP | 0.659 | Plastic | 1.669 | 19.4 | 3.88 |
| 11 | | −4.429 | ASP | 0.400 | | | | |
| 12 | Lens 6 | −21.022 | ASP | 0.403 | Glass | 1.834 | 37.3 | −7.12 |
| 13 | | 8.359 | ASP | 0.500 | | | | |
| 14 | Filter | Plano | | 0.300 | Glass | 1.517 | 64.2 | — |
| 15 | | Plano | | 2.763 | | | | |
| 16 | Image | Plano | | — | | | | |

Reference wavelength is 587.6 nm (d-line)
Effective radius of Surface 6 is 1.470 mm
Effective radius of Surface 11 is 1.550 mm

TABLE 18

Aspheric Coefficients

| Surface # | 2 | 3 | 4 | 5 | 6 | 7 |
|-----------|---|---|---|---|---|---|
| k = | −2.5609E−02 | −9.9000E+01 | −2.2347E+01 | 2.9525E+00 | 9.7712E−01 | 2.5109E+01 |
| A4 = | −1.9041E−03 | 1.0160E−02 | 1.4179E−01 | 1.2212E−01 | −3.6942E−02 | 9.9143E−03 |
| A6 = | 3.5105E−04 | −1.8004E−03 | −1.5035E−01 | −7.8304E−02 | 4.4526E−02 | −2.6905E−02 |
| A8 = | −2.3884E−04 | −8.2873E−03 | 6.9391E−02 | 3.3026E−02 | 4.6953E−02 | 7.8462E−02 |
| A10 = | 4.4479E−05 | 5.5961E−03 | −1.4283E−02 | −8.9850E−02 | −1.6844E−01 | −1.0551E−01 |
| A12 = | −3.8478E−06 | −1.5254E−03 | 5.4520E−04 | 9.3118E−02 | 1.4043E−01 | 6.5783E−02 |
| A14 = | −4.4269E−07 | 1.8809E−04 | 1.9885E−04 | −3.7877E−02 | −4.9322E−02 | −1.9678E−02 |
| A16 = | 6.8660E−08 | −7.6333E−06 | −1.5358E−05 | 5.3735E−03 | 6.3150E−03 | 2.2517E−03 |

| Surface # | 8 | 9 | 10 | 11 | 12 | 13 |
|-----------|---|---|----|----|----|----|
| k = | 2.8224E+01 | −9.9000E+01 | −1.1753E+01 | −3.3524E+01 | 1.0761E+01 | −9.9000E+01 |
| A4 = | −1.6974E−02 | −2.6126E−02 | −8.8913E−02 | −5.7089E−02 | −1.2679E−01 | −9.7464E−02 |
| A6 = | 1.4903E−01 | 2.4149E−01 | 2.6329E−01 | 6.5444E−02 | 3.1460E−02 | 3.8016E−02 |
| A8 = | −3.4066E−01 | −4.0385E−01 | −3.1902E−01 | −8.4493E−02 | −4.7101E−03 | −1.2039E−02 |
| A10 = | 3.3271E−01 | 2.7108E−01 | 2.0546E−01 | 8.2741E−02 | −4.0793E−04 | 2.3127E−03 |
| A12 = | −2.0080E−01 | −9.5820E−02 | −7.1642E−02 | −3.8941E−02 | 3.2177E−05 | −1.8467E−04 |
| A14 = | 6.9470E−02 | 1.8202E−02 | 1.2566E−02 | 8.1042E−03 | | |
| A16 = | −1.0241E−02 | −1.5295E−03 | −8.3746E−04 | −5.7249E−04 | | |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 10.50 | TL [mm] | 9.80 |
| Fno | 2.25 | TL/f | 0.93 |
| HFOV [deg.] | 14.1 | TL/ImgH | 3.70 |
| V3 + V4 | 82.0 | R10/f | −0.42 |
| V5 | 19.4 | R10/R9 | −0.75 |
| Vmin | 19.4 | f/EPD | 2.25 |
| BL/TL | 0.36 | f/f1 | 2.01 |
| SL/TL | 0.89 | f/f2 | −3.26 |
| T12/CT2 | 1.45 | f/f6 | −1.47 |
| (T45 + T56)/T34 | 0.76 | f/ImgH | 3.96 |
| TD/CT1 | 2.53 | f/R1 | 3.63 |
| TD/T34 | 10.16 | | |

According to the 9th embodiment, the numbers of inflection points of the object-side surfaces and the image-side surfaces of the first lens element 910, the second lens element 920, the third lens element 930, the fourth lens element 940, the fifth lens element 950 and the sixth lens element 960 are listed as follows.

| 9th Embodiment - Numbers of inflection points | | | | | | |
|---|---|---|---|---|---|---|
| | 910 | 920 | 930 | 940 | 950 | 960 |
| Object-side surface | 0 | 3 | 0 | 0 | 0 | 0 |
| Image-side surface | 3 | 2 | 1 | 1 | 1 | 1 |

Furthermore, according to the 9th embodiment of the present disclosure, at least three of the six lens elements of the photographing optical lens assembly have Abbe numbers smaller than 45. Specifically, according to the 9th embodiment, four lens elements have Abbe numbers smaller than 45, which are the second lens element 920, the fourth lens element 940, the fifth lens element 950 and the sixth lens element 960.

10th Embodiment

Figure 19:
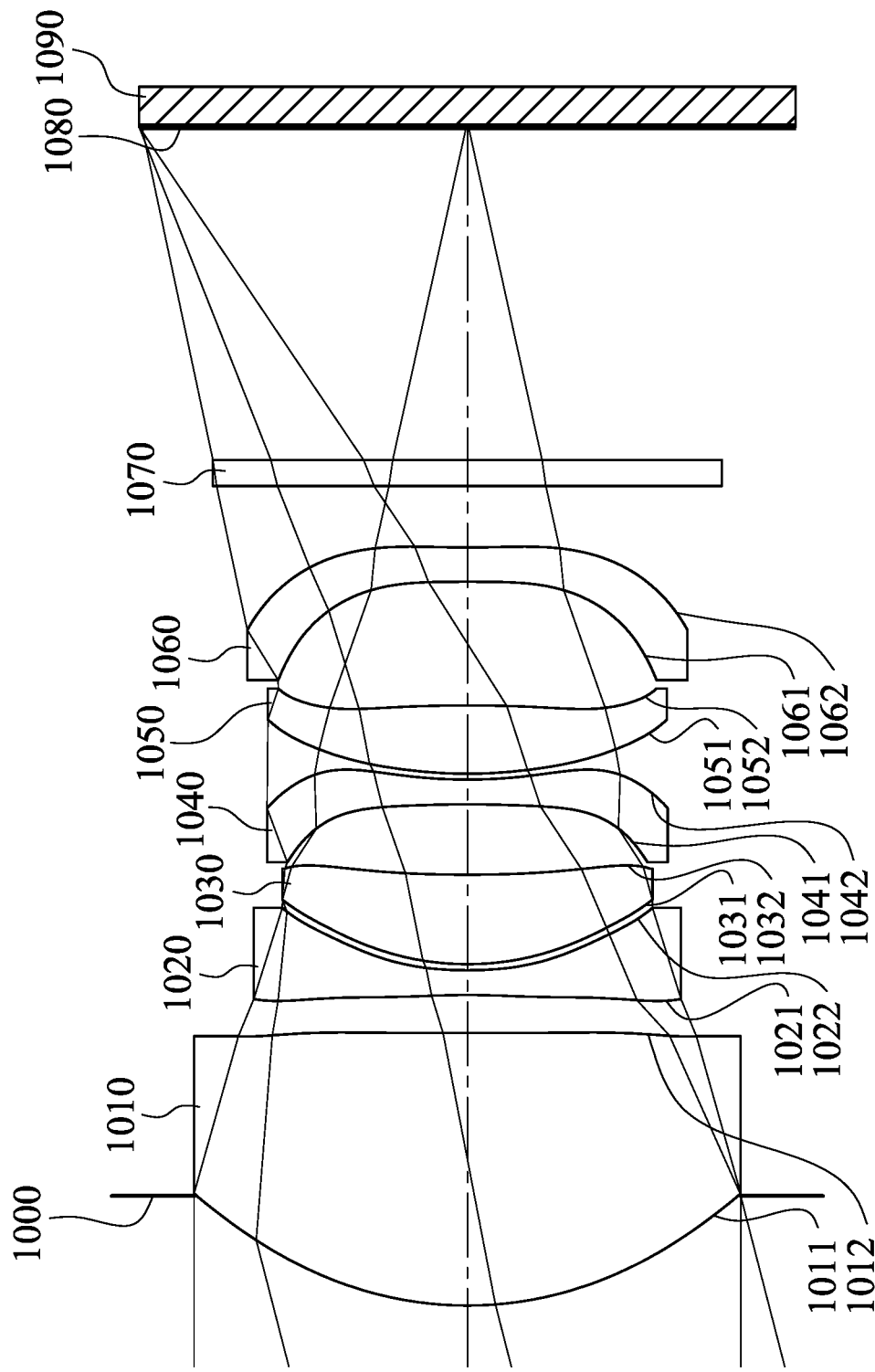
FIG. 19 is a schematic view of an imaging apparatus according to the 10th embodiment of the present disclosure.
Figure 20:
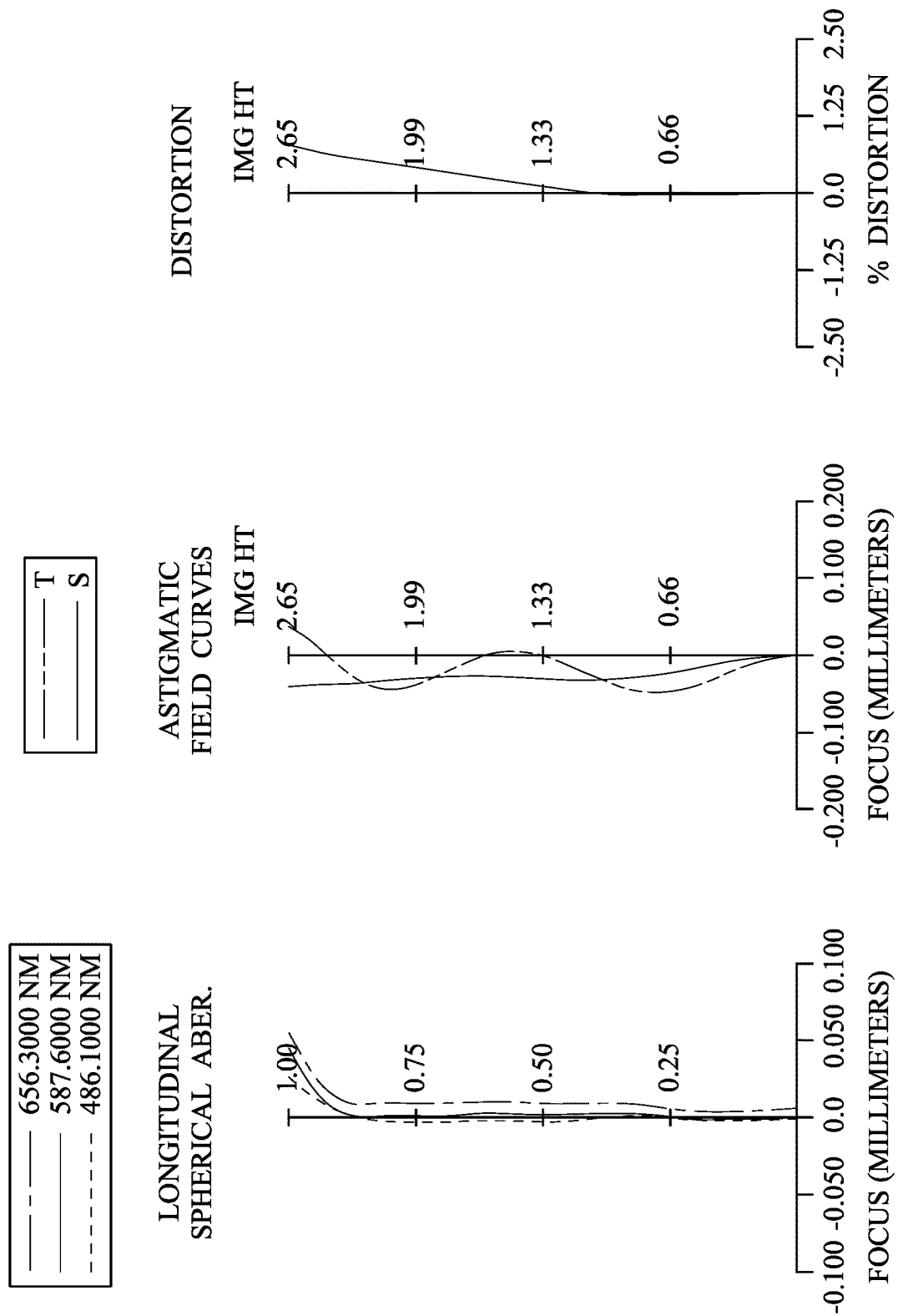
FIG. 20 shows spherical aberration curves, astigmatic field curves and a distortion curve of the imaging apparatus according to the 10th embodiment.

FIG. 19 is a schematic view of an imaging apparatus according to the 10th embodiment of the present disclosure. FIG. 20 shows spherical aberration curves, astigmatic field curves and a distortion curve of the imaging apparatus according to the 10th embodiment. In FIG. 19, the imaging apparatus includes a photographing optical lens assembly (its reference numeral is omitted) and an image sensor 1090. The photographing optical lens assembly includes, in order from an object side to an image side, an aperture stop 1000, a first lens element 1010, a second lens element 1020, a third lens element 1030, a fourth lens element 1040, a fifth lens element 1050, a sixth lens element 1060, a filter 1070 and an image surface 1080, wherein the image sensor 1090 is disposed on the image surface 1080 of the photographing optical lens assembly. The photographing optical lens assembly includes six lens elements (1010, 1020, 1030, 1040, 1050, 1060) without additional one or more lens elements inserted between the first lens element 1010 and the sixth lens element 1060.

The first lens element 1010 with positive refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric. Furthermore, the image-side surface 1012 of the first lens element 1010 includes at least one inflection point.

The second lens element 1020 with negative refractive power has an object-side surface 1021 being concave in a paraxial region thereof and an image-side surface 1022 being concave in a paraxial region thereof. The second lens element 1020 is made of a plastic material, and has the object-side surface 1021 and the image-side surface 1022 being both aspheric.

Furthermore, the object-side surface 1021 of the second lens element 1020 includes at least one inflection point.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric. Furthermore, the image-side surface 1032 of the third lens element 1030 includes at least one inflection point.

The fourth lens element 1040 with negative refractive power has an object-side surface 1041 being concave in a paraxial region thereof and an image-side surface 1042 being concave in a paraxial region thereof. The fourth lens element 1040 is made of a plastic material, and has the object-side surface 1041 and the image-side surface 1042 being both aspheric. Furthermore, the image-side surface 1042 of the fourth lens element 1040 includes at least one inflection point, and the image-side surface 1042 of the fourth lens element 1040 includes a shape changing from concave to convex in an off-axis region thereof.

The fifth lens element 1050 with positive refractive power has an object-side surface 1051 being convex in a paraxial region thereof and an image-side surface 1052 being convex in a paraxial region thereof. The fifth lens element 1050 is made of a plastic material, and has the object-side surface 1051 and the image-side surface 1052 being both aspheric. Furthermore, the image-side surface 1052 of the fifth lens element 1050 includes at least one inflection point.

The sixth lens element 1060 with negative refractive power has an object-side surface 1061 being concave in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the image-side surface 1062 of the sixth lens element 1060 includes at least one inflection point.

The filter 1070 is made of a glass material, which is located between the sixth lens element 1060 and the image surface 1080 in order, and will not affect the focal length of the photographing optical lens assembly.

The detailed optical data of the 10th embodiment are shown in Table 19 and the aspheric surface data are shown in Table 20 below.

TABLE 19

10th Embodiment
f = 10.20 mm, Fno = 2.31, HFOV = 14.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.885 | | | | |
| 2 | Lens 1 | 2.902 | ASP | 2.203 | Plastic | 1.545 | 56.1 | 5.37 |
| 3 | | 234.227 | ASP | 0.307 | | | | |
| 4 | Lens 2 | −6.105 | ASP | 0.200 | Plastic | 1.614 | 26.0 | −3.39 |
| 5 | | 3.196 | ASP | 0.049 | | | | |

TABLE 19-continued

10th Embodiment
f = 10.20 mm, Fno = 2.31, HFOV = 14.5 deg.

| Surface # | | Curvature Radius | | Thickness | Material | Index | Abbe # | Focal Length |
|---|---|---|---|---|---|---|---|---|
| 6 | Lens 3 | 2.247 | ASP | 0.723 | Plastic | 1.544 | 56.0 | 5.04 |
| 7 | | 11.051 | ASP | 0.569 | | | | |
| 8 | Lens 4 | −8.334 | ASP | 0.200 | Plastic | 1.614 | 26.0 | −4.44 |
| 9 | | 4.082 | ASP | 0.047 | | | | |
| 10 | Lens 5 | 3.495 | ASP | 0.552 | Plastic | 1.669 | 19.4 | 4.25 |
| 11 | | −14.234 | ASP | 1.000 | | | | |
| 12 | Lens 6 | −29.351 | ASP | 0.277 | Plastic | 1.544 | 56.0 | −11.30 |
| 13 | | 7.805 | ASP | 0.497 | | | | |
| 14 | Filter | Plano | | 0.210 | Glass | 1.517 | 64.2 | — |
| 15 | | Plano | | 2.693 | | | | |
| 16 | Image | Plano | | — | | | | |

Reference wavelength is 587.6 nm (d-line)
Effective radius of Surface 6 is 1.495 mm

TABLE 20

Aspheric Coefficients

| | \multicolumn{6}{c}{Surface #} | | | | | |
|---|---|---|---|---|---|---|
| | 2 | 3 | 4 | 5 | 6 | 7 |
| k = | −6.5457E−02 | −9.9000E+01 | −2.9767E+01 | 3.0878E+00 | 9.4696E−01 | 2.7796E+01 |
| A4 = | −2.7932E−03 | −2.6651E−03 | 1.2516E−01 | 1.3890E−01 | −3.0618E−03 | 2.2288E−02 |
| A6 = | 1.5508E−03 | 2.5605E−02 | −1.0158E−01 | −1.2726E−01 | −2.7353E−02 | −2.9747E−02 |
| A8 = | −1.1827E−03 | −3.7738E−02 | 1.4283E−02 | 3.0025E−02 | 3.5943E−02 | 2.1578E−02 |
| A10 = | 4.2837E−04 | 2.2575E−02 | 1.9753E−02 | 2.0731E−02 | −2.3662E−02 | −1.7408E−03 |
| A12 = | −9.0772E−05 | −7.1068E−03 | −1.1896E−02 | −2.7892E−02 | −3.8847E−03 | −1.1561E−02 |
| A14 = | 9.0328E−06 | 1.1783E−03 | 2.8052E−03 | 1.3205E−02 | 7.4300E−03 | 6.7280E−03 |
| A16 = | −2.9253E−07 | −8.0272E−05 | −2.5312E−04 | −2.2565E−03 | −1.6789E−03 | −1.1776E−03 |

| | \multicolumn{6}{c}{Surface #} | | | | | |
|---|---|---|---|---|---|---|
| | 8 | 9 | 10 | 11 | 12 | 13 |
| k = | 1.9668E+01 | −6.0114E+01 | −6.4086E+00 | −5.1751E+00 | −5.0564E−01 | −8.2347E+01 |
| A4 = | 9.7867E−02 | 1.1997E−01 | −5.9643E−02 | −3.9570E−02 | −1.9550E−01 | −1.5427E−01 |
| A6 = | −1.8748E−01 | −1.9159E−01 | 1.3543E−01 | 8.3693E−02 | 7.9606E−02 | 7.3077E−02 |
| A8 = | 1.1902E−01 | 1.2821E−01 | −1.3816E−01 | −1.1742E−01 | −3.1623E−02 | −2.9065E−02 |
| A10 = | −6.2671E−02 | −8.8283E−02 | 1.0136E−01 | 1.5629E−01 | 6.6768E−03 | 6.2374E−03 |
| A12 = | 2.5213E−02 | 4.4044E−02 | −4.9706E−02 | −1.0451E−01 | −1.4001E−03 | −6.2507E−04 |
| A14 = | −7.2343E−03 | −1.1491E−02 | 1.3677E−02 | 3.2296E−02 | | |
| A16 = | 1.0223E−03 | 1.1650E−03 | −1.5320E−03 | −3.7043E−03 | | |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| \multicolumn{4}{c}{10th Embodiment} | | | |
|---|---|---|---|
| f [mm] | 10.20 | TL [mm] | 9.53 |
| Fno | 2.31 | TL/f | 0.93 |
| HFOV [deg.] | 14.5 | TL/ImgH | 3.59 |
| V3 + V4 | 82.0 | R10/f | −1.40 |
| V5 | 19.4 | R10/R9 | −4.07 |
| Vmin | 19.4 | f/EPD | 2.31 |
| BL/TL | 0.36 | f/f1 | 1.90 |

-continued

| \multicolumn{4}{c}{10th Embodiment} | | | |
|---|---|---|---|
| SL/TL | 0.91 | f/f2 | −3.01 |
| T12/CT2 | 1.54 | f/f6 | −0.90 |
| (T45 + T56)/T34 | 1.84 | f/ImgH | 3.85 |
| TD/CT1 | 2.78 | f/R1 | 3.51 |
| TD/T34 | 10.77 | | |

According to the 10th embodiment, the numbers of inflection points of the object-side surfaces and the image-side surfaces of the first lens element 1010, the second lens element 1020, the third lens element 1030, the fourth lens element 1040, the fifth lens element 1050 and the sixth lens element 1060 are listed as follows.

| 10th Embodiment - Numbers of inflection points | | | | | | |
|---|---|---|---|---|---|---|
|  | 1010 | 1020 | 1030 | 1040 | 1050 | 1060 |
| Object-side surface | 0 | 3 | 0 | 0 | 0 | 0 |
| Image-side surface | 2 | 0 | 1 | 1 | 1 | 1 |

Furthermore, according to the 10th embodiment of the present disclosure, at least three of the six lens elements of the photographing optical lens assembly have Abbe numbers smaller than 45. Specifically, according to the 10th embodiment, three lens elements have Abbe numbers smaller than 45, which are the second lens element 1020, the fourth lens element 1040 and the fifth lens element 1050.

11th Embodiment

FIG. 22A is a schematic view of an imaging apparatus according to the 11th embodiment of the present disclosure. In FIG. 22A, the imaging apparatus includes a reflective member 1112a, a photographing optical lens assembly 1100 and an image sensor (not shown in drawings), wherein the reflective member 1112a is disposed between an imaged object 1111 and the photographing optical lens assembly 1100. The photographing optical lens assembly 1100 includes an image surface 1180 on the image side thereof, and the image sensor is disposed on the image surface of the photographing optical lens assembly 1100. In the imaging apparatus according to the 11th embodiment, the reflective member 1112a can be a prism which can fold an optical axis of the imaging apparatus, and restrict the field of view and the size of light rays after reflected. Therefore, the traveling direction of the incident light of the photographing optical lens assembly can be changed for imaging on the image surface 1180, so that the space arrangement can be more flexible. It is favorable for applying the photographing optical lens assembly to different imaging apparatuses or electronic devices.

FIG. 22B is a schematic view of the imaging apparatus according to the 11th embodiment with another reflective member 1112b of the present disclosure. In FIG. 22B, according to the 11th embodiment, the reflective member 1112b in the imaging apparatus can be a reflective mirror, which can also change the traveling direction of the incident light of the photographing optical lens assembly for imaging on the image surface 1180. Thus, it is favorable for applying the photographing optical lens assembly to different imaging apparatuses or electronic devices.

Figure 22C:
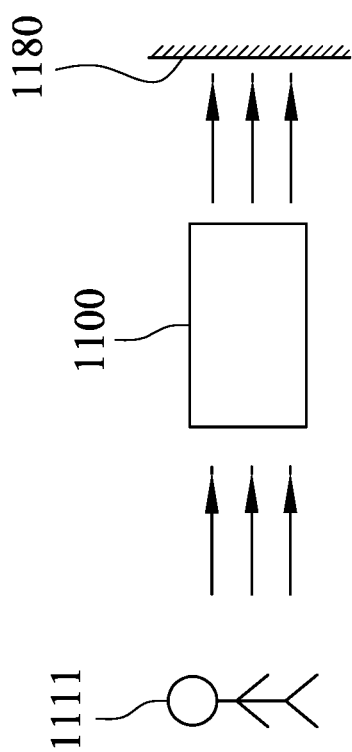
FIG. 22C is a schematic view of the imaging apparatus according to the 11th embodiment without reflective member of the present disclosure.

Furthermore, FIG. 22C is a schematic view of the imaging apparatus according to the 11th embodiment without reflective member of the present disclosure. In FIG. 22C, the imaging apparatus can be arranged without reflective member between the imaged object 1111 and the photographing optical lens assembly 1100 according to the demands of different imaging apparatuses or electronic devices.

Moreover, the photographing optical lens assembly 1100 in FIGS. 22A, 22B and 22C can be any one of the aforementioned photographing optical lens assembly according to the 1st embodiment to the 10th embodiment.

12th Embodiment

Figure 23:
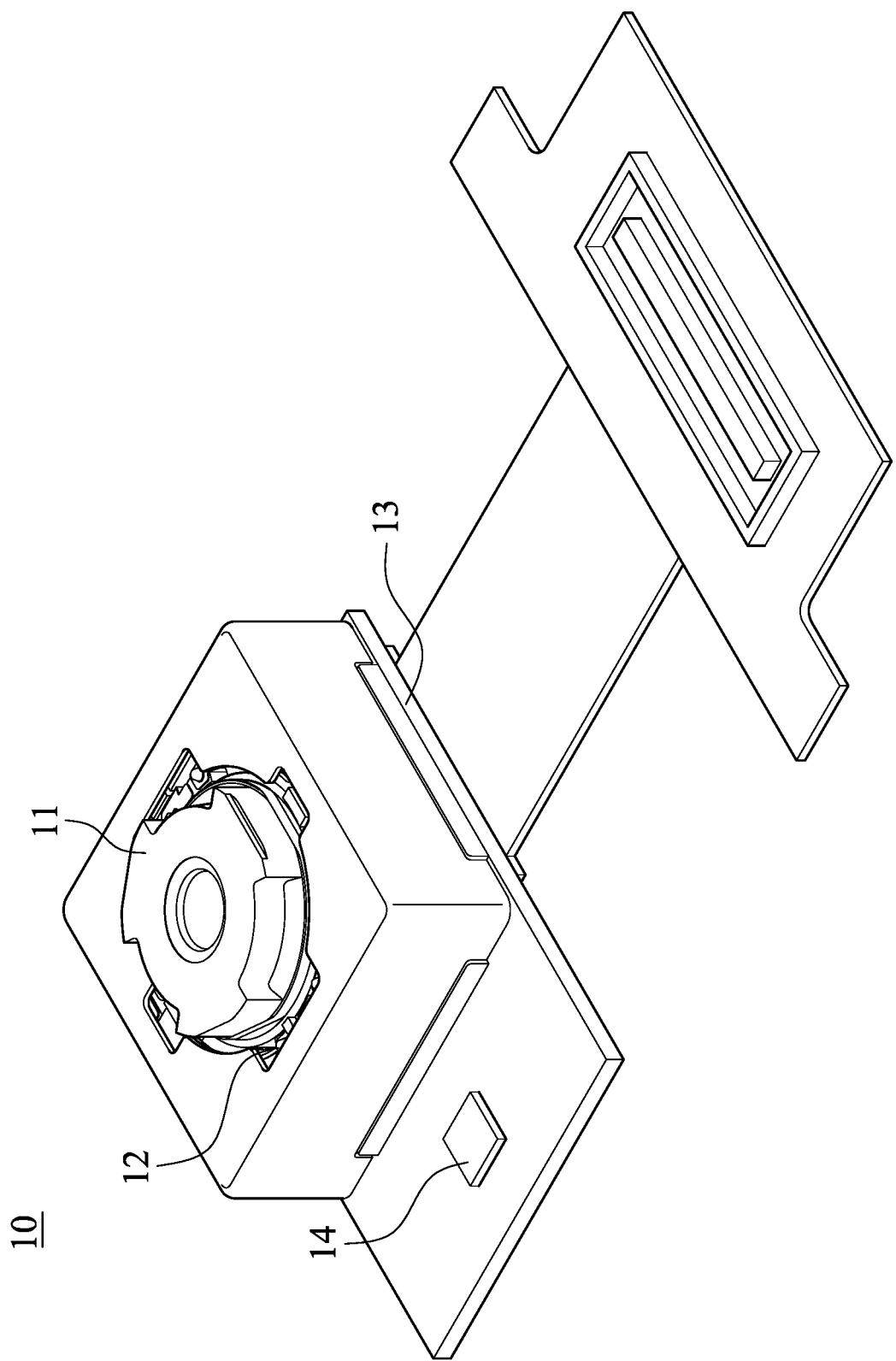
FIG. 23 is a three-dimensional schematic view of an imaging apparatus according to the 12th embodiment of the present disclosure.

FIG. 23 is a three-dimensional schematic view of an imaging apparatus 10 according to the 12th embodiment of the present disclosure. In FIG. 23, the imaging apparatus 10 of the 12th embodiment is a camera module, the imaging apparatus 10 includes an imaging lens assembly 11, a driving apparatus 12 and an image sensor 13, wherein the imaging lens assembly 11 includes the photographing optical lens assembly of the 1st embodiment and a lens barrel (not shown in drawings) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 12th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 24A:
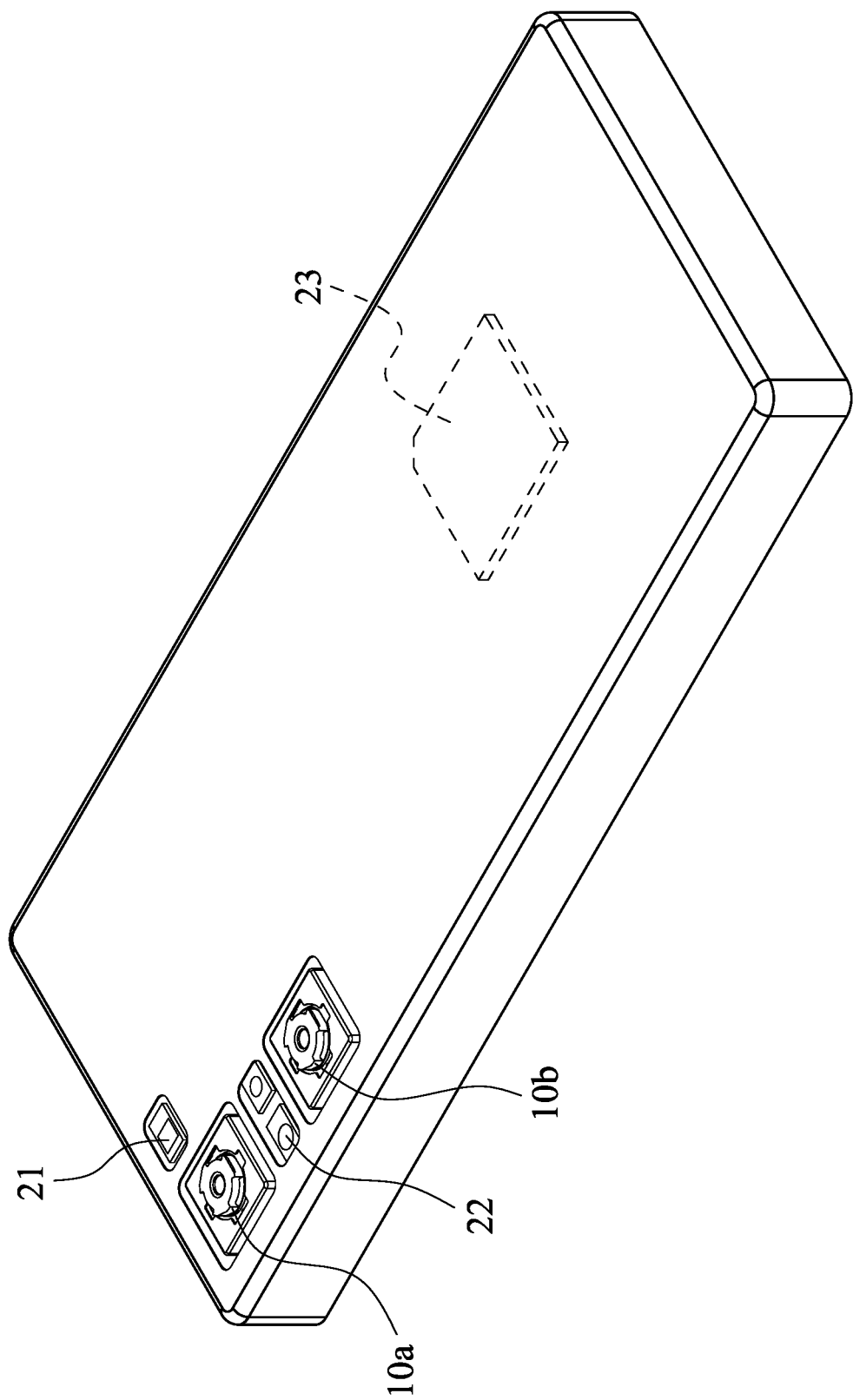
FIG. 24A is a schematic view of one side of an electronic device according to the 13th embodiment of the present disclosure.
Figure 24B:
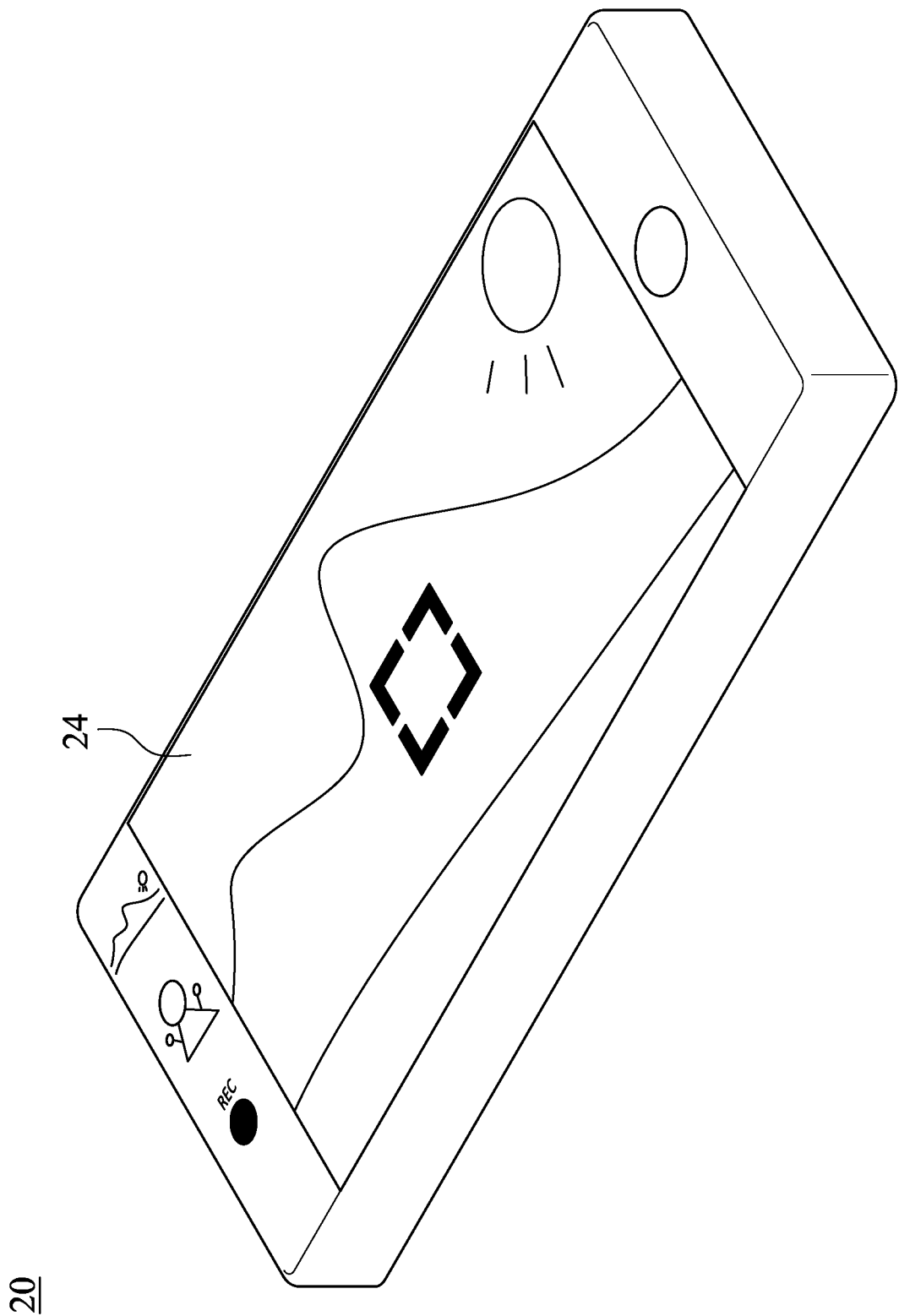
FIG. 24B is a schematic view of another side of the electronic device of FIG. 24A.
Figure 24C:
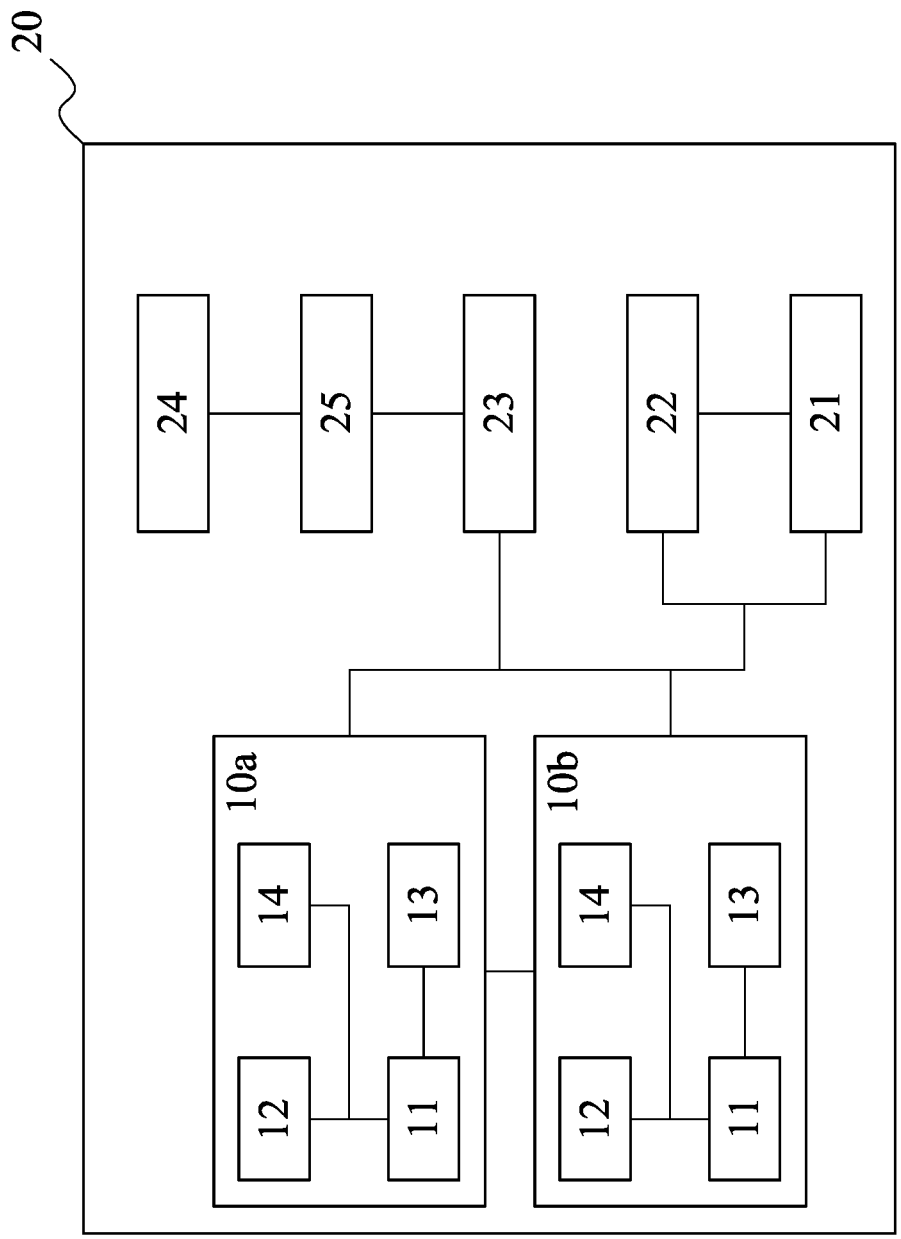
FIG. 24C is a system schematic view of the electronic device of FIG. 24A.

FIG. 24A is a schematic view of one side of an electronic device 20 according to the 13th embodiment of the present disclosure. FIG. 24B is a schematic view of another side of the electronic device 20 of FIG. 24A. FIG. 24C is a system schematic view of the electronic device 20 of FIG. 24A. In FIGS. 24A, 24B and 24C, the electronic device 20 according to the 13th embodiment is a smartphone, wherein the electronic device 20 includes two imaging apparatuses 10a, 10b, a flash module 21, a focusing assisting module 22, an image signal processor (ISP) 23, a user interface 24 and an image software processor 25. When the user captures images of an imaged object 26 via the user interface 24, the electronic device 20 focuses and generates an image via at least one of the imaging apparatuses 10a, 10b while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

The imaging apparatuses 10a, 10b according to the 13th embodiment can be the same with the imaging apparatus 10 according to the 12th embodiment, and will not describe again herein. In detail, the imaging apparatuses 10a, 10b according to the 13th embodiment can be any two of a telephoto imaging apparatus, a super-wide-angle imaging apparatus and an imaging apparatus with a wide angle (between the super-wide-angle and the telephoto), or can be others kind of imaging apparatuses, and will not be limited thereto.

14th Embodiment

Figure 25:
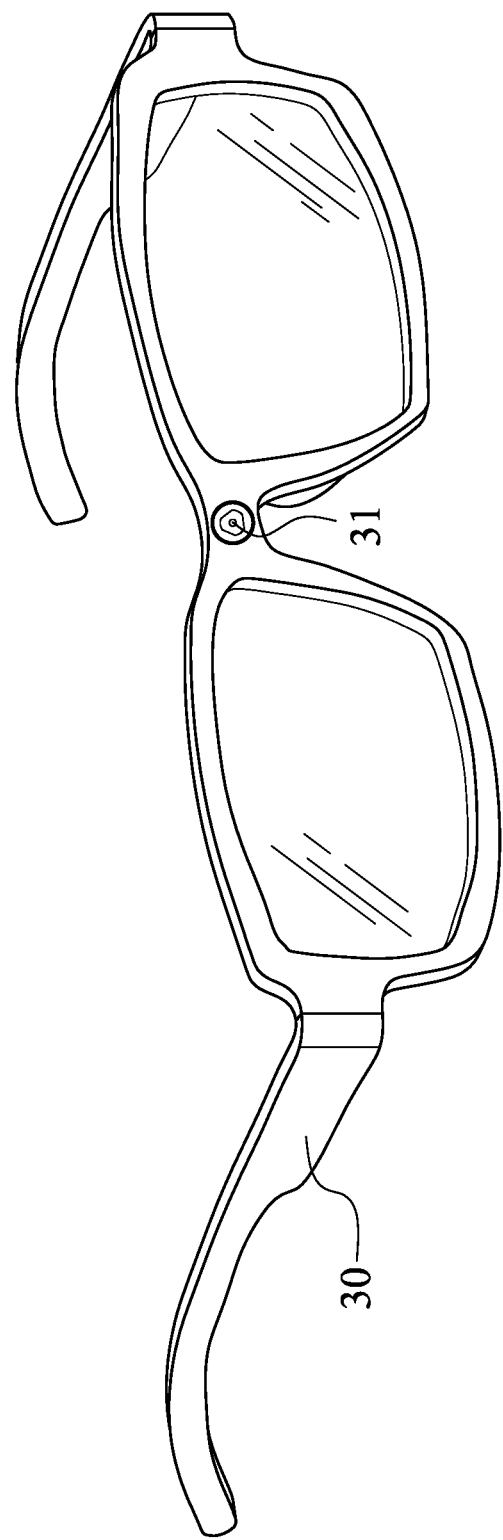
FIG. 25 is a schematic view of an electronic device according to the 14th embodiment of the present disclosure.

FIG. 25 is a schematic view of an electronic device 30 according to the 14th embodiment of the present disclosure. The electronic device 30 of the 14th embodiment is a wearable device, wherein the electronic device 30 includes an imaging apparatus 31, wherein the imaging apparatus 31 can be the same as stated in the 12th embodiment, and will not describe again herein.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side: a first lens element, a second lens element, a third lens element, a fourth lens element, a fifth lens element and a sixth lens element;
wherein each of the six lens elements has an object-side surface towards the object side and an image-side surface towards the image side;
wherein the first lens element has positive refractive power; the second lens element has negative refractive power, the image-side surface of the second lens element is concave in a paraxial region thereof; the image-side surface of the fourth lens element is concave in a paraxial region thereof, the image-side surface of the fourth lens element comprises a shape changing from concave to convex; the fifth lens element has positive refractive power, the object-side surface of the fifth lens element is convex in a paraxial region thereof, the image-side surface of the fifth lens element is convex in a paraxial region thereof;
wherein at least one of the object-side surfaces and the image-side surfaces of the six lens element comprises at least one inflection point;
wherein an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, an entrance pupil diameter of the photographing optical lens assembly is EPD, and the following conditions are satisfied:

$10.0 < V5 < 45.0$;

$0 < BL/TL < 0.55$;

$0.5 < TL/f < 1.0$;

$0 < (T45+T56)/T34 < 2.45$;

$0.60 < f/f1 < 5.0$; and $1.60 < f/EPD < 2.60$.

2. The photographing optical lens assembly of claim 1, wherein a minimum among Abbe numbers of the six lens elements of the photographing optical lens assembly is Vmin, the Abbe number of the fifth lens element is V5, and the following conditions are satisfied:

$13.0 < V5 < 38.0$; and $10.0 < V\min < 20.0$.

3. The photographing optical lens assembly of claim 1, wherein the axial distance between the third lens element and the fourth lens element is T34, the axial distance between the fourth lens element and the fifth lens element is T45, the axial distance between the fifth lens element and the sixth lens element is T56, and the following condition is satisfied:

$0 < (T45+T56)/T34 < 1.25$.

4. The photographing optical lens assembly of claim 1, wherein a curvature radius of the object-side surface of the fifth lens element is R9, a curvature radius of the image-side surface of the fifth lens element is R10, and the following condition is satisfied:

$-100.00 < R10/R9 < -0.10$.

5. The photographing optical lens assembly of claim 1, wherein an Abbe number of the third lens element is V3, an Abbe number of the fourth lens element is V4, and the following condition is satisfied:

$20.0 < V3+V4 < 100$.

6. The photographing optical lens assembly of claim 1, wherein a central thickness of the second lens element is CT2, an axial distance between the first lens element and the second lens element is T12, and the following condition is satisfied:

$0.41 < T12/CT2 < 3.8$.

7. The photographing optical lens assembly of claim 1, wherein an axial distance between the object-side surface of the first lens element and the image-side surface of the sixth lens element is TD, the axial distance between the third lens element and the fourth lens element is T34, and the following condition is satisfied:

$1.8 < TD/T34 < 5.0$.

8. The photographing optical lens assembly of claim 1, wherein the focal length of the photographing optical lens assembly is f, a focal length of the sixth lens element is f6, and the following condition is satisfied:

$-0.90 \le f/f6 < 0.60$.

9. The photographing optical lens assembly of claim 1, further comprising:
an aperture stop located on an object side of the third lens element, wherein an axial distance between the aperture stop and the image surface is SL, the axial distance between the object-side surface of the first lens element and the image surface is TL, and the following condition is satisfied:

$0.60 < SL/TL < 1.2$.

10. The photographing optical lens assembly of claim 1, wherein the object-side surface of the first lens element is convex in a paraxial region thereof, the focal length of the photographing optical lens assembly is f, a curvature radius of the object-side surface of the first lens element is R1, and the following condition is satisfied:

$3.2 < f/R1$.

11. The photographing optical lens assembly of claim 1, wherein at least three of the six lens elements have Abbe numbers smaller than 45.

12. A photographing optical lens assembly comprising six lens elements, the six lens elements being, in order from an object side to an image side: a first lens element, a second lens element, a third lens element, a fourth lens element, a fifth lens element and a sixth lens element;
wherein each of the six lens elements has an object-side surface towards the object side and an image-side surface towards the image side;
wherein the first lens element has positive refractive power; the fourth lens element has negative refractive power; the fifth lens element has positive refractive power, the object-side surface of the fifth lens element is convex in a paraxial region thereof, the image-side surface of the fifth lens element is convex in a paraxial region thereof;
wherein at least one of the object-side surfaces and the image-side surfaces of the six lens element comprises at least one inflection point;
wherein an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, a curvature radius of the image-side surface of the fifth lens element is R10, an Abbe number of the third lens element is V3, an Abbe number of the fourth lens element is V4, an axial distance between the object-side surface of the first lens element and the image-side surface of the sixth lens element is TD, and the following conditions are satisfied:

$10.0 < V5 < 45.0$;

$0 < BL/TL < 0.55$;

$0.5 < TL/f < 1.0$;

$0 < (T45+T56)/T34 < 4.50$;

$1.0 \le f/f1 < 3.0$;

$-70.0 < R10/f < 0$;

$20.0 < V3+V4 < 100$; and $1.8 < TD/T34 < 5.0$.

13. The photographing optical lens assembly of claim 12, wherein the Abbe number of the fifth lens element is V5, and the following condition is satisfied:

$16.0 < V5 < 30.0$.

14. The photographing optical lens assembly of claim 12, wherein the axial distance between the third lens element and the fourth lens element is T34, the axial distance between the fourth lens element and the fifth lens element is T45, the axial distance between the fifth lens element and the sixth lens element is T56, and the following condition is satisfied:

$0 < (T45+T56)/T34 < 2.45$.

15. The photographing optical lens assembly of claim 12, wherein the focal length of the photographing optical lens assembly is f, the focal length of the first lens element is f1, and the following condition is satisfied:

$1.7 \le f/f1 < 2.5$.

16. The photographing optical lens assembly of claim 12, wherein the focal length of the photographing optical lens assembly is f, an entrance pupil diameter of the photographing optical lens assembly is EPD, the axial distance between the object-side surface of the first lens element and the image surface is TL, a maximum image height of the photographing optical lens assembly is ImgH, half of a maximum field of view of the photographing optical lens assembly is HFOV, and the following conditions are satisfied:

$1.00 < f/EPD < 2.80$;

$1.6 < TL/ImgH < 5.0$;

$10.0 \text{ degrees} < HFOV < 30.0 \text{ degrees}$; and $2.0 \text{ mm} < TL < 20 \text{ mm}$.

17. The photographing optical lens assembly of claim 12, wherein the Abbe number of the third lens element is V3, the Abbe number of the fourth lens element is V4, and the following condition is satisfied:

$50.0 < V3+V4 < 90.0$.

18. The photographing optical lens assembly of claim 12, wherein a central thickness of the second lens element is CT2, an axial distance between the first lens element and the second lens element is T12, and the following condition is satisfied:

$0.41 < T12/CT2 < 3.8$.

19. The photographing optical lens assembly of claim 12, wherein the axial distance between the object-side surface of the first lens element and the image-side surface of the sixth lens element is TD, a central thickness of the first lens element is CT1, and the following condition is satisfied:

$1.8 < TD/CT1 < 7.0$.

20. The photographing optical lens assembly of claim 12, wherein the second lens element has negative refractive power, the focal length of the photographing optical lens assembly is f, a focal length of the second lens element is f2, and the following condition is satisfied:

$-5.0 < f/f2 < -0.65$.

21. The photographing optical lens assembly of claim 12, wherein the image-side surface of the fourth lens element is concave in a paraxial region thereof and comprises a shape changing from concave to convex in an off-axis region thereof, the focal length of the photographing optical lens assembly is f, a maximum image height of the photographing optical lens assembly is ImgH, and the following condition is satisfied:

$1.65 < f/\mathrm{ImgH} < 5.50.$

22. An imaging apparatus, comprising:
the photographing optical lens assembly of claim 12; and
an image sensor disposed on the image surface of the photographing optical lens assembly.

23. An electronic device, comprising:
the imaging apparatus of claim 22.

24. A photographing optical lens assembly comprising six lens elements, the six lens elements being, in order from an object side to an image side: a first lens element, a second lens element, a third lens element, a fourth lens element, a fifth lens element and a sixth lens element;
wherein each of the six lens elements has an object-side surface towards the object side and an image-side surface towards the image side;
wherein the first lens element has positive refractive power; the fourth lens element has negative refractive power, the image-side surface of the fourth lens element is concave in a paraxial region thereof; the fifth lens element has positive refractive power, the object-side surface of the fifth lens element is convex in a paraxial region thereof, the image-side surface of the fifth lens element is convex in a paraxial region thereof;
wherein at least one of the object-side surfaces and the image-side surfaces of the six lens element comprises at least one inflection point;
wherein an Abbe number of the fifth lens element is V5, an axial distance between the image-side surface of the sixth lens element and an image surface is BL, an axial distance between the object-side surface of the first lens element and the image surface is TL, a focal length of the photographing optical lens assembly is f, a focal length of the first lens element is f1, an axial distance between the third lens element and the fourth lens element is T34, an axial distance between the fourth lens element and the fifth lens element is T45, an axial distance between the fifth lens element and the sixth lens element is T56, a curvature radius of the object-side surface of the fifth lens element is R9, a curvature radius of the image-side surface of the fifth lens element is R10, an Abbe number of the third lens element is V3, an Abbe number of the fourth lens element is V4, and the following conditions are satisfied:

$10.0 < V5 < 45.0;$ $0 < BL/TL < 0.55;$ $0.5 < TL/f < 1.0;$ $0 < (T45+T56)/T34 < 4.50;$ $1.0 < f/f1 < 3.0;$ $-105.00 < R10/R9 < 0;$ and $20.0 < V3+V4 < 100;$ 25. The photographing optical lens assembly of claim 24, wherein a minimum among Abbe numbers of the six lens elements of the photographing optical lens assembly is Vmin, and the following condition is satisfied:

$10.0 < V\mathrm{min} < 20.0.$

26. The photographing optical lens assembly of claim 24, wherein the curvature radius of the object-side surface of the fifth lens element is R9, the curvature radius of the image-side surface of the fifth lens element is R10, and the following condition is satisfied:

$-100.00 < R10/R9 < -0.10.$

* * * * *